US012487556B2

(12) United States Patent
Komatsu et al.

(10) Patent No.: US 12,487,556 B2
(45) Date of Patent: Dec. 2, 2025

(54) CARTRIDGE AND IMAGE FORMING APPARATUS

(71) Applicant: CANON KABUSHIKI KAISHA, Tokyo (JP)

(72) Inventors: Noriyuki Komatsu, Shizuoka (JP); Masaki Ojima, Shizuoka (JP); Daisuke Abe, Shizuoka (JP); Tomonori Mori, Kanagawa (JP); Tadayuki Tsuda, Shizuoka (JP); Tetsuya Numata, Shizuoka (JP); Naoya Asanuma, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/785,667

(22) Filed: Jul. 26, 2024

(65) Prior Publication Data

US 2024/0385570 A1 Nov. 21, 2024

Related U.S. Application Data

(63) Continuation of application No. 18/347,847, filed on Jul. 6, 2023, now Pat. No. 12,158,722, which is a (Continued)

(30) Foreign Application Priority Data

Apr. 26, 2019 (JP) ................................ 2019-086876

(51) Int. Cl.
*G03G 21/16* (2006.01)
*G03G 21/18* (2006.01)

(52) U.S. Cl.
CPC ..... *G03G 21/1814* (2013.01); *G03G 21/1671* (2013.01); *G03G 21/1821* (2013.01);

(Continued)

(58) Field of Classification Search
CPC .......... G03G 21/1671; G03G 21/1814; G03G 21/1821; G03G 21/1853; G03G 21/1864; G03G 21/1878
See application file for complete search history.

(56) References Cited

U.S. PATENT DOCUMENTS 7,171,137 B2 1/2007 Lee
7,826,779 B2 11/2010 Mase (Continued)

FOREIGN PATENT DOCUMENTS

JP H03246571 A 11/1991
JP 2003330335 A 11/2003

(Continued)

OTHER PUBLICATIONS

Office Action issued in U.S. Appl. No. 16/853,212 mailed Aug. 25, 2020.

(Continued)

*Primary Examiner* — Hoang X Ngo
(74) *Attorney, Agent, or Firm* — ROSSI, KIMMS & McDOWELL LLP

(57) ABSTRACT

A cartridge includes a drum unit and a development unit. The drum unit includes a photosensitive drum, a frame, a transfer roller, and a cleaning member. The development unit includes a development roller, and a memory. The cleaning member is configured to come into contact with the photosensitive drum at a region between a development nip portion and a transfer nip portion in a circumferential direction of the photosensitive drum and at an end portion of the photosensitive drum in a direction of the rotational axis. The frame has an exposing hole through which the memory is exposed from the frame, and a recessed portion that is adjacent to the exposing hole in the direction of the rota- (Continued)

tional axis, and stores foreign matters removed from the photosensitive drum by the cleaning member.

9 Claims, 56 Drawing Sheets

Related U.S. Application Data continuation of application No. 17/531,080, filed on Nov. 19, 2021, now Pat. No. 11,733,644, which is a continuation of application No. 16/853,212, filed on Apr. 20, 2020, now Pat. No. 11,209,773.

(52) U.S. Cl.
CPC ..... *G03G 21/1853* (2013.01); *G03G 21/1864* (2013.01); *G03G 21/1878* (2013.01)

(56) References Cited

U.S. PATENT DOCUMENTS

| | | | | |
|---|---|---|---|---|
| 9,823,621 | B2 | 11/2017 | Miyamoto | |
| 9,927,767 | B2 | 3/2018 | Itabashi et al. | |
| 10,126,704 | B2 | 11/2018 | Shimizu | |
| 10,514,655 | B2 | 12/2019 | Shimizu | |
| 10,996,620 | B2 | 5/2021 | Komatsu | |
| 11,209,773 | B2 | 12/2021 | Komatsu et al. | |
| 2003/0215261 | A1 | 11/2003 | Karukama et al. | |
| 2005/0019061 | A1 | 1/2005 | Karakama | |
| 2007/0146826 | A1 | 6/2007 | Inao et al. | |
| 2010/0183329 | A1 | 7/2010 | Okabe | |
| 2011/0280620 | A1* | 11/2011 | Chadani | G03G 15/80 399/111 |
| 2014/0169824 | A1* | 6/2014 | Seto | G03G 21/1652 399/90 |
| 2016/0139558 | A1 | 5/2016 | Kawakami et al. | |
| 2016/0291521 | A1 | 10/2016 | Nagata | |
| 2018/0107155 | A1 | 4/2018 | Shimizu | |
| 2019/0227480 | A1 | 7/2019 | Fujiwara et al. | |
| 2019/0391529 | A1 | 12/2019 | Abe et al. | |
| 2023/0418220 | A1* | 12/2023 | Saeki | G03G 21/1867 |

FOREIGN PATENT DOCUMENTS

| | | | |
|---|---|---|---|
| JP | 2007072421 | A | 3/2007 |
| JP | 2007171799 | A | 7/2007 |
| JP | 2008224962 | A | 9/2008 |
| JP | 2013205705 | A | 10/2013 |
| JP | 2016071249 | A | 5/2016 |
| JP | 2016224221 | A | 12/2016 |
| JP | 2018004907 | A | 1/2018 |
| JP | 2018066973 | A | 4/2018 |
| JP | 2018097097 | A | 6/2018 |
| JP | 2018097293 | A | 6/2018 |
| JP | 2018146829 | A | 9/2018 |
| JP | 2018146830 | A | 9/2018 |
| JP | 2018200450 | A | 12/2018 |
| JP | 2020052333 | A | 4/2020 |
| JP | 2020183983 | A | 11/2020 |

OTHER PUBLICATIONS

Notice of Allowance issued in U.S. Appl. No. 16/853,212 mailed Jan. 26, 2021.
Office Action issued in U.S. Appl. No. 16/853,212 mailed May 10, 2021.
Notice of Allowance issued in U.S. Appl. No. 16/853,212 mailed Aug. 27, 2021.
JP_2020052333_A_I Machine Translation, Japan, 2020, Tamura.
Office Action issued in U.S. Appl. No. 17/531,080 mailed Dec. 30, 2022.
Notice of Allowance issued in U.S. Appl. No. 17/531,080 mailed Apr. 12, 2023.
Notice of Allowance issued in U.S. Appl. No. 18/347,847 mailed Aug. 27, 2024.

* cited by examiner

CARTRIDGE AND IMAGE FORMING APPARATUS

BACKGROUND OF THE INVENTION

Field of the Invention

The present invention relates to a cartridge and an image forming apparatus in which a development unit is detachably mounted on a drum unit.

Description of the Related Art

Hitherto, a process cartridge in which a development cartridge including a memory is detachably provided in a photosensitive member cartridge is suggested (refer to JP-A-2016-224221). The photosensitive member cartridge is provided with a first electric contact portion that is electrically connected to an electric contact portion on an apparatus body side, and a second electric contact portion that is electrically connected to the memory. In addition, the memory is configured to perform communication with a control unit provided on the apparatus body side through the first and second electric contact portions.

As described in JP-A-2016-224221, in a case where the memory is provided in the development cartridge that is detachably mounted on a frame of the photosensitive member cartridge, it is considered that the memory is brought into direct contact with the electric contact portion on the apparatus body side. In this case, it is necessary to provide a hole for exposing the memory in the frame.

However, when the hole is provided in the frame, there is a problem that the strength of the frame decreases.

Here, an object of the invention is to provide a cartridge and an image forming apparatus which have a configuration capable of suppressing a decrease in strength of a frame that includes a hole for exposing a memory.

SUMMARY OF THE INVENTION

According to one aspect of the present invention, a cartridge that is detachably mounted to an apparatus body of an image forming apparatus, includes a drum unit including a photosensitive drum configured to bear a toner image, a frame configured to rotatably support the photosensitive drum about a rotational axis, a transfer roller configured to come into contact with the photosensitive drum and to form a transfer nip portion for transferring the toner image on the photosensitive drum onto a recording material while conveying the recording material, and a cleaning member, and a development unit configured to be detachably mounted on the drum unit, the development unit including a development roller configured to come into contact with the photosensitive drum to form a development nip portion for supplying a toner to the photosensitive drum, and a memory configured to store information. The cleaning member is configured to come into contact with the photosensitive drum to clean the photosensitive drum at a region between the development nip portion and the transfer nip portion in a circumferential direction of the photosensitive drum and at an end portion of the photosensitive drum in a direction of the rotational axis. The frame has an exposing hole through which the memory is exposed from the frame, and a recessed portion that is adjacent to the exposing hole in the direction of the rotational axis, is further recessed, in a direction away from the cleaning member, than a surface in which the exposing hole is provided, and stores foreign matters removed from the photosensitive drum by the cleaning member.

Further features of the present invention will become apparent from the following description of exemplary embodiments with reference to the attached drawings.

DESCRIPTION OF THE EMBODIMENTS

First Embodiment

Overall Configuration

Figure 1:
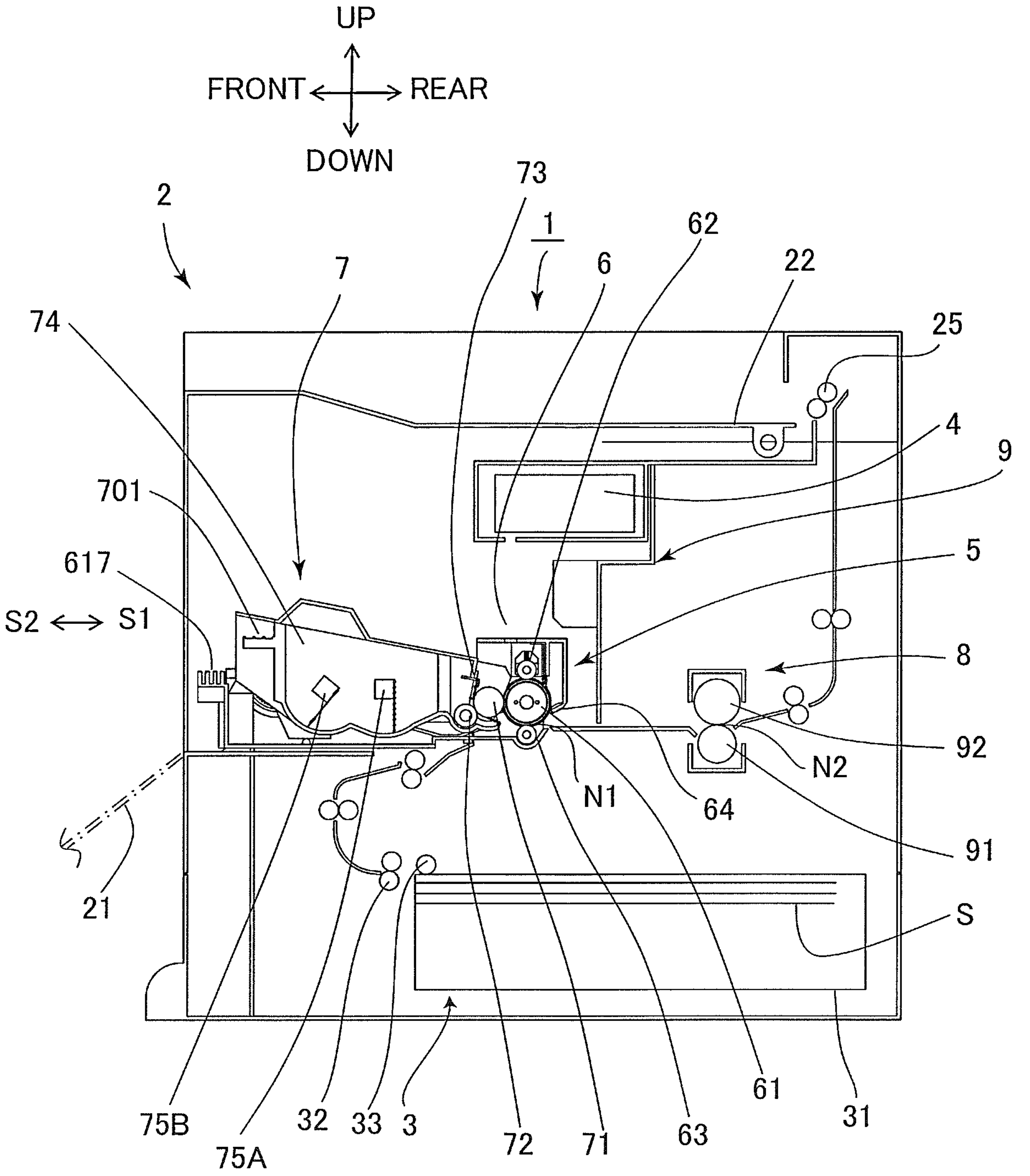
FIG. 1 is an overall schematic view illustrating a printer according to a first embodiment.

First, a first embodiment of the invention will be described. In the following description, directions are defined on the basis of a user who uses a printer 1. That is, a front surface side of the printer 1 is set as "front", a rear surface side thereof is set as "rear", an upper surface side is set as "up", and a lower surface side is set as "down". In addition, when the printer 1 is viewed from the front surface side, a left side of the printer 1 is set as "left", and a right side thereof is set as "right". With regard to a process cartridge to be described later, directions are defined in a similar manner as in the printer 1 on the assumption that the process cartridge takes the same posture as in a state of being mounted on the printer 1. Respective directions in the respective drawings are defined by arrows illustrated in the drawings. For example, in FIG. 1, a left side of a paper surface is set to a front side. In addition, an upper-lower direction is parallel to a vertical direction, and a right-left direction and a front-rear direction are parallel to a horizontal direction. The right-left direction is parallel to a rotational axis direction of a photosensitive drum 61 and a rotational axis direction of a development roller 71.

The printer 1 serving as an image forming apparatus according to the first embodiment is an electrophotographic-system laser beam printer. As illustrated in FIG. 1, the printer 1 includes a sheet feeding unit 3 that feeds a sheet S accommodated in a cassette 31, an image forming unit 9 that forms a toner image on the sheet S, a fixing unit 8 that fixes the toner image onto the sheet S, and a sheet discharge roller pair 25.

The sheet feeding unit 3 includes the cassette 31, a pickup roller 33 that feeds the highest sheet S accommodated in the cassette 31, and a separation roller pair 32 that separates the sheets S fed by the pickup roller 33 sheet by sheet.

The image forming unit 9 includes an exposing unit 4 that is provided in an apparatus body 2 of the printer 1, and a process cartridge 5 that is inserted into the apparatus body 2 in a direction indicated by an arrow S1 and is detached in a direction indicated by an arrow S2. The exposing unit 4 includes a laser emitting component, a polygon mirror, a lens, a reflective mirror, and the like (not illustrated). In the exposing unit 4, a surface of the photosensitive drum 61 of the process cartridge 5 is scanned at a high speed with laser light that is emitted from the laser emitting component and is based on image data, and thus the surface of the photosensitive drum 61 is exposed.

The process cartridge 5 is disposed bellow the exposing unit 4, and is inserted into or extracted from the apparatus body 2 in a state in which a door 21 of the apparatus body 2 is opened. The process cartridge 5 mainly includes a drum unit 6 and a development unit 7, and the drum unit 6 includes a rotatable photosensitive drum 61 serving as an image bearing member, a charging roller 62, a transfer roller 63, and the like. The photosensitive drum 61 and the transfer roller 63 form a transfer nip N1 serving as a conveyance nip portion. The development unit 7 includes a development roller 71, a supply roller 72, a blade 73, a toner storage portion 74 that stores a developer that contains a toner, a first agitator 75A and a second agitator 75B which are provided inside the toner storage portion 74, and the like.

Note that, the developer in this embodiment is constituted by a nonmagnetic one-component developer, but a one-component developer including a magnetic component may be used. In addition, the one-component developer may contain an additive (for example, wax or silica particulate) for adjusting fluidity or a charging performance of the toner in addition to toner particles. In addition, as the developer, a two-component developer constituted by a nonmagnetic toner and a magnetic carrier may be used. In the case of using the magnetic developer, as the developer bearing member, for example, a cylindrical development sleeve in which a magnet is disposed on an inner side is used.

When an image forming command is output to the printer 1, an image forming process is initiated by the image forming unit 9 on the basis of image information that is input from an external computer connected to the printer 1 or an image reading apparatus or the like that is connected to the printer 1 as an option. The exposing unit 4 emits laser light toward the photosensitive drum 61 on the basis of the image information that is input. At this time, the photosensitive drum 61 is charged in advance by the charging roller 62, and thus when the photosensitive drum 61 is irradiated with laser light, an electrostatic latent image is formed on the photosensitive drum 61. Then, the electrostatic latent image is developed by the development roller 71, and a toner image is formed on the photosensitive drum 61.

In combination with the image forming process, the sheet S stacked on the cassette 31 is sent out by the pickup roller 33. A plurality of the sheets S fed by the pickup roller 33 are separated sheet by sheet by the separation roller pair 32, and is conveyed to the transfer nip N1. In the transfer nip N1, when a transfer bias is applied to the transfer roller 63, the toner image formed on the photosensitive drum 61 is transferred to the sheet S. The sheet S to which the toner image is transferred at the transfer nip N1 is heated and pressed by a fixing nip N2 formed by the pressing roller 91 and the heating roller 92, and thus the toner image is fixed. In addition, the sheet S to which the toner image is fixed is discharged to a sheet discharge tray 22 by the sheet discharge roller pair 25.

Process Cartridge

Figure 2:
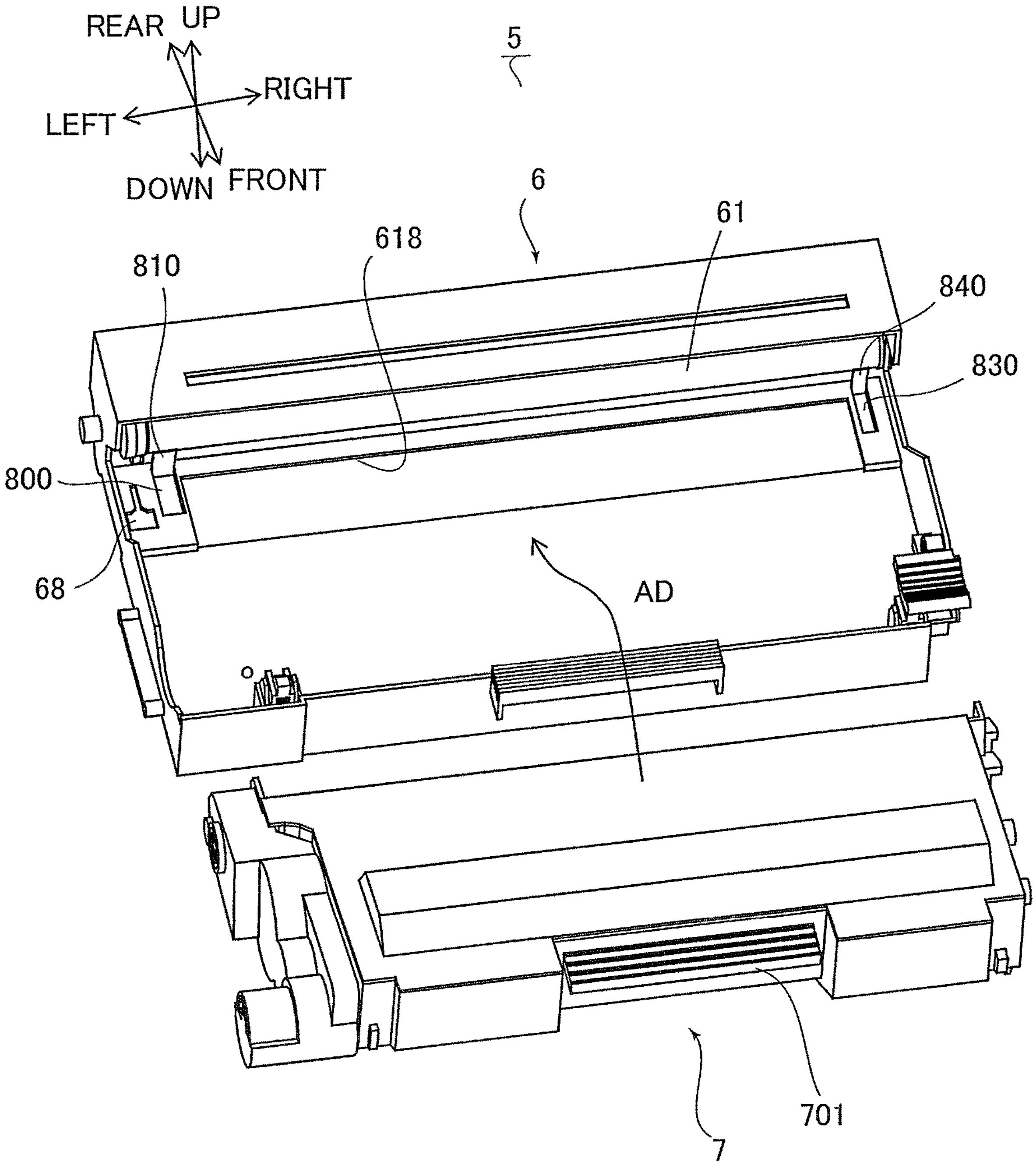
FIG. 2 is a perspective view illustrating a drum unit and a development unit.

As illustrated in FIG. 2, the process cartridge 5 includes the drum unit 6 serving as a first unit and the development unit 7 serving as a second unit that is detachably supported to the drum unit 6. The development unit 7 is mounted on the drum unit 6 in a mounting direction AD in a state in which a grip portion 701 is gripped by a user. Note that, in all embodiments to be described below, the mounting direction AD is the same as a direction toward a backward side from a forward side of an apparatus.

Development Unit

As illustrated in FIG. 2 to FIG. 5, the development unit 7 includes a casing 700, the development roller 71, the supply roller 72, the first agitator 75A, the second agitator 75B, a drive train 720, and a side holder 719. The casing 700 includes a left side wall 704 and a right side wall 705 which rotatably support both ends of the development roller 71, the supply roller 72, the first agitator 75A, and the second agitator 75B, and a grip portion 701 that is provided in a front direction of the casing 700 and is gripped by a user. The side holder 719 covers the drive train 720 and is supported to the left side wall 704. Hereinafter, a rotational axis direction of the development roller 71 is referred to as an axial direction in description.

The first agitator 75A includes a stirring rod 78A and a stirring sheet 79A. The stirring rod 78A stirs the developer inside the toner storage portion 74 in the axial direction, and the stirring sheet 79A stirs the developer in a diameter direction orthogonal to the axial direction. Similarly, the second agitator 75B includes a stirring rod 78B and a stirring sheet 79B. The stirring rod 78B stirs the developer inside the toner storage portion 74 in the axial direction, and the stirring sheet 79B stirs the developer in the diameter direction. The supply roller 72 is supplied with the developer by the stirring sheet 79A.

Figure 3:
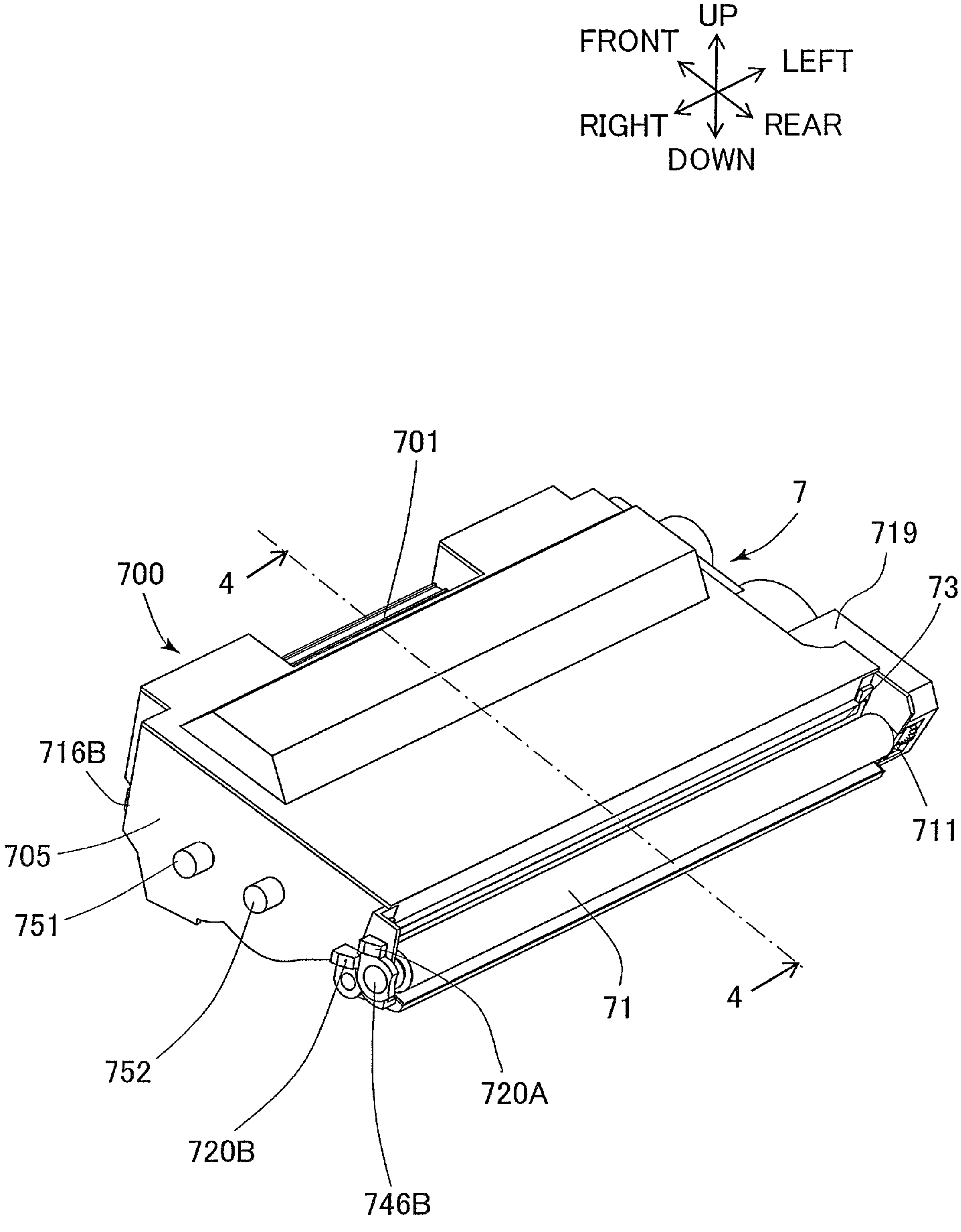
FIG. 3 is a perspective view illustrating the development unit.
Figure 4:
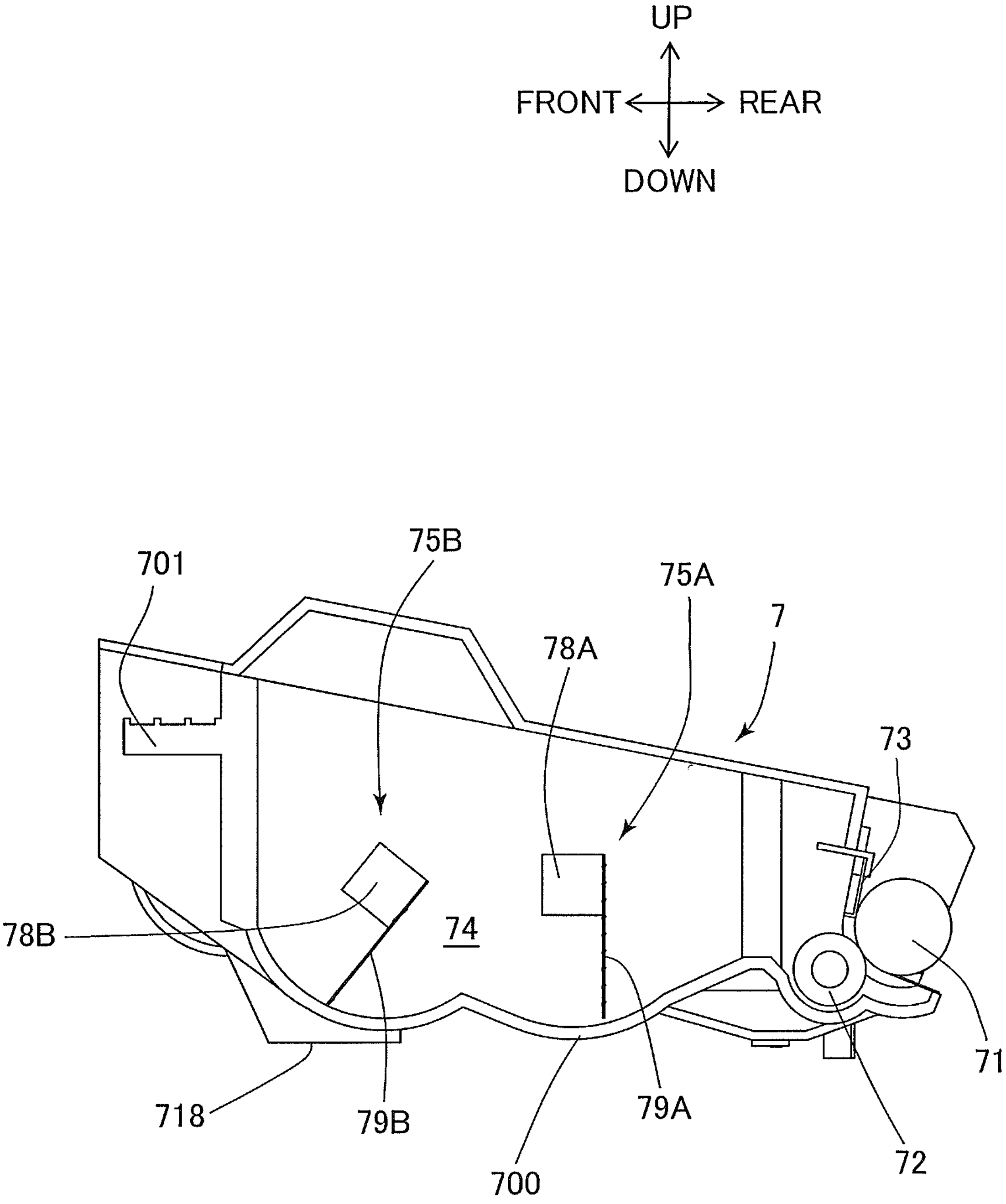
FIG. 4 is a cross-sectional view illustrating a cross-section 4-4 in FIG. 3.

The development roller 71 is rotatably supported by a bearing 746A provided in the side holder 719, and a bearing 746B attached to the right side wall 705 of the casing 700. As illustrated in FIG. 3, the development unit 7 includes a first contact 720A and a second contact 720B which are disposed in the vicinity of the bearing 746B. The first contact 720A is electrically connected to the development roller 71, and a voltage applied to the development roller 71 is supplied from the apparatus body 2. The second contact 720B is electrically connected to the supply roller 72, and a voltage applied to the supply roller 72 is supplied from the apparatus body 2. The first contact 720A and the second contact 720B can come into contact with a power supply contact (not illustrated) provided in the apparatus body 2.

Figure 5:
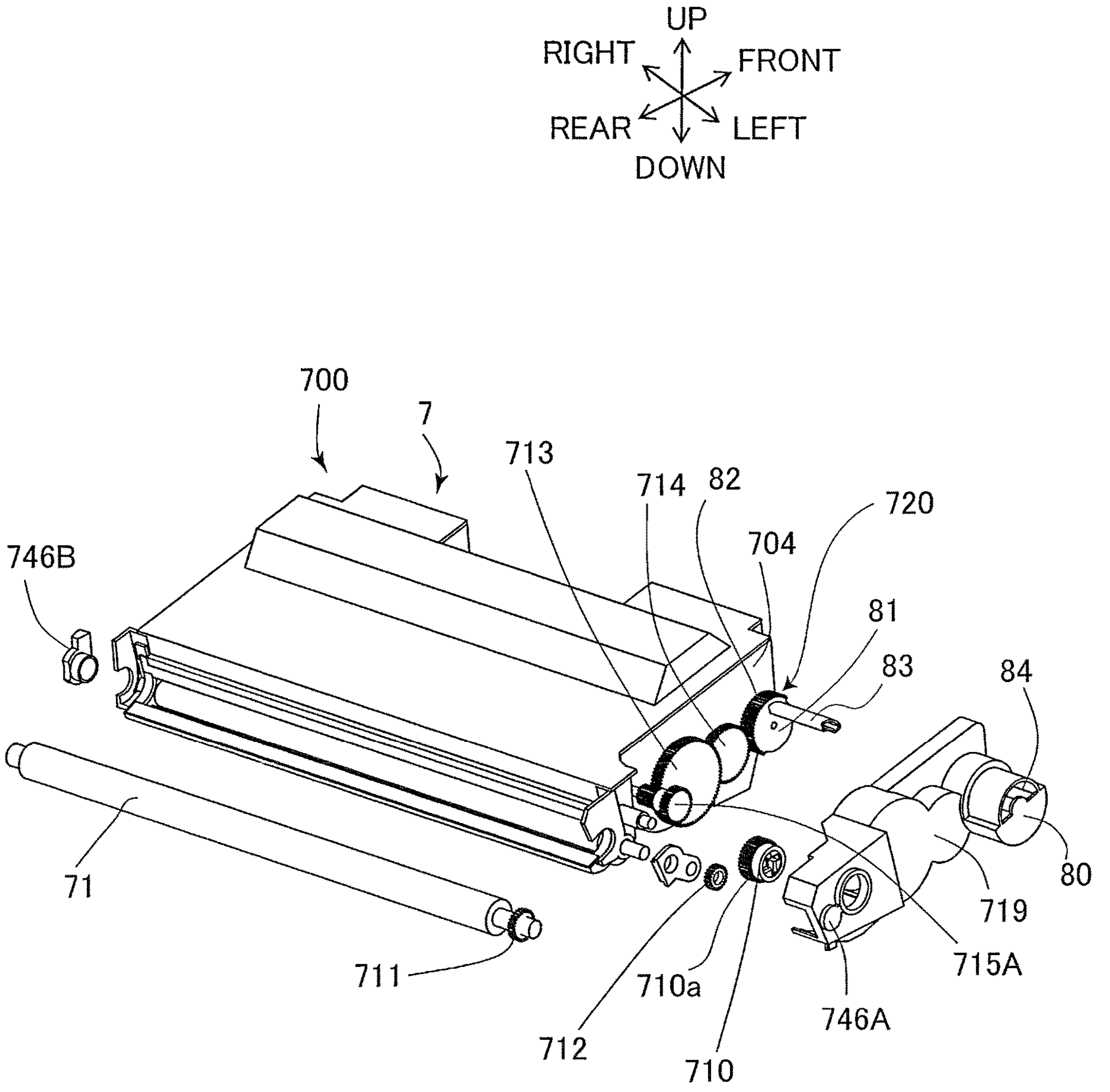
FIG. 5 is an exploded perspective view illustrating the development unit.
Figure 6:
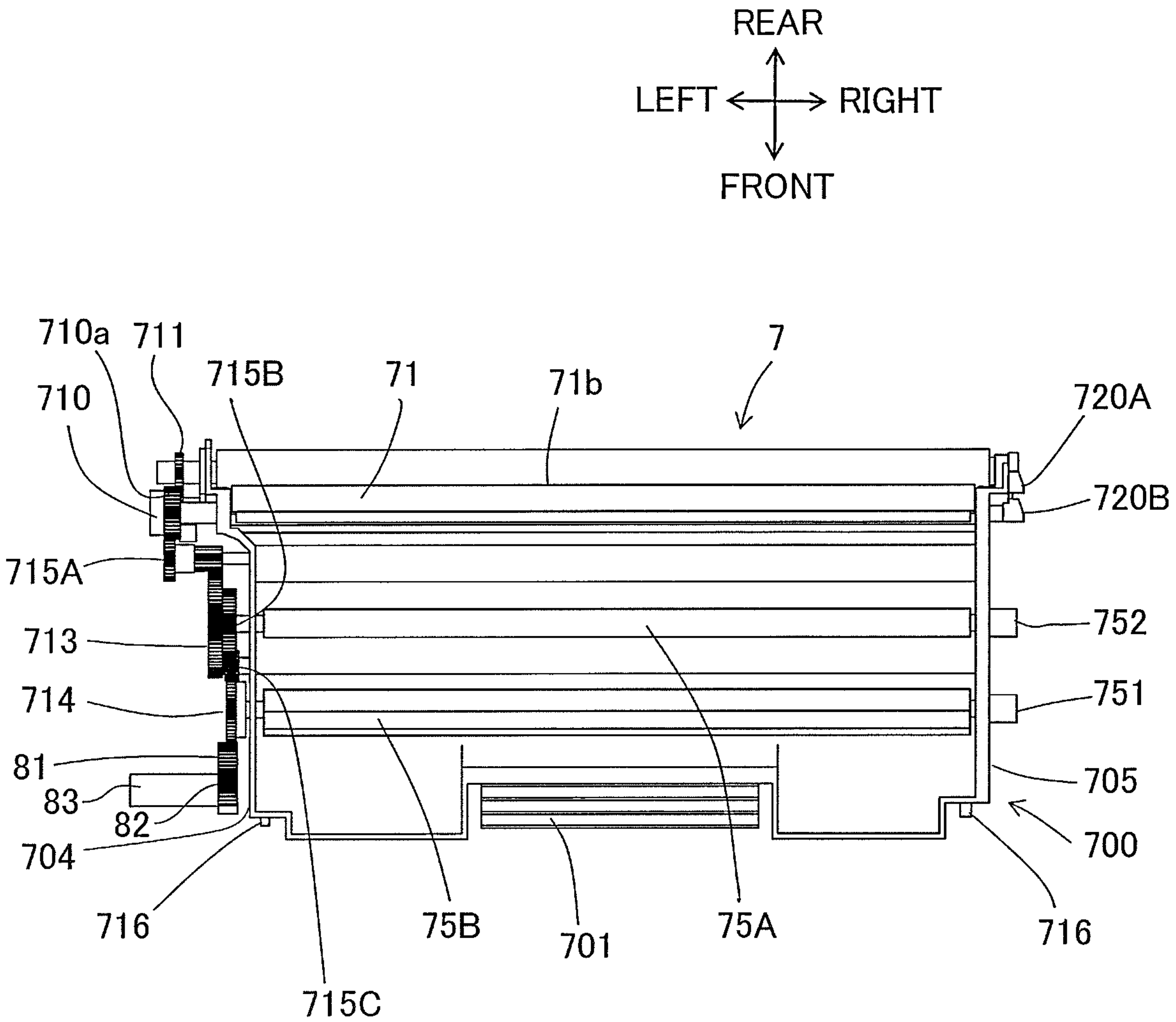
FIG. 6 is a plan view illustrating the development unit.

As illustrated in FIG. 5 and FIG. 6, the drive train 720 provided on the left side of the development unit 7 includes a development coupling 710, a supply roller gear 712, a development roller gear 711, a first agitator gear 713, and a second agitator gear 714. In addition, the drive train 720 includes idle gears 715A, 715B, and 715C.

The development coupling 710 is rotatably supported to the left side wall 704 of the development unit 7, and a drive transmission member (not illustrated) provided in the apparatus body 2 engages with the development coupling 710 in conjunction with an operation of closing the door 21 (refer to FIG. 1) provided in the apparatus body 2. In contrast, the drive transmission member is spaced apart from the development coupling 710 in conjunction with an operation of opening the door 21. The drive transmission member is configured to transmit a driving force to the development coupling 710 while permitting a displacement of the development coupling 710 within a predetermined range. In addition, movement of the development coupling 710, the development roller gear 711, and the supply roller gear 712 in an axial direction is regulated by the side holder 719.

When the apparatus body 2 operates after the door 21 is closed, the driving force is transmitted from the drive transmission member to the development coupling 710, and a gear 710*a* provided in a peripheral surface of the development coupling 710 rotates. The gear 710*a* engages with the development roller gear 711 provided in an end of the development roller 71 and the supply roller gear 712 provided in an end of the supply roller 72, and when the gear 710*a* rotates, the development roller 71 and the supply roller 72 rotate.

In addition, the gear 710*a* of the development coupling 710 engages with the first agitator gear 713 through the idle gear 715A, and when the first agitator gear 713 rotates, the first agitator 75A rotates. The idle gear 715B that is provided coaxially with the first agitator 75A engages with the second agitator gear 714 through the idle gear 715C, and when the second agitator gear 714 rotates, the second agitator 75B rotates.

In addition, as illustrated in FIG. 5 to FIG. 7B, the second agitator gear 714 is configured to engage with a gear portion 82 of a detection gear 81. The detection gear 81 is provided with a detection protrusion 83 that is disposed at a position distant from the rotation center by a predetermined distance and extends in an axial direction, and the detection protrusion 83 serving as a detection unit passes through a hole 84 of a detection unit 80 of the side holder 719. The hole 84 has a long hole shape that is long in a circumferential direction. The apparatus body 2 is provided with a detection mechanism (not illustrated) that detects a position of the detection protrusion 83, and the detection mechanism outputs a detection signal on the basis of the position of the detection protrusion 83. According to this, it is possible to determine whether the development unit 7 is an object that is not used, or an object that is used already.

Figure 7A:
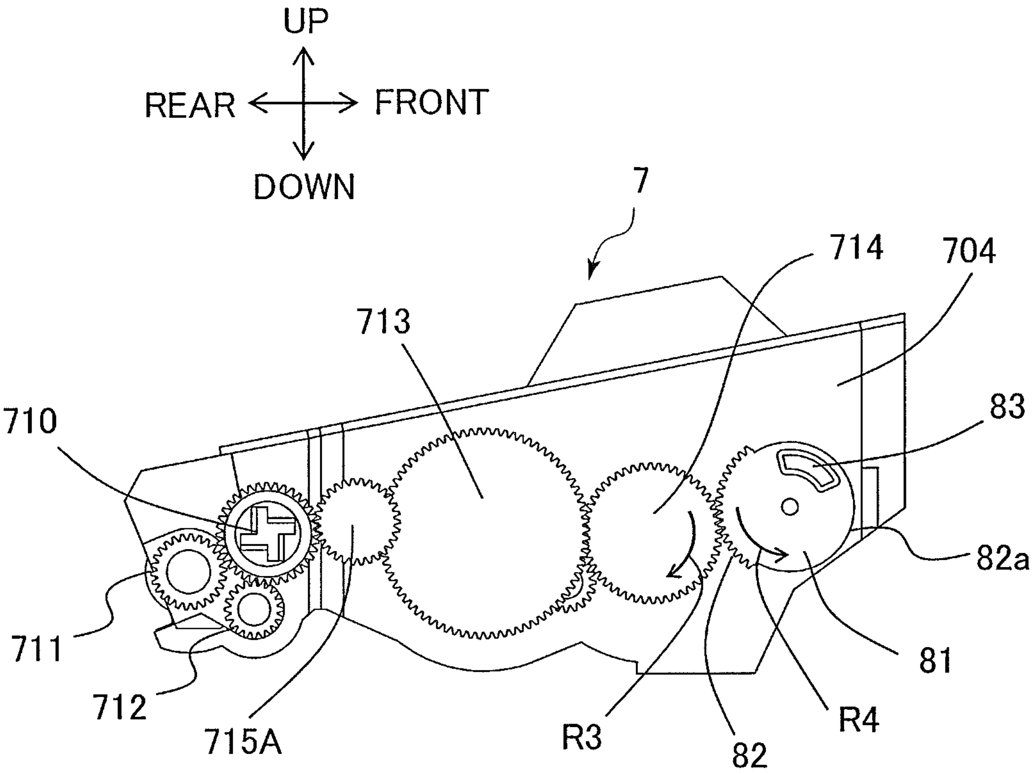
FIG. 7A is a side view illustrating a development unit that is not used.
Figure 7B:
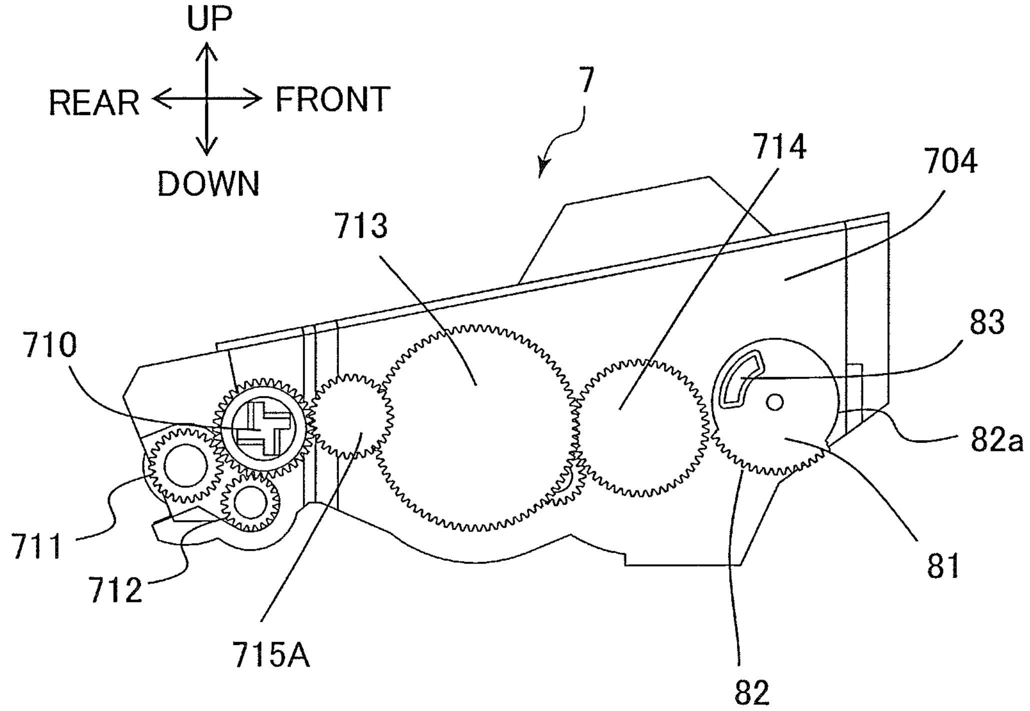
FIG. 7B is a side view illustrating a development unit that is used already.

FIG. 7A is aside view illustrating the development unit 7 that is not used, and FIG. 7B is aside view illustrating the development unit 7 that is used already. The detection gear 81 is a chipped tooth gear and includes the gear portion 82 and a non-gear portion 82*a*. As illustrated in FIG. 7A, the second agitator gear 714 of the development unit 7 that is not used engages with the gear portion 82 of the detection gear 81. At this time, the detection protrusion 83 is located at a position on an upper-front side serving as a first position.

In addition, when the development unit 7 is used and the second agitator gear 714 rotates in a direction indicated by an arrow R3, the detection gear 81 that engages with the second agitator gear 714 rotates in a direction indicated by an arrow R4. In addition, as illustrated in FIG. 7B, when the gear portion 82 of the detection gear 81 does not engage with the second agitator gear 714, the detection gear 81 is stopped. At this time, the detection protrusion 83 is located at a position on an upper-rear side serving as a second position.

As described above, since the development unit 7 is used, the detection protrusion 83 pivots within in a range of the hole 84 of the detection unit 80, and a position of the detection protrusion 83 is detected by the detection mechanism provided in the apparatus body 2. According to this, it is possible to determine whether the development unit 7 is an object that is not used or an object that is used already.

Figure 8:
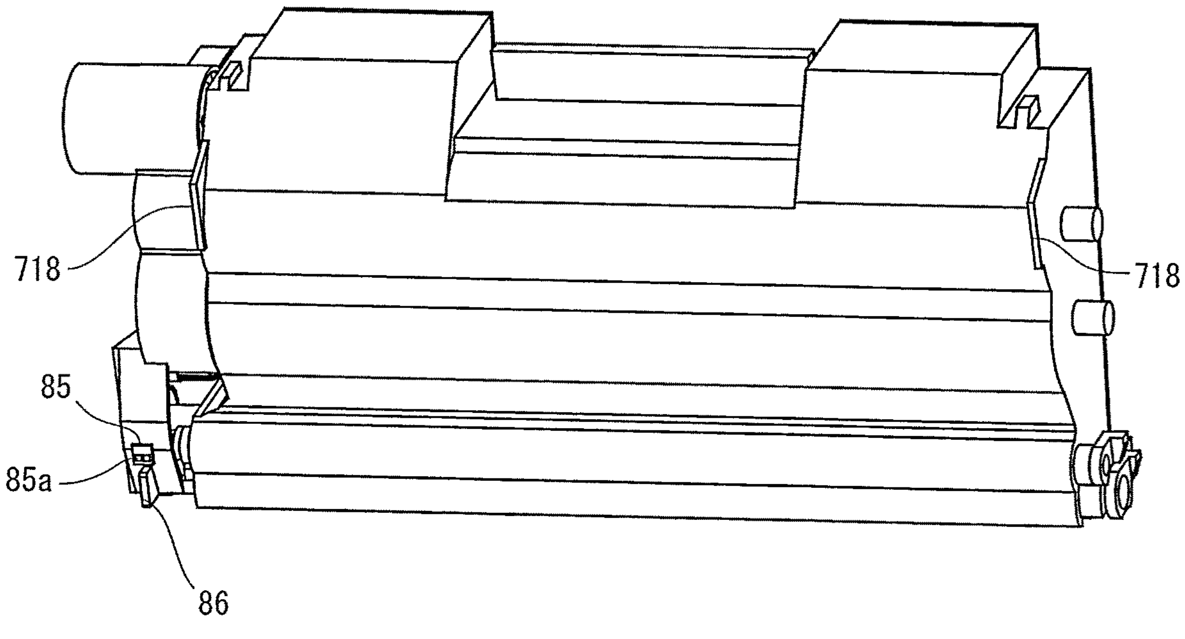
FIG. 8 is a bottom view illustrating the development unit.

In addition, as illustrated in FIG. 8, a bottom surface of the development unit 7 is provided with a pair of left and right ribs 718 and 718 which protrudes downward, and a memory 85 and a positioning protrusion 86 which are provided on a left side. More specifically, the memory 85 and the positioning protrusion 86 are provided on a bottom surface of the side holder 719 of the development unit 7. The memory 85 includes a memory chip (not illustrated) that stores information about the development unit 7, and a memory electrode 85*a* that is electrically connected to the memory chip. The memory electrode 85*a* comes into contact with an electrode (not illustrated) provided in the apparatus body 2, and performs communication with the memory chip and the apparatus body 2. Information that is stored in the memory chip and relates to the development unit 7 includes information about replacement time of the development unit 7, or information about a residual amount of a toner stored in the development unit 7.

Drum Unit

Next, a detailed configuration of the drum unit 6 will be described. As illustrated in FIG. 2, and FIG. 9 to FIG. 11, the drum unit 6 mainly includes a frame 610 and the photosensitive drum 61 that is rotatably supported on a rear side of the frame 610. In the frame 610, a pair of left side wall 611 and right side wall 612 is provided to be erected from left and right ends of a bottom portion 614 to face each other in the right-left direction, and a leading edge wall 613 provided with a grip portion 617 that is gripped by a user is provided to be erected from a leading edge portion.

The frame 610 is configured to rotatably support the photosensitive drum 61 by the left and right side walls 611 and 612 to cover the periphery of the photosensitive drum 61 on a rearward side. In addition, a laser passage hole 616 is formed in the frame 610 on an upward side of the photosensitive drum 61, and a surface of the photosensitive drum 61 can be irradiated with laser light emitted from the exposing unit 4 through the laser passage hole 616.

On the other hand, the frame 610 is configured to be opened upward on a forward side of the photosensitive drum 61, and a mounting portion 615 on which the development unit 7 is mounted is formed. More specifically, on the forward side of the photosensitive drum 61, a space surrounded by the wall portions 611, 612, 613, and 614 is set as the mounting portion 615 on which the development unit 7 is mounted.

Figure 9:
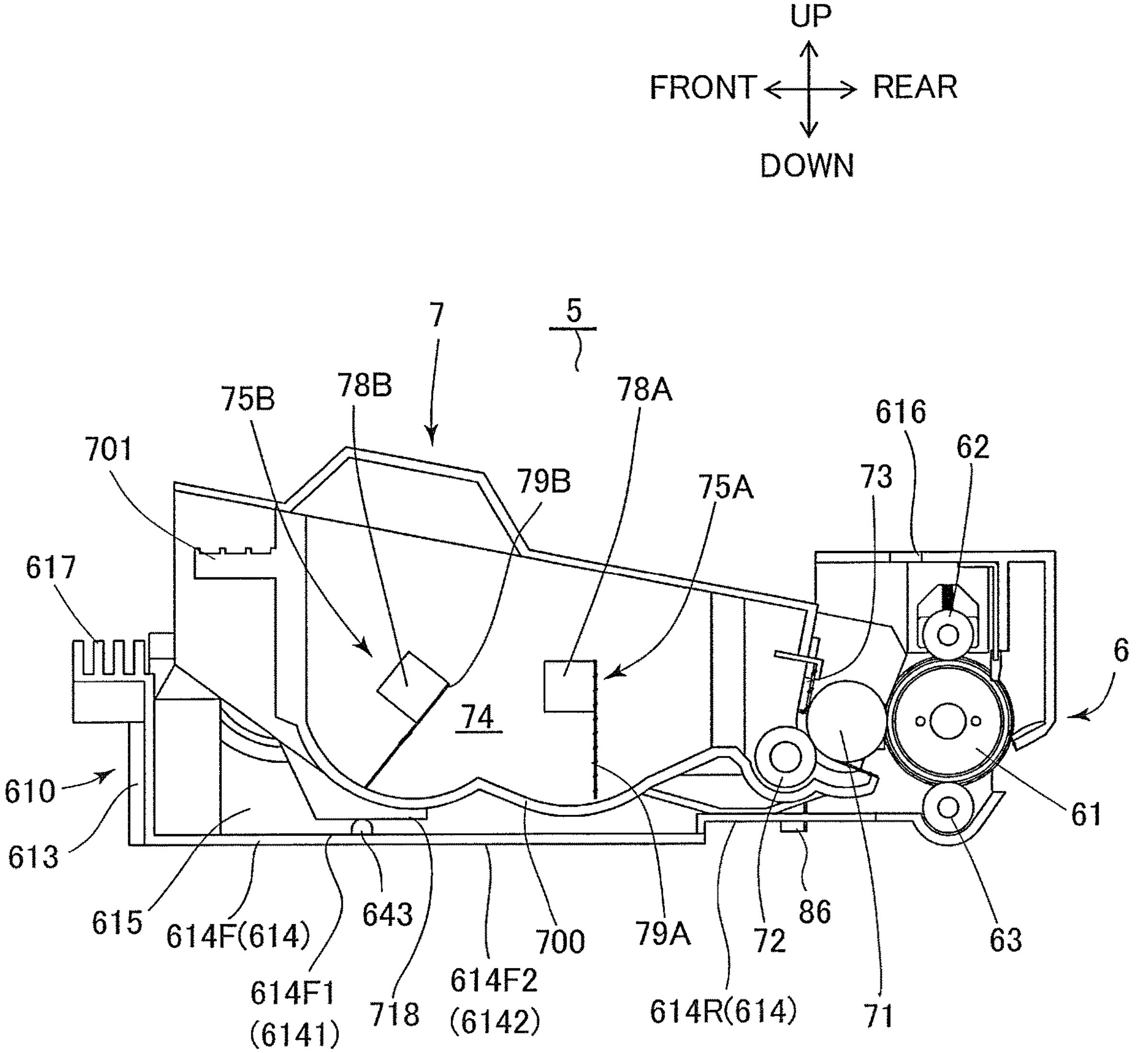
FIG. 9 is a cross-sectional view illustrating a process cartridge.

Here, as illustrated in FIG. 9, in the mounting portion 615, the bottom portion 614 is configured in such a manner that a forward side bottom portion 614F is lower than a rearward side bottom portion 614R closer to the photosensitive drum 61. The forward side bottom portion 614F forms a space portion that accommodates the toner storage portion 74 of the development unit 7 in the mounting portion 615, and a pair of left and right protruding portions 643 and 643 is formed on a top surface that faces a bottom surface of the development unit 7.

On the other hand, the rearward side bottom portion 614R closer to the photosensitive drum 61 than the forward side bottom portion 614F forms a space portion that accommodates the development roller 71 and the supply roller 72 in the mounting portion 615. According to this configuration, when being mounted on the drum unit 6, the development unit 7 enters a state of being inclined downward from the forward side to the rearward side in which the photosensitive drum 61 exists. In addition, a space is formed from the forward side bottom portion 614F, and in the casing 700, a portion that forms the toner storage portion 74 protrudes downward to enlarge toner storage capacity on an inner side.

Note that, on the rearward side of the frame 610, an outer surface of the left side wall 611 is provided with a first positioning protrusion 660 and a first guide rib 662 which protrude to an outer side in the axial direction, and the first positioning protrusion 660 is disposed rearward of the first guide rib 662. Similarly, an outer surface of the right side wall 612 of the frame 610 is provided with a second positioning protrusion 661 and a second guide rib 663 which protrude to an outer side in the axial direction, and the second positioning protrusion 661 is disposed rearward of the second guide rib 663. The first positioning protrusion 660 and the second positioning protrusion 661 are formed in a cylindrical shape, and the first guide rib 662 and the second guide rib 663 extend in a direction along a front-rear direction. The first positioning protrusion 660, the second positioning protrusion 661, the first guide rib 662, and the second guide rib 663 are guided to a guide portion (not illustrated) provided in the apparatus body 2 when the process cartridge 5 is mounted on the apparatus body 2, and guides the process cartridge 5 to a mounting position.

By the way, an operational lifespan of the development unit 7 which is determined by a toner amount stored in the development unit 7 is set to be shorter than an operational lifespan of the drum unit 6 which is determined by the thickness of a photosensitive layer of the photosensitive drum 61. Accordingly, it is preferable to replace only the development unit 7 that has reached the end of the operational lifespan separately from the drum unit 6 in consideration of the cost. In the case of replacing only the development unit 7, after opening the door 21 and taking out the process cartridge 5 from the inside of the apparatus body 2, only the development unit 7 is detached from the drum unit 6. In addition, a new development unit 7 is inserted in the mounting direction AD illustrated in FIG. 2 to assemble the development unit 7 to the drum unit 6.

Figure 10:
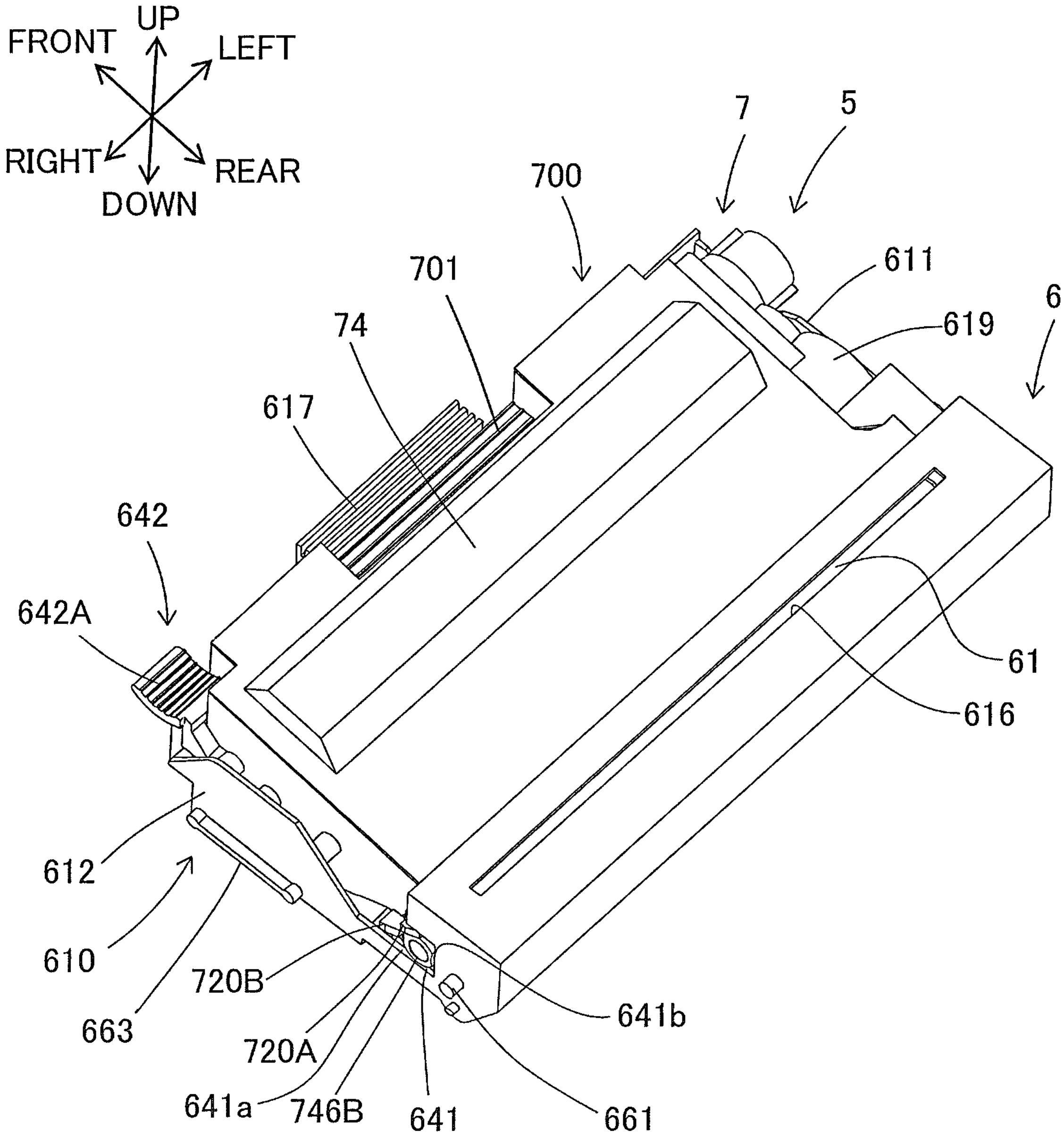
FIG. 10 is a perspective view illustrating the process cartridge.
Figure 11:
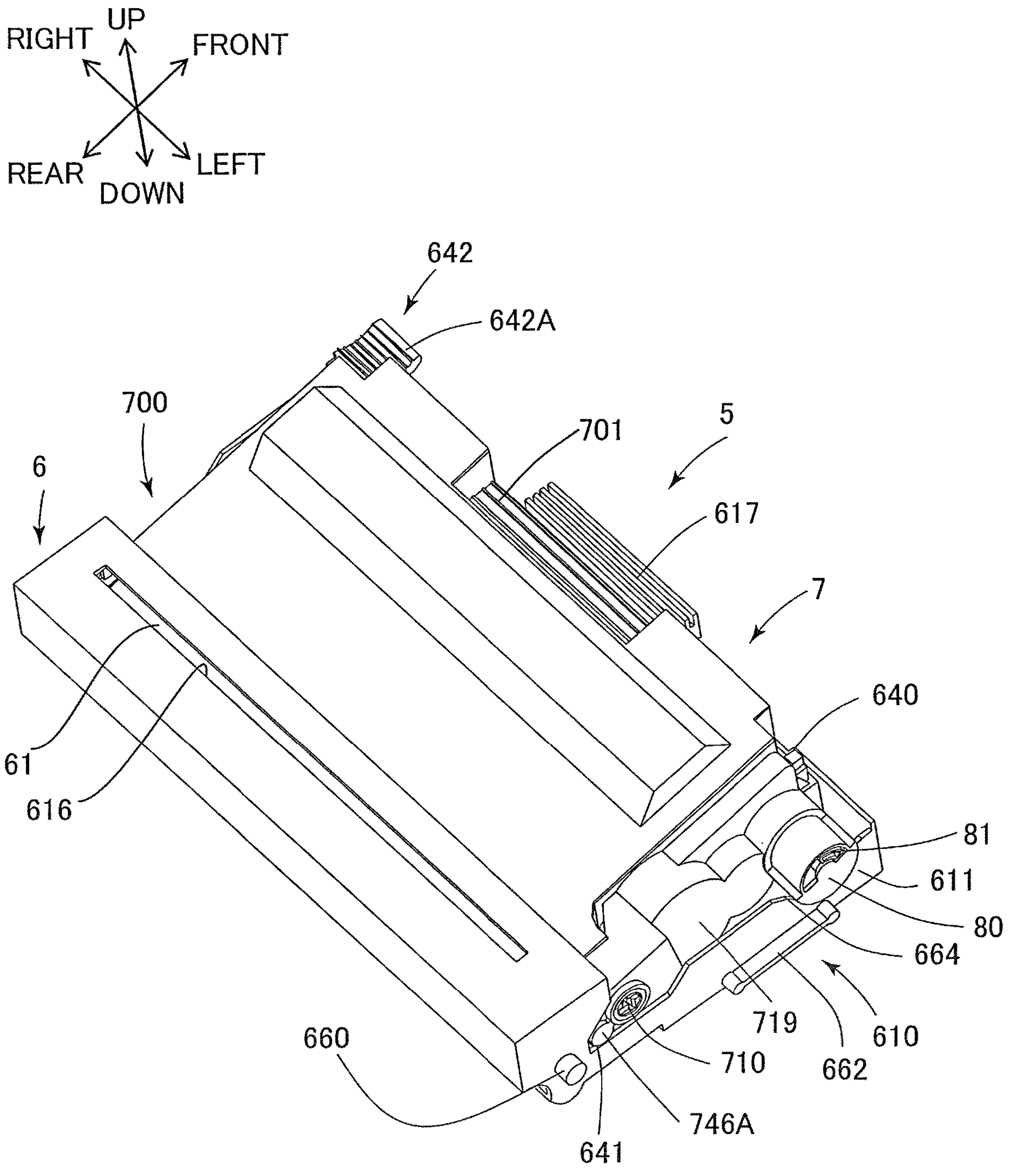
FIG. 11 is a perspective view illustrating the process cartridge.

Next, description will be given of a positioning configuration of the development unit 7 with respect to the drum unit 6 when the development unit 7 is assembled to the drum unit 6. First, description will be given of positioning of the development unit 7 with respect to the drum unit 6 in a front-rear direction. As illustrated in FIG. 2, FIG. 10, and FIG. 11, receiving portions 641 and 641 are respectively formed in the left side wall 611 and the right side wall 612 of the frame 610, and the receiving portions 641 are configured to come into contact with the bearings 746A and 746B of the development unit 7. Each of the receiving portions 641 is formed in an approximately U-shape of which a forward side is opened, and includes a lower surface 641*a* that extends in the front-rear direction and an abutting surface 641*b* that extends in a vertical direction (refer to FIG. 10).

Figure 12:
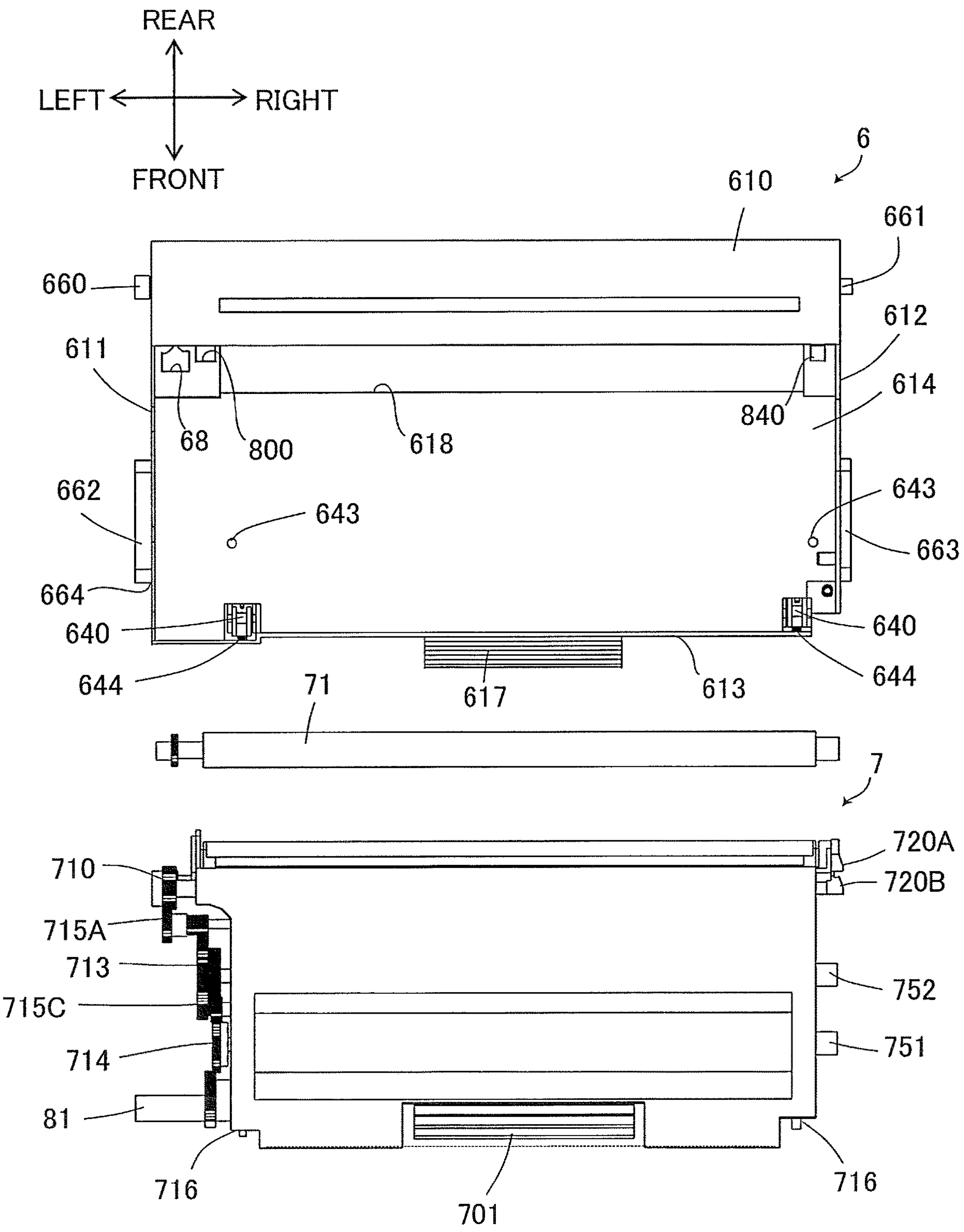
FIG. 12 is a plan view illustrating the drum unit and the development unit.
Figure 13A:
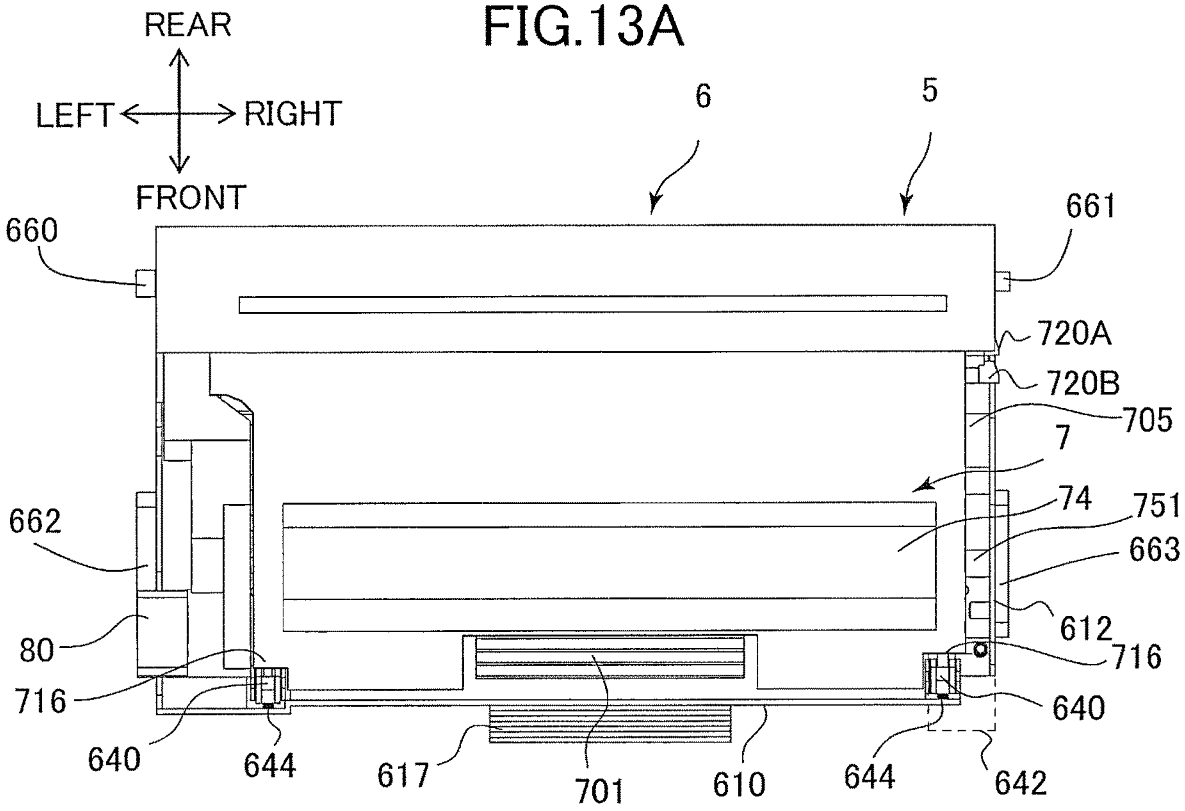
FIG. 13A is a plan view illustrating a pressing member and a lift member indicated by a broken line.
Figure 13B:
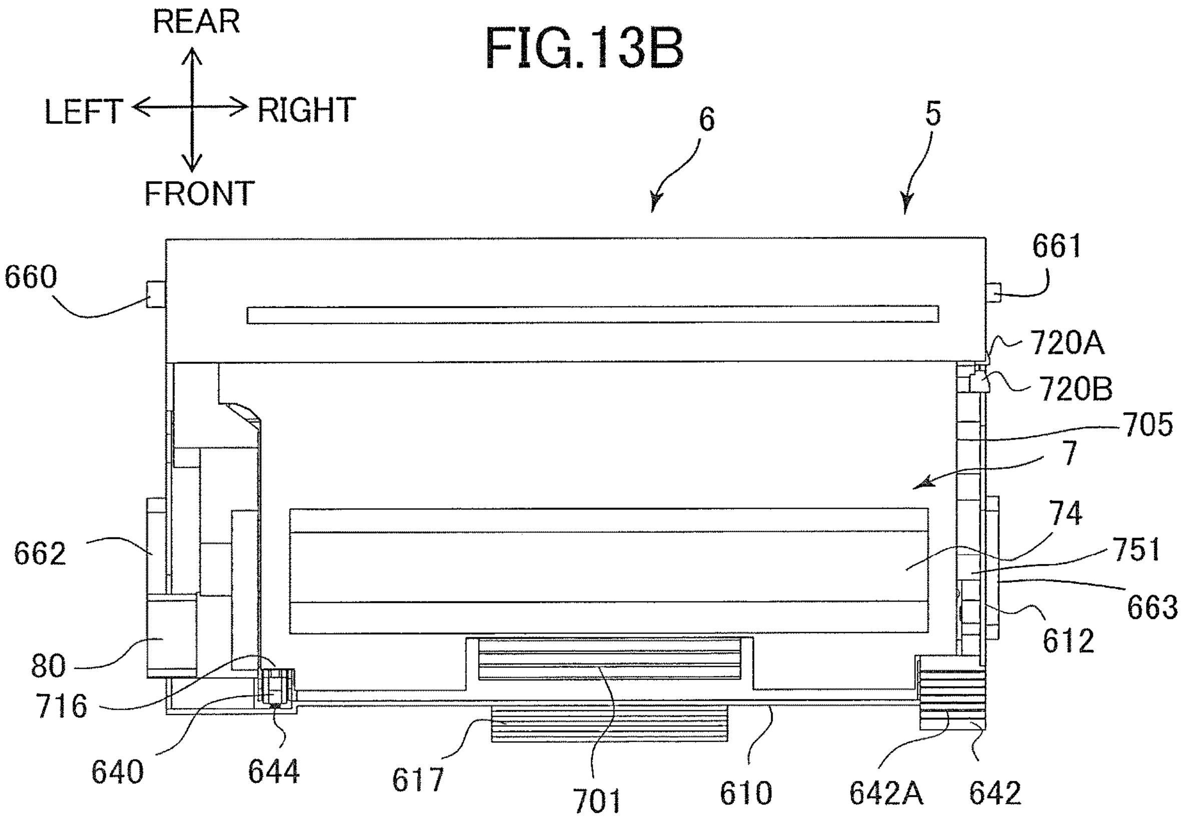
FIG. 13B is a plan view illustrating the pressing member and the lift member indicated by a solid line.

In addition, as illustrated in FIG. 12 to FIG. 13B, a pair of pressing members 640 and 640 is provided in a front portion of the frame 610 of the drum unit 6. The pressing members 640 are urged forward by the urging spring 644, and press a pair of ribs 716 to be pressed which is provided in the casing 700 of the development unit 7 in a state in which the development unit 7 is mounted on the drum unit 6.

Note that, as illustrated in FIG. 12, the pair of left and right ribs 716 to be pressed is provided in such a manner that the rib 716 to be pressed which is disposed on a right side is disposed rearward of the rib 716 to be pressed which is disposed on a left side. The reason for this is because a lift member 642 to be described later is disposed to overlap the right rib 716 to be pressed in the right-left direction as described in FIG. 13A and FIG. 13B, and the lift member 642 that is pivoted and the right rib 716 to be pressed do not interfere with each other. In this configuration, a rearward protrusion amount of the lift member 642 is suppressed, and thus it is possible to constitute the process cartridge 5 in a small size.

According to this configuration, when the development unit 7 is mounted on the drum unit 6 in the mounting direction AD as illustrated in FIG. 2, the bearings 746A and 746B of the development unit 7 are guided to the lower surfaces 641*a* of the receiving portions 641. In addition, when the development unit 7 is further mounted on the drum unit 6, the bearings 746A and 746B abut the abutting surfaces 641*b* of the receiving portions 641.

In this state, when a user separates a hand from the grip portion 701 of the development unit 7, the development unit 7 is supported by the protruding portions 643 and 643 formed on the bottom portion 614 of the drum unit 6 and is pressed forward by the pressing member 640. The bearings 746A and 746B of the development unit 7 are pressed against the abutting surfaces 641*b* due to an urging force of the urging spring 644 that presses the pressing member 640, and the development unit 7 is positioned with respect to the drum unit 6 in the front-rear direction. In addition, the development roller 71 of the development unit 7 is pressed against the photosensitive drum 61 due to the urging force of the urging spring 644.

Figure 14A:
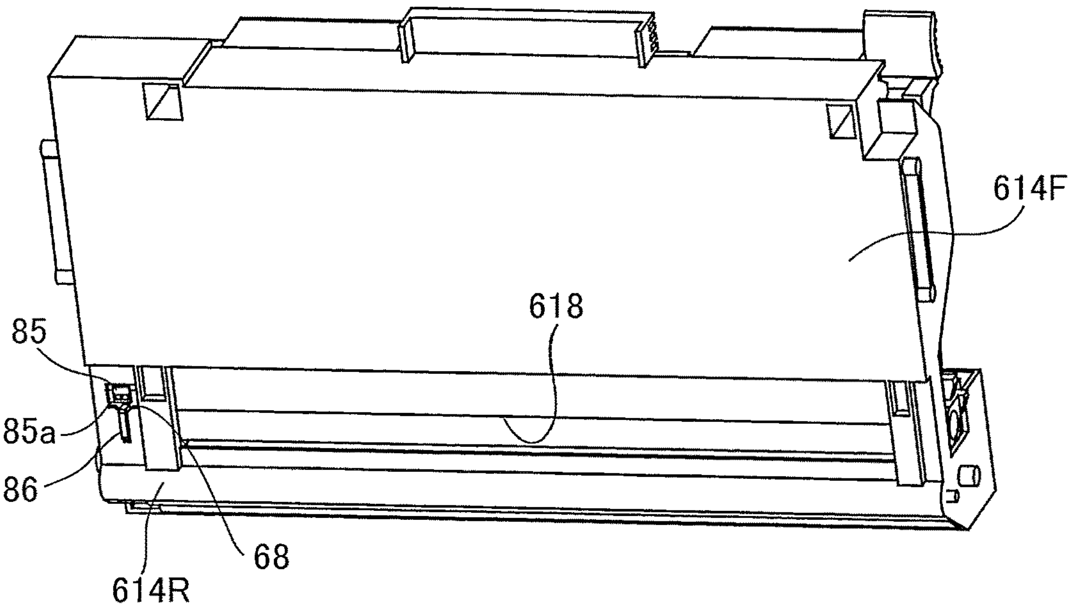
FIG. 14A is a bottom view of the drum unit.
Figure 14B:
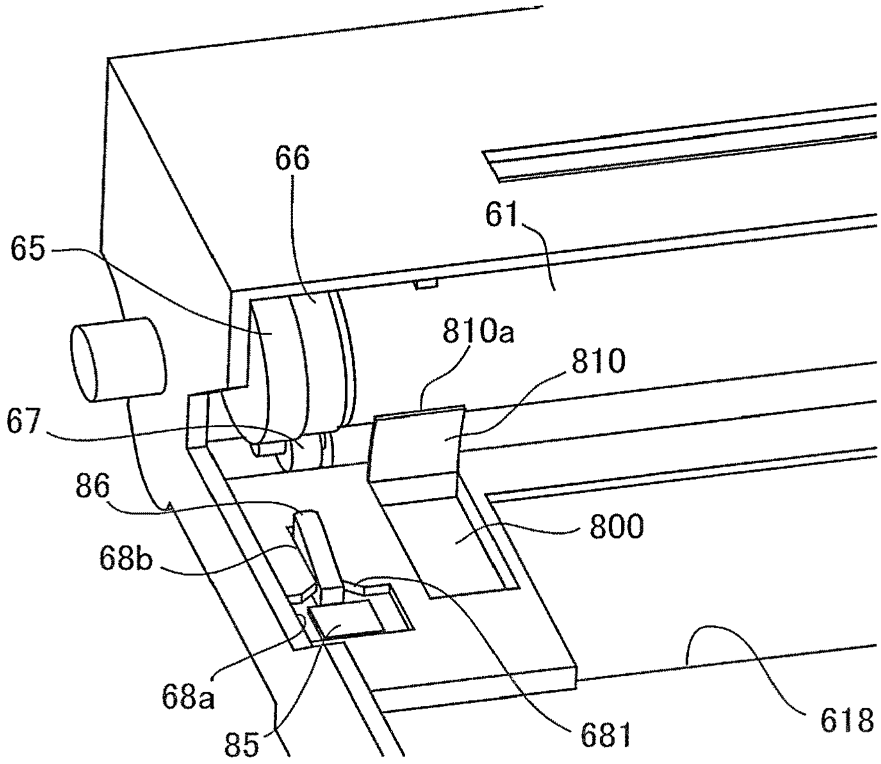
FIG. 14B is an enlarged view illustrating a rear-left end side of the drum unit.

Next, description will be given of a positioning mechanism of the development unit 7 with respect to the drum unit 6 in the right-left direction (a rotational axis direction of the photosensitive drum 61). As illustrated in FIG. 12, FIG. 14A, and FIG. 14B, a sheet passage hole 618 through which a sheet passes when being conveyed to the transfer nip N1 and an end portion through hole 68 are formed in the rearward side bottom portion 614R in the bottom portion 614 of the frame 610.

The end portion through hole 68 is provided in an end portion on one side of the photosensitive drum 61 in the rotational axis direction (in this embodiment, on a leftward side), and is formed by an electrode exposing hole 68*a* and a positioning hole 68*b*. Note that, a first photosensitive drum gear 65 and a second photosensitive drum gear 66 are provided in a left end portion of the photosensitive drum 61, and a transfer gear 67 that engages with the second photosensitive drum gear 66 is provided in a left end of the transfer roller 63. When the process cartridge 5 including the drum unit 6 is mounted on the apparatus body 2, a drive gear provided in the apparatus body 2 engages with the first photosensitive drum gear 65. In this state, when the drive gear rotates, the first photosensitive drum gear 65 is rotated by the drive gear, and the photosensitive drum 61 and the second photosensitive drum gear 66 rotate integrally with the first photosensitive drum gear 65. In addition, rotation of the second photosensitive drum gear 66 is transmitted to the transfer gear 67, and thus the transfer roller 63 rotates integrally with the transfer gear 67.

The electrode exposing hole 68*a* exposes the memory electrode 85*a* to a downward side of the drum unit 6 in a state in which the development unit 7 is mounted on the drum unit 6, and enables the memory electrode 85*a* to come into contact with an electrode (not illustrated) provided in the apparatus body 2. The positioning hole 68*b* is formed on a rearward side of the electrode exposing hole 68*a* to be continuous with the electrode exposing hole 68*a*, and is a slit-shaped hole having dimensions smaller than those of the electrode exposing hole 68*a* in the right-left direction. The positioning protrusion 86 engages with the positioning hole 68*b* in a state in which the development unit 7 is mounted on the drum unit 6, and a position of the development unit 7 in the right-left direction is determined at the time of the engagement of the positioning protrusion 86.

Note that, a connection portion between the electrode exposing hole 68*a* and the positioning hole 68*b* is formed by a tapered surface 681 of which a width becomes narrower as it approaches the positioning hole 68*b* so as to guide the positioning protrusion 86 to the positioning hole 68*b*. In addition, as described above, the positioning protrusion 86 and the positioning hole 68*b* are provided downstream of the memory electrode 85*a* and the electrode exposing hole 68*a* in the mounting direction AD. According to this, when mounting the development unit 7 on the drum unit 6, the memory electrode 85*a* is not brought into contact with the drum unit 6. Accordingly, usability when mounting the development unit 7 on the drum unit 8 is improved, and breakage of the memory electrode 85*a* is reduced. In addition, since the electrode exposing hole 68*a* is provided closer to the positioning hole 68*b*, positioning accuracy between the memory electrode 85*a* and the electrode exposing hole 68*a* is raised. In addition, the positioning protrusion 86 is guided to the positioning hole 68*b* through the electrode exposing hole 68*a*, and can easily engage with the positioning hole 68*b*.

Development Unit Detachment Configuration

Figure 15:
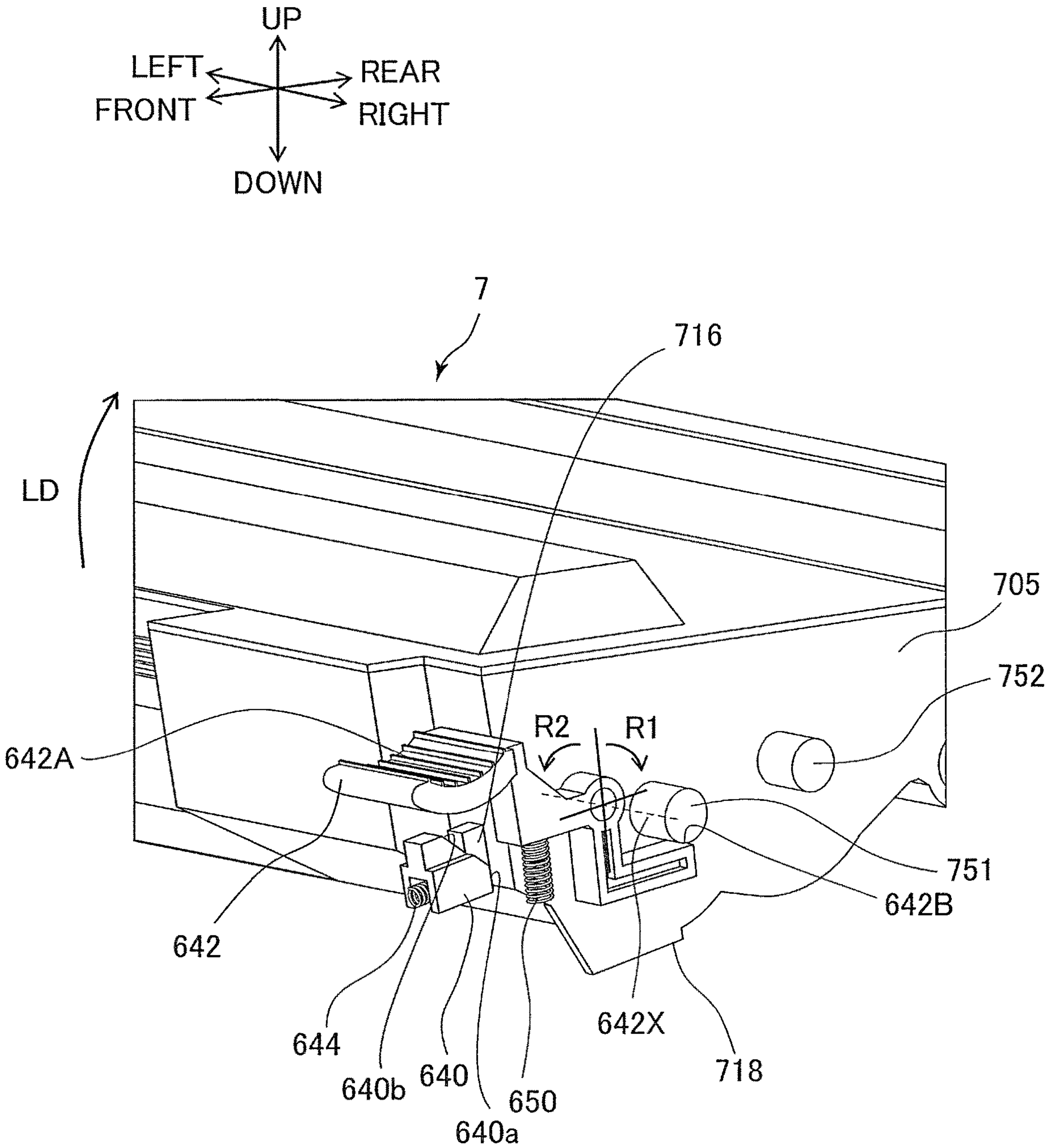
FIG. 15 is a perspective view illustrating the pressing member and the lift member.

Next, a configuration for detaching the development unit 7 from the drum unit 6 will be described. In FIG. 13A, the lift member 642 illustrated in FIG. 13B is indicated by a broken line. As illustrated in FIG. 13A and FIG. 13B, the lift member 642 is provided in a leading edge portion and a right edge portion of the drum unit 6, and the lift member 642 is supported to the right side wall 612 of the drum unit 6 to be rotatable around the rotational axis 642X as illustrated in FIG. 15. The rotational axis 642X extends in parallel to the rotational axis direction of the photosensitive drum 61 and the development roller 71. The lift member 642 is urged by a compression spring 650 to rotate in a direction indicated by an arrow R1, and when an operation portion 642A provided in a first end portion of the lift member 642 is pressed downward, the lift member 642 rotates against an urging force of the compression spring 650 in a direction indicated by an arrow R2.

A cylindrical protruding portion 751 that protrudes to a rightward side is provided in the right side wall 705 of the development unit 7, and a contact portion 642B that can come into contact with the protruding portion 751 is provided in a second end portion of the lift member 642. The contact portion 642B is provided on a side opposite to the operation portion 642A with the rotational axis 642X interposed therebetween.

Figure 16A:
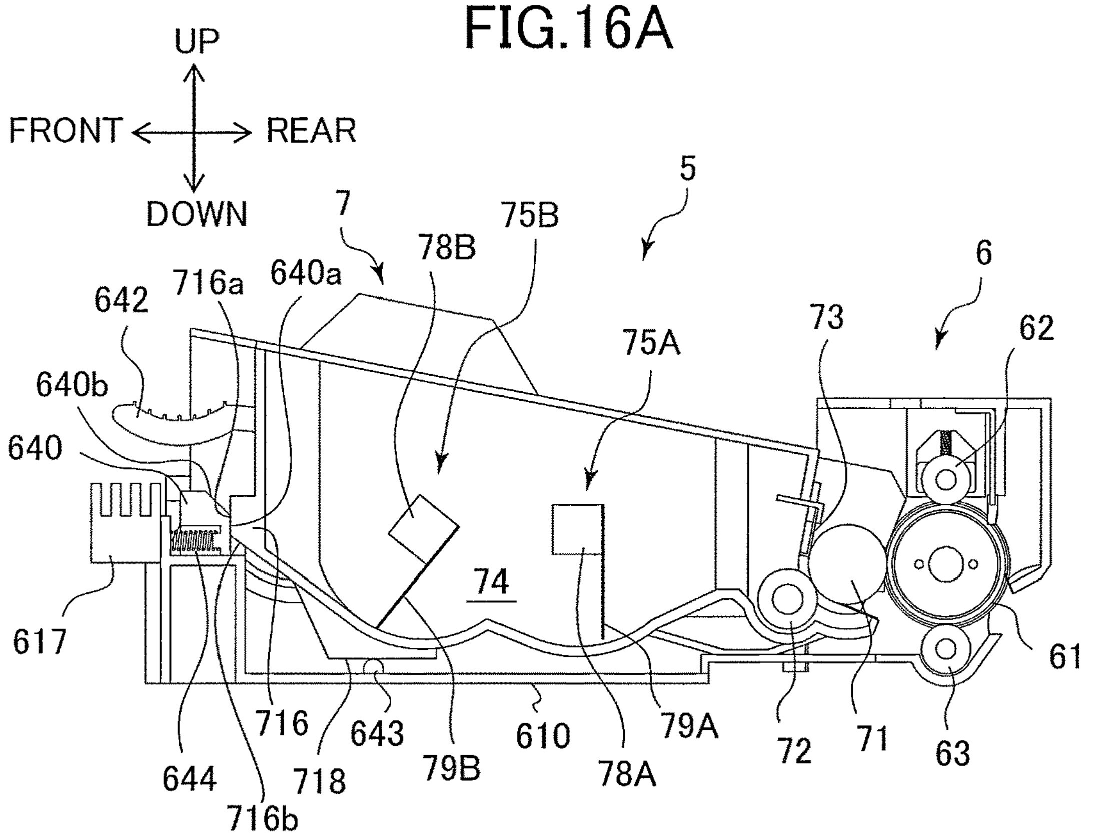
FIG. 16A is a cross-sectional view illustrating a state in which the development unit is mounted on the drum unit.
Figure 16B:
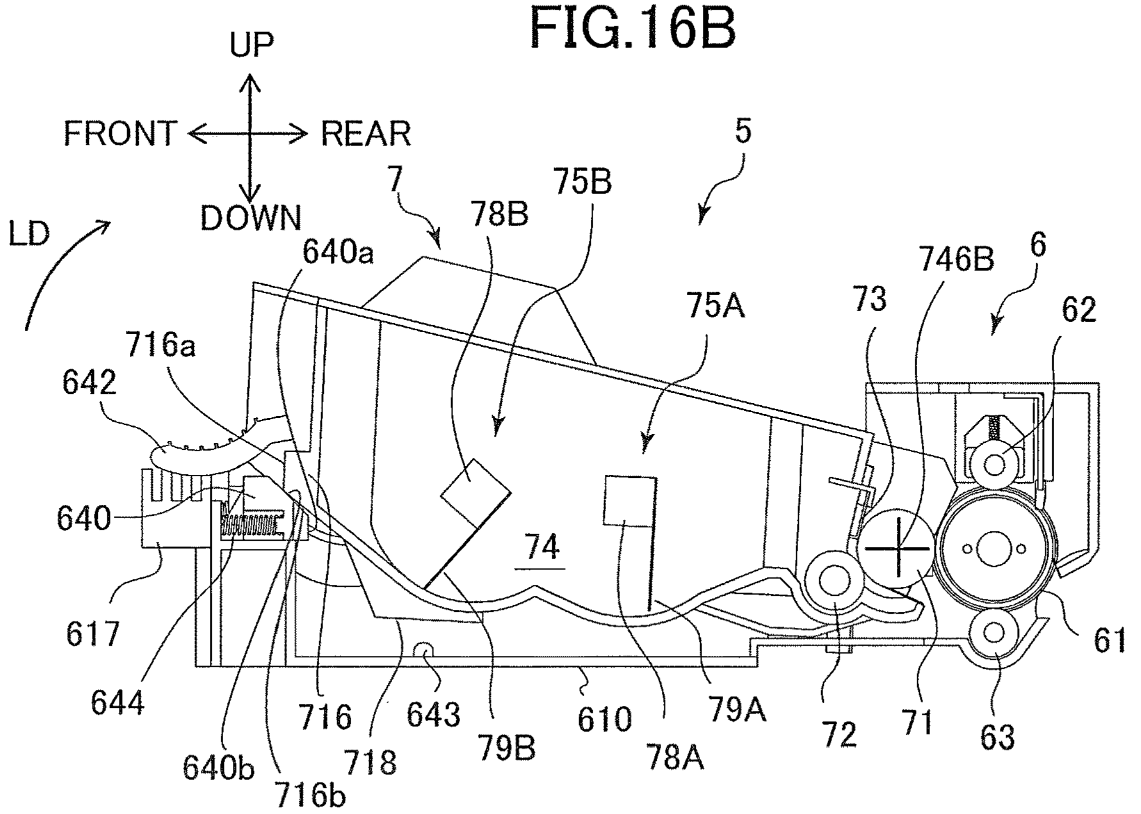
FIG. 16B is a cross-sectional view illustrating the development unit that enters a lift-up state by the lift member.

By the way, as illustrated in FIG. 15 to FIG. 16B, the pressing member 640 includes a pressing surface 640*a* that is provided on a front surface of the pressing member 640 and extends in a vertical direction, and an inclined surface 640*b* that is inclined upward from an upper end of the pressing surface 640*a* to a rearward side. The portion 716 to be pressed in the development unit 7 includes a surface 716*a* to be pressed which is pressed forward by the pressing surface 640*a*, and an inclined surface 716*b* that is inclined downward from a lower end of the surface 716*a* to be pressed toward a forward side.

As illustrated in FIG. 16A, in a state in which the development unit 7 is mounted on the drum unit 6, the pressing surface 640*a* of the pressing member 640 that is urged by the urging spring 644 presses the surface 716*a* to be pressed in the portion 716 to be pressed in the development unit 7. At this time, the pressing surface 640*a* to be pressed and the surface 716*a* to be pressed extend in a substantially vertical direction, and thus an urging force of the urging spring 644 vertically operates on the surface 716*a* to be pressed, and the development unit 7 is urged to the front direction. According to this, the development unit 7 is locked at a mounting position so as not to be detached from the drum unit 6.

As illustrated in FIG. 15, when the operation portion 642A of the lift member 642 is pressed downward, the lift member 642 rotates in a direction indicated by an arrow R2, and the contact portion 642B of the lift member 642 lifts up the protruding portion 751 of the development unit 7 to an upward side. According to this, as illustrated in FIG. 16B, a front direction side of the development unit 7 mounted on the drum unit 6 pivots upward, and the development unit 7 pivots in a detachment direction LD from the mounting position. According to this, the surface 716*a* to be pressed in the development unit 7 is separated upward from the pressing surface 640*a*, and the inclined surface 716*b* of the development unit 7 rides on the inclined surface 640*b* of the pressing member 640.

At this time, the bearings 746A and 746B of the development unit 7 are in a state of being supported by the receiving portions 641 and 641. A state of the development unit 7 at this time is referred to as a lift-up state. When the development unit 7 is in the lift-up state, the inclined surfaces 640*b* and 716*b* are inclined with respect to the front direction that is an urging direction of the pressing member 640. That is, when the development unit 7 is pivoted in the detachment direction LD by the lift member 642, the surface 716*a* to be pressed in the development unit 7 is separated upward from the pressing surface 640*a*. In this case, the inclined surface 716*b* of the development unit 7 can be lifted upward by the inclined surface 640*b* of the pressing member 640 that is urged forward by the urging spring 644, and thus the development unit 7 further pivots in the detachment direction LD by the urging force of the urging spring 644. According to this, it is possible to reduce an operation force for setting the development unit 7 to the lift-up state.

When the development unit 7 enters the lift-up state, most of the forward urging force of the urging spring 644 is converted as a substantially upward force by the inclined surfaces 640*b* and 716*b*, and thus the development unit 7 is not locked to the drum unit 6. According to this, a user can detach the development unit 7 from the drum unit 6 only by lifting up the grip portion 701 of the development unit 7 without moving other members or the like. In this manner, the user can mount a new development unit 7 on the drum unit 6 after detaching the drum unit 6 from the development unit 7.

Collection Recessed Portion

Figure 17A:
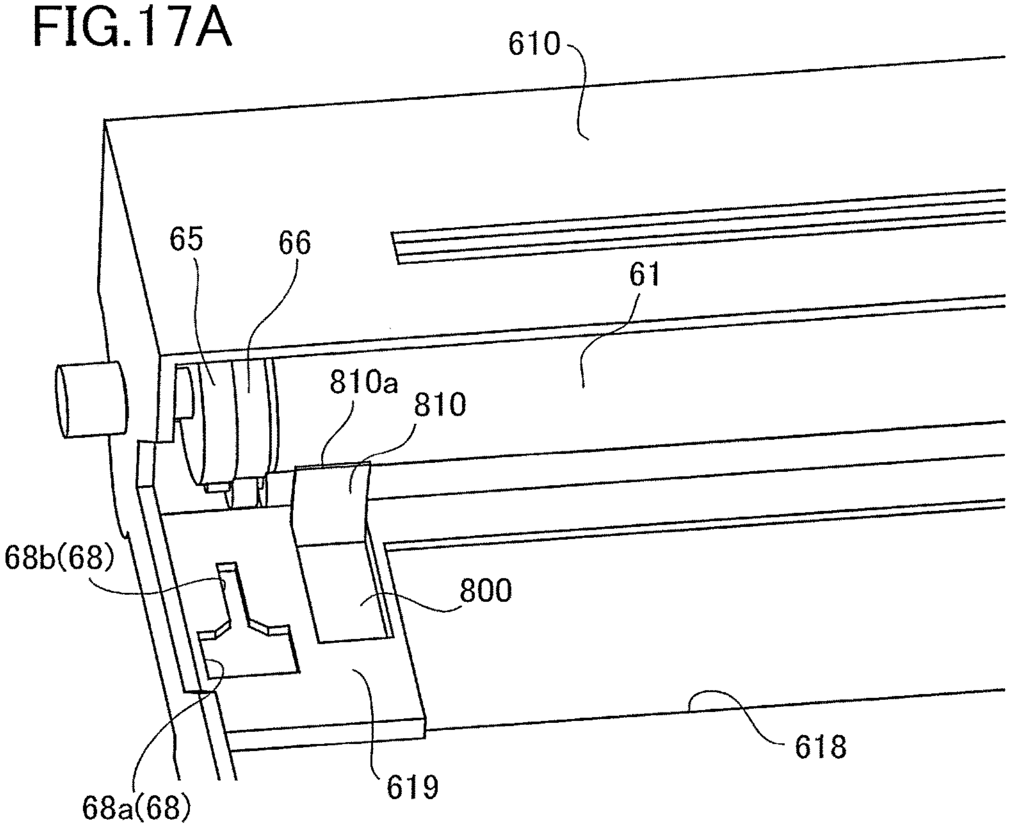
FIG. 17A is an enlarged view illustrating a rear-left end side of the drum unit.
Figure 17B:
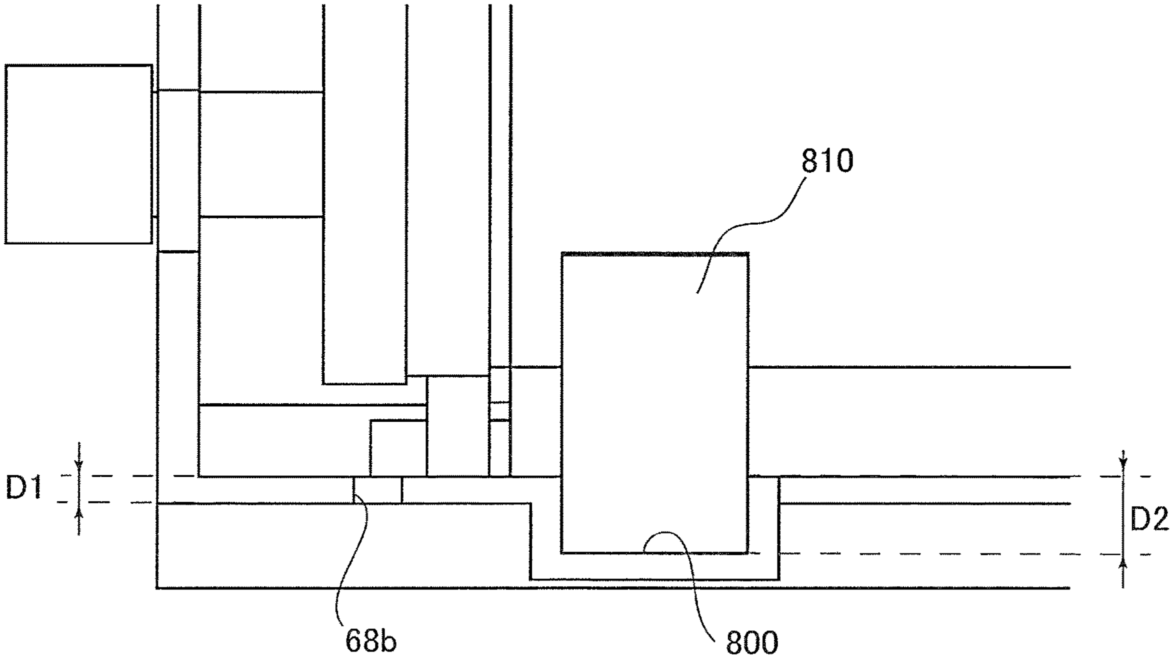
FIG. 17B is a cross-sectional view of a collection recessed portion.

Next, a configuration of a collection recessed portion 800 and a sheet member 810 will be described with reference to FIG. 17A and FIG. 17B. As illustrated in FIG. 17A, in the frame 610 of the drum unit 6, a bridge portion 619 is provided between the end portion through hole 68 and the sheet passage hole 618 on the first end side (in this embodiment, a leftward side) in the rotational axis direction of the photosensitive drum 61. The collection recessed portion 800 is provided in the bridge portion 619, and the sheet member 810 serving as a cleaning member is provided at an end portion of the collection recessed portion 800 on the photosensitive drum 61 side.

The sheet member 810 is provided to be erected from the frame 610 toward the photosensitive drum 61, and a tip end portion 810*a* thereof comes into contact with the photosensitive drum 61. More specifically, the sheet member 810 is in contact with the photosensitive drum 61 at a region between a development nip portion and the transfer nip in a circumferential direction of the photosensitive drum 61 and at an end portion that deviates outward from an image forming region of the photosensitive drum 61 in an axial direction, and scraps off an unnecessary toner and foreign matters such as paper dust which adhere to a surface of the photosensitive drum 61 at the time of forming images with a tip end portion 810*a*.

In addition, in a perpendicular direction (front-rear direction) perpendicular to the rotational axis direction of the photosensitive drum 61, the collection recessed portion 800 is located on a forward side of the sheet member 810, and on a downward side of the tip end portion 810*a* of the sheet member 810. The tip end portion 810*a* of the sheet member 810 comes into contact with the surface of the photosensitive drum 61 in a state of opposing the rotation direction of the photosensitive drum 61, and thus the foreign matters which are scrapped off by the sheet member 810 are dropped and collected in the collection recessed portion 800.

In addition, the collection recessed portion 800 is provided in the bridge portion 619 that is interposed between the end portion through hole 68 and the sheet passage hole 618 and strength is lowered in the frame 610 of the drum unit 6, and thus it is possible to improve the strength of the frame 610. That is, the collection recessed portion 800 is provided at a position of overlapping the electrode exposing hole 68*a*, the positioning hole 68*b*, and the sheet passage hole 618 in a perpendicular direction when viewed from the rotational axis direction of the photosensitive drum 61 in adjacent to the holes 68*a*, 68*b*, and 618.

According to this, the collection recessed portion 800 also operates as a rib that reinforces the bridge portion 619, and improves the strength of the frame 610 in the bridge portion 619. Particularly, as illustrated in FIG. 17B, the collection recessed portion 800 has a configuration in which the depth (a position of an upper surface of a bottom portion) D2 is larger than the depth D1 of the positioning hole 68*b* (D2>D1) so as to enhance the reinforcement effect. Accordingly, the strength of the frame 610 at the periphery of the positioning hole 68*b* is improved, and according to this, deformation of the frame 610 decreases. As a result, it is possible to improve positioning accuracy in the right-left direction of the development unit 7.

Note that, as illustrated in FIG. 2, with regard to the frame 610 of the drum unit 6, even in the second end in the rotational axis direction of the photosensitive drum 61 (in this embodiment, a rightward direction side), a box-shaped collection recessed portion 830 and a sheet member 840 are provided as in the collection recessed portion 800. The sheet member 840 is provided to be erected from the frame 610 toward the photosensitive drum 61, and a tip end thereof is brought into contact with the photosensitive drum 61. More specifically, the sheet member 840 is in contact with the photosensitive drum 61 at an end portion that deviates outward from the image forming region of the photosensitive drum 61 in the axial direction, and scraps off an unnecessary toner and foreign matters such as paper dust which adhere to a surface of the photosensitive drum 61 at the time of forming images with a tip end portion.

In addition, the collection recessed portion 830 is located on a forward side of the sheet member 840 in a perpendicular direction that is perpendicular to the rotational axis direction of the photosensitive drum 61, and thus the foreign matters which are scrapped off by the sheet member 840 are dripped and collected in the collection recessed portion 830.

Summary of First Embodiment

As described above, there is provided with a cartridge (5) that is detachably mounted on an apparatus body (2) of an image forming apparatus (1), the cartridge (5) including:

- a drum unit (6) including a photosensitive drum (61) and a frame (610) that rotatably supports the photosensitive drum (61); and
- a development unit (7) configured to be detachably mounted on the drum unit (6), the development unit (7) including a development roller (71) that supplies a toner to the photosensitive drum (61), and a memory (85) that stores information,
- in which the drum unit (6) includes a cleaning member (810) that comes into contact with an end portion of the photosensitive drum (61) in a rotational axis direction to clean the photosensitive drum (61),
- the frame (610) includes an exposing hole (68*a*) through which the memory (85) is exposed from the frame (610), and a recessed portion (800) that is adjacent to the exposing hole (68*a*) in the rotational axis direction of the photosensitive drum (61), and
- the recessed portion (800) is provided in such a manner that at least a part overlaps the cleaning member (810) in the rotational axis direction when viewed from a direction perpendicular to the rotational axis direction, and is recessed in a direction away from the cleaning member (810).

As described above, in the frame 610 of the drum unit 6, the recessed portion 800 is provided in adjacent to the exposing hole 68*a* in the rotational axis direction of the photosensitive drum 61. According to this, even when forming the exposing hole 68*a*, it is possible to improve the strength of the frame 610 of the drum unit 6. The recessed portion 800 is provided in such a manner that at least a part overlaps the cleaning member 810 in the rotational axis direction when viewed from a direction perpendicular to the rotational axis direction of the photosensitive drum 61. According to this, it is possible to collect the foreign substance such as a surplus toner and paper dust which are recovered into the recessed portion 800 by the cleaning member 810.

In addition,

- the development unit (7) includes a protrusion (86) that extends toward the drum unit (6),
- the frame (610) includes a positioning hole (68*b*) that engages with the protrusion (86) so that a position of the development unit (7) with respect to the drum unit (6) in the rotational axis direction is determined, and
- the recessed portion (800) is adjacent to the positioning hole (68*b*) in the rotational axis direction. In this manner, since the recessed portion 800 is provided in adjacent to the positioning hole 68*b* in the rotational axis direction, it is possible to raise the strength of the frame 610 at the periphery of the positioning hole 68*b*. In addition, according to this, distortion of the frame at the periphery of the positioning hole 68*b* is suppressed, and thus it is possible to perform positioning of the development unit 7 with respect to the drum unit 6 with high accuracy.

The positioning hole (68*b*) is positioned between the exposing hole (68*a*) and the photosensitive drum (61) in a direction perpendicular to the rotational axis direction and communicates with the exposing hole (68*a*). According to this, the exposing hole 68*a* is disposed closer to the positioning hole 68*b*, and it is possible to perform positioning of the exposing hole 68*b* and the memory 85 with high accuracy.

As described above, a process cartridge (5) according to this embodiment includes:

a drum unit (6) that includes a photosensitive drum (61); and a development unit (7) that includes a development roller (71) that supplies a toner to the photosensitive drum (61) to develop a toner image, and is configured to be detachably mounted on the drum unit (6), in which the development unit (7) includes, a memory (85) that stores information on the development unit (7), and a positioning protrusion (86) that performs positioning of the development unit (7) with respect to the drum unit (6) in the rotational axis direction of the photosensitive drum (61), the drum unit (6) includes a frame (610) including a positioning hole (68*b*) with which the positioning protrusion (86) engages and a recessed portion (800) on a first end side of the photosensitive drum (61) in the rotational axis direction, and the recessed portion (800) is provided at a position of overlapping the positioning hole (68*b*) in a direction perpendicular to the rotational axis direction when viewed from the rotational axis direction of the photosensitive drum (61).

As described above, when the recessed portion 800 is provided at a position of overlapping the positioning hole 68*b* in a direction perpendicular to the rotational axis direction when viewed from the rotational axis direction of the photosensitive drum 61, the strength of the vicinity of the positioning hole 68*b* of the drum unit 6 is raised. In addition, according to this, it is possible to improve positioning accuracy by the positioning protrusion 86 of the development unit 7 and the positioning hole 68*b* of the drum unit 6 in the right-left direction of the both units. In addition, as a result, it is possible to bring the memory electrode 85*a* of the development unit 7 into contact with the electrode on the apparatus body 2 side with high accuracy.

In addition, the depth (D2) of the recessed portion (800) is set to be larger than the depth (D1) of the positioning hole (68*b*) (D2>D1). According to this, it is possible to enhance the reinforcement effect for the frame 610 by the recessed portion 800.

In addition, the drum unit (6) includes a cleaning member (810) of which a tip end portion (810*a*) comes into contact with the photosensitive drum (61).

The recessed portion (800) is provided at a position of overlapping the cleaning member (810) in the rotational axis direction of the photosensitive drum (61) when viewed from a direction perpendicular to the rotational axis direction. According to this, it is possible to collect the surplus toner and the foreign matters such as the paper dust which are scrapped off from the surface of the photosensitive drum 61 by the cleaning member 810 in the recessed portion 800, and it is possible to prevent the foreign substance from being scattered. As a result, it is possible to prevent occurrence of image defects due to contamination of the process cartridge 5 by the foreign matters, or dropping of the foreign matters to the sheet S. In addition, since the recessed portion 800 is used for both the reinforcement of the frame 610 of the drum unit 6 and the collection of the foreign matters, it is not necessary to provide a configuration of collection of the foreign matters separately from the recessed portion 800, and thus it is possible to realize a reduction in size and simplification of a configuration in the cartridge.

In addition, a frame (610) of the drum unit (6) includes an electrode exposing hole (68*a*) through which the electrode (85*a*) of the memory (85) is exposed, and the positioning hole (68*b*) is formed to be located downstream of the electrode exposing hole (68*a*) in the mounting direction of the development unit (7) with respect to the drum unit (6), and to communicate with the positioning hole (68*b*). According to this, when mounting the development unit 7 to the drum unit 6, it is possible to guide the positioning protrusion 86 to the positioning hole 68*b* through the electrode exposing hole 68*a*. In addition, since the electrode exposing hole 68*a* is disposed adjacent to the positioning hole 68*b*, it is possible to perform positioning of the memory electrode 85*a* with high accuracy.

Second Embodiment

Next, a configuration of a process cartridge 5 according to a second embodiment will be described with reference to FIG. 18 to FIG. 24. Note that, in the following description, only portions different from the first embodiment will be described, and the same names and reference numerals will be given to the other portions, and description thereof will be omitted.

Figure 18:
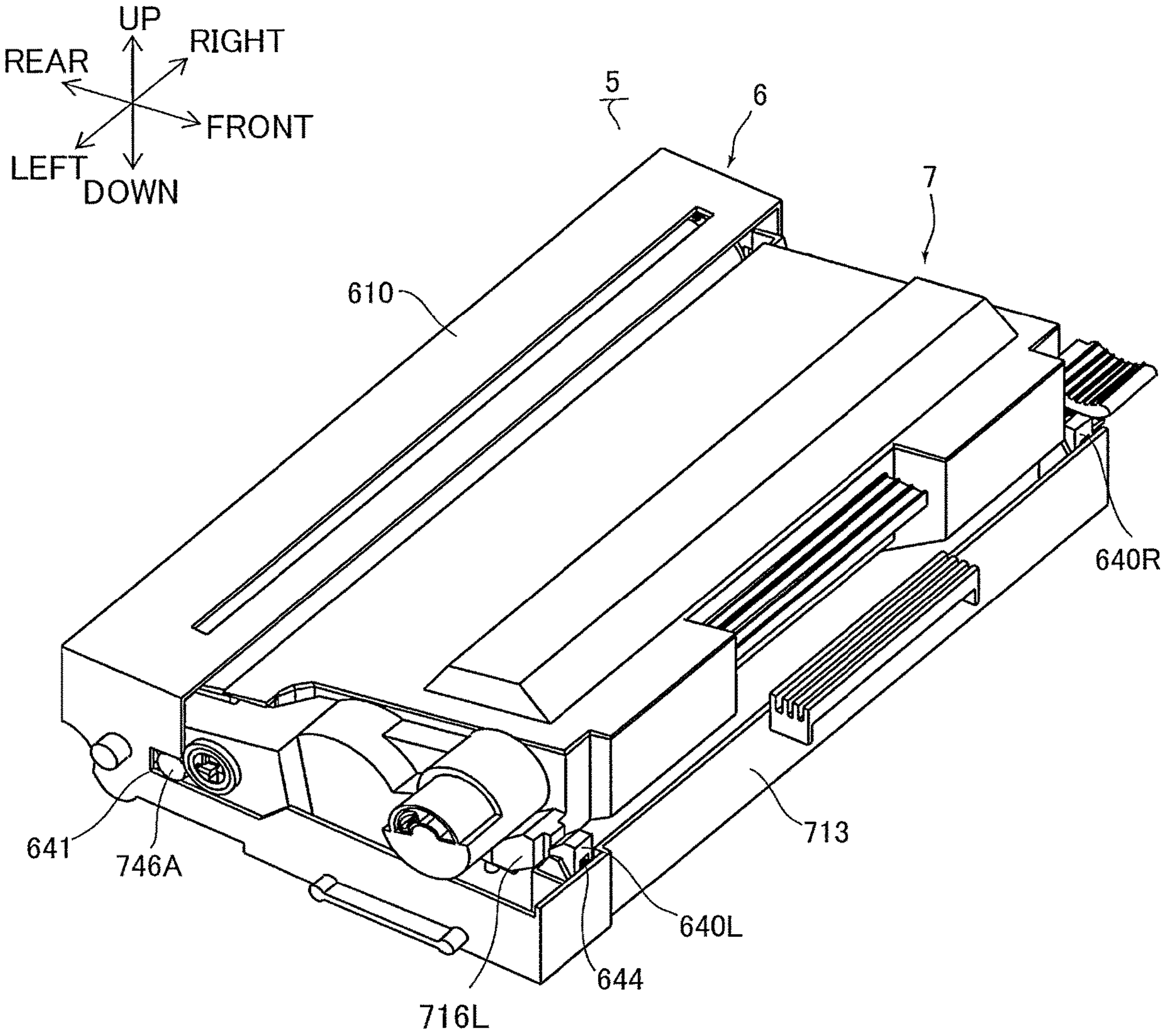
FIG. 18 is a perspective view illustrating a process cartridge according to a second embodiment.
Figure 19:
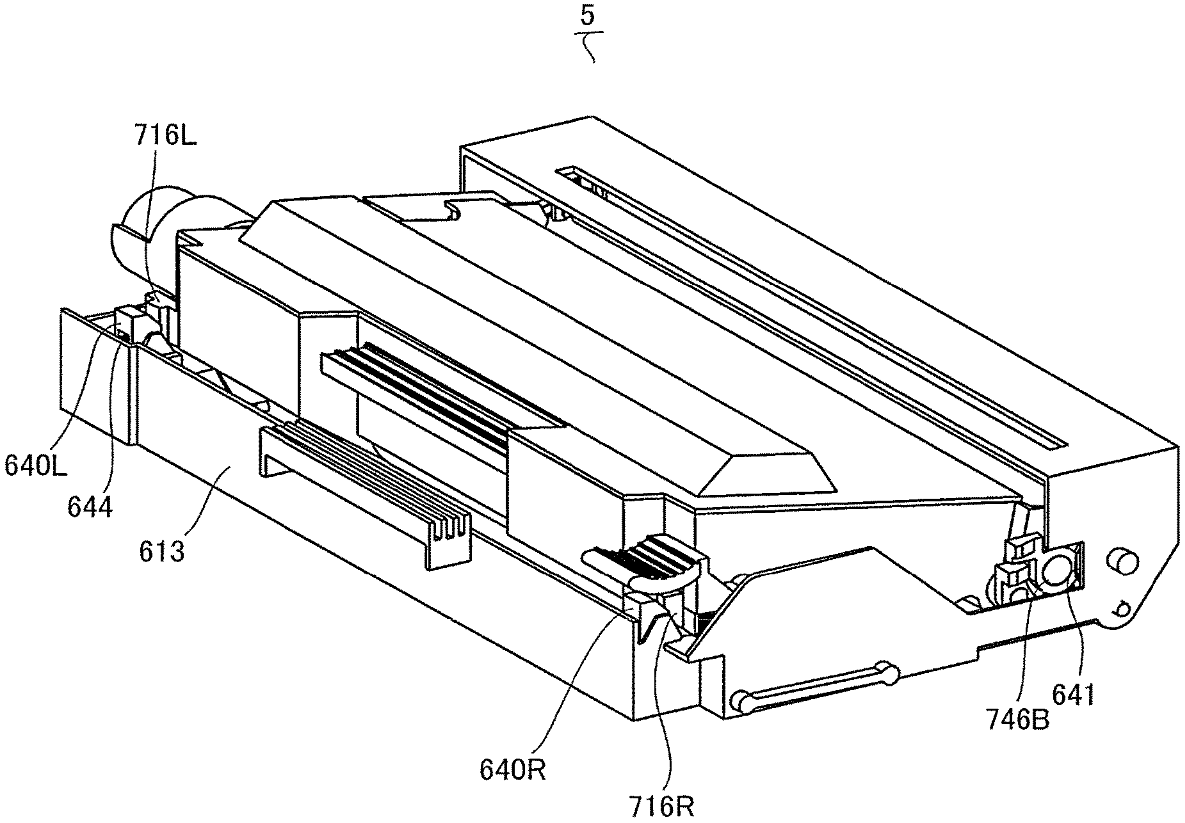
FIG. 19 is a perspective view illustrating the process cartridge.
Figure 20:
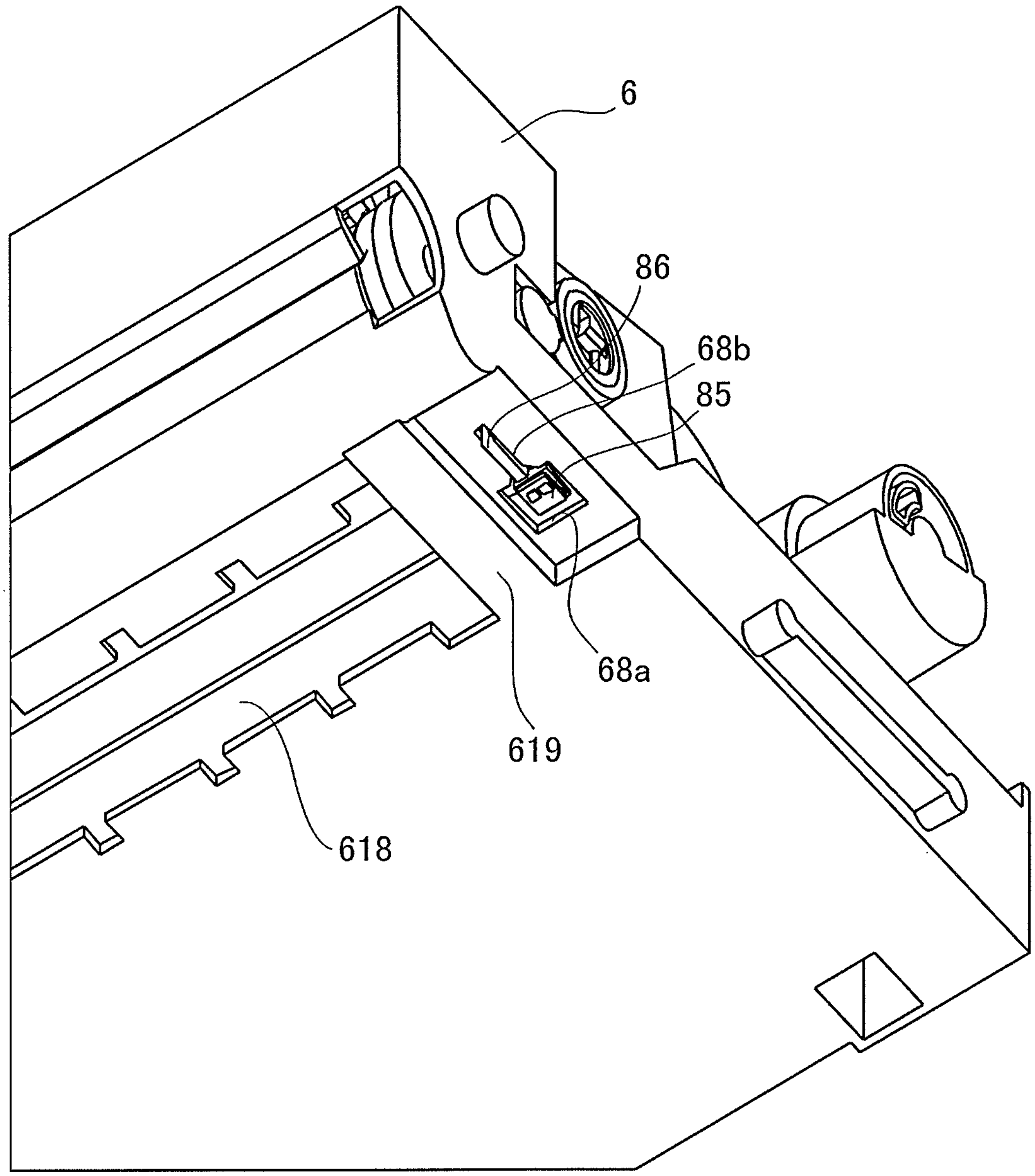
FIG. 20 is a bottom view of the process cartridge.

FIG. 18 to FIG. 20 illustrate a state in which the development unit 7 is mounted on the drum unit 6. In this mounting state, as described above, in the development unit 7, the bearings 746A and 746B engage with the receiving portions (groove portions) 641 and 641 of the drum unit 6, and thus positioning of the development unit 7 with respect to the drum unit 6 in a front-rear direction is performed. That is, in this state, the bearings 746A and 746B become a protrusion to be positioned, which serves as a portion to be positioned, and the bearings 746A and 746B are located on a rearward side of the development unit 7.

In addition, in the development unit 7, with regard to a longitudinal direction (the axis direction of the photosensitive drum 61), the positioning protrusion 86 engages with the positioning hole 68*b* of the drum unit 6, and positioning thereof is performed, and the positioning protrusion 86 is also provided on a rearward side of the development unit 7. In addition, the memory 85 that stores information on the development unit 7 is provided on the rearward side of the development unit 7.

As described above, in the development unit 7, the positioning portions 746A, 746B, and 86 which perform positioning of a relative position of the development unit 7 with respect to the drum unit 6 are provided on a rearward side closer to the photosensitive drum 61. In addition, according to this, positioning accuracy of the development roller 71 with respect to the photosensitive drum 61 is improved. In addition, in the development unit 7, the memory 85 is provided closer to the positioning portions 746A, 746B, and 86 to improve positioning accuracy of the memory 85 with respect to the drum unit 6 and the apparatus body 2.

By the way, the development unit 7 is pressed toward the photosensitive drum 61 by the pressing members 640L and 640R so that positioning of the development unit 7 is performed with respect to the drum unit 6, and the development roller 71 reliably comes into contact with the photosensitive drum 61. More specifically, in the development unit 7, the portions 716 and 716 to be pressed are respectively provided in both ends of a leading edge portion in a longitudinal direction thereof, and the portions 716 and 716 to be pressed are pressed by the corresponding pressing members 640L and 640R. Here, since the pressing members 640L and 640R press the development unit 7, a pressure from the pressing members 640L and 640R is applied to a rearward side of the frame 610 of the drum unit 6 through the photosensitive drum 61 and the bearings 746A and 746B. In addition, a repulsive force of the pressure acts on the leading edge wall 613 of the frame 610 through the urging springs 644 and 644. According to this, a tension in the front-rear direction occurs in the bottom portion 614 of the frame 610 due to the pressure and the repulsive force.

Figure 21:
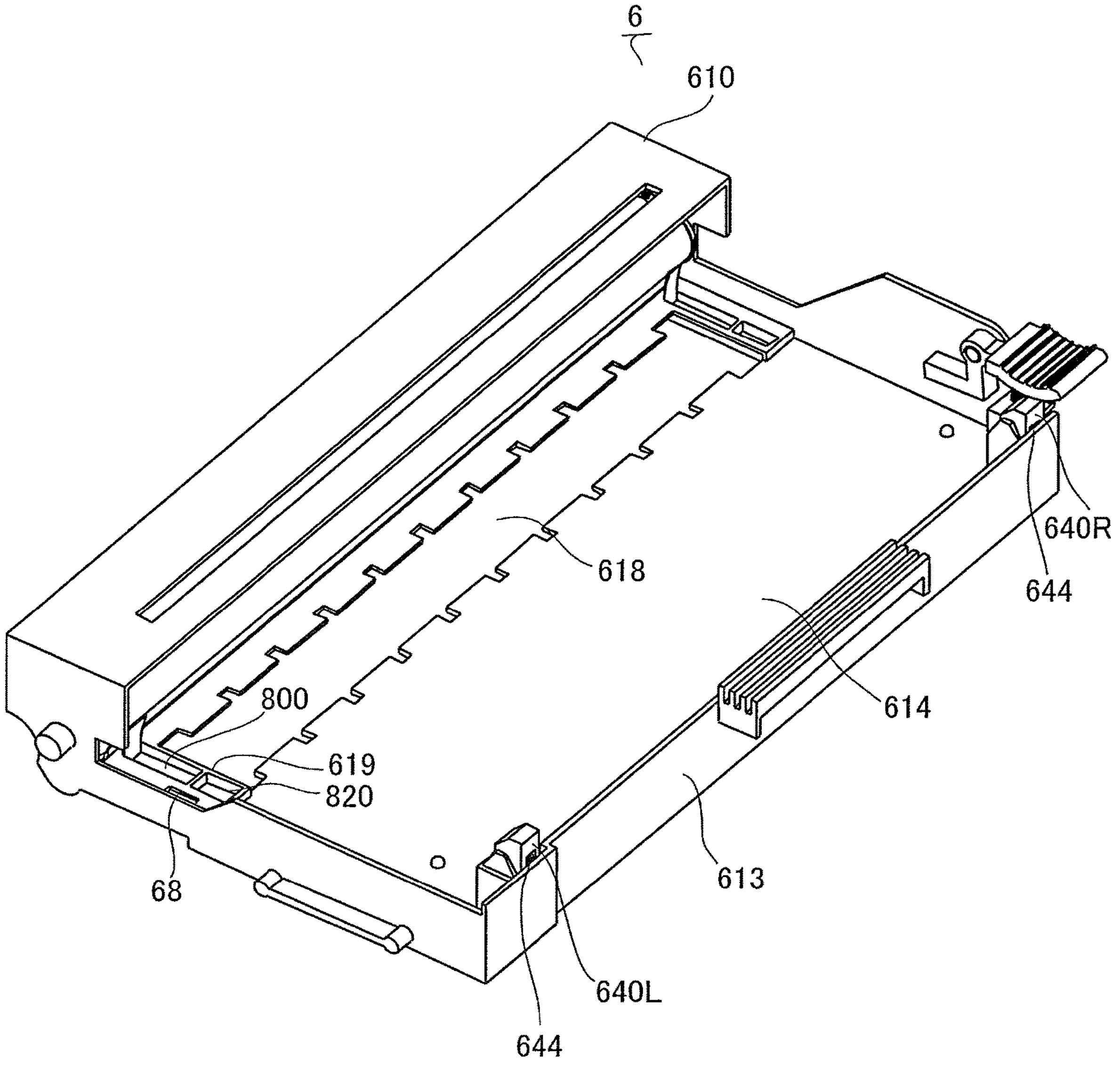
FIG. 21 is a perspective view of the drum unit.

However, as illustrated in FIG. 21, the positioning hole 68*b* and the electrode exposing hole 68*a*, that is a through hole through which the electrode 85*a* of the memory 85 is exposed, are provided in the bottom portion 614. In addition, a sheet passage hole 618 for feeding a sheet to the transfer nip N1 between the photosensitive drum 61 and the development roller 71 overlaps the positioning hole 68*b* and the electrode exposing hole 68*a* in a direction perpendicular to the rotational axis direction when viewed from the rotational axis direction of the photosensitive drum 61.

When the hole portions 68*a*, 68*b*, and 610*b* are formed, the strength of the frame 610 of the drum unit 6 decreases. However, when the frame 610 is deformed due to the tension, there is a concern that a pressure is lowered and thus a contact state between the development roller 71 and the photosensitive drum 61 may be unstable. Hereinafter, a configuration for suppressing deformation of the frame 610 of the drum unit 6 will be described.

Figure 22:
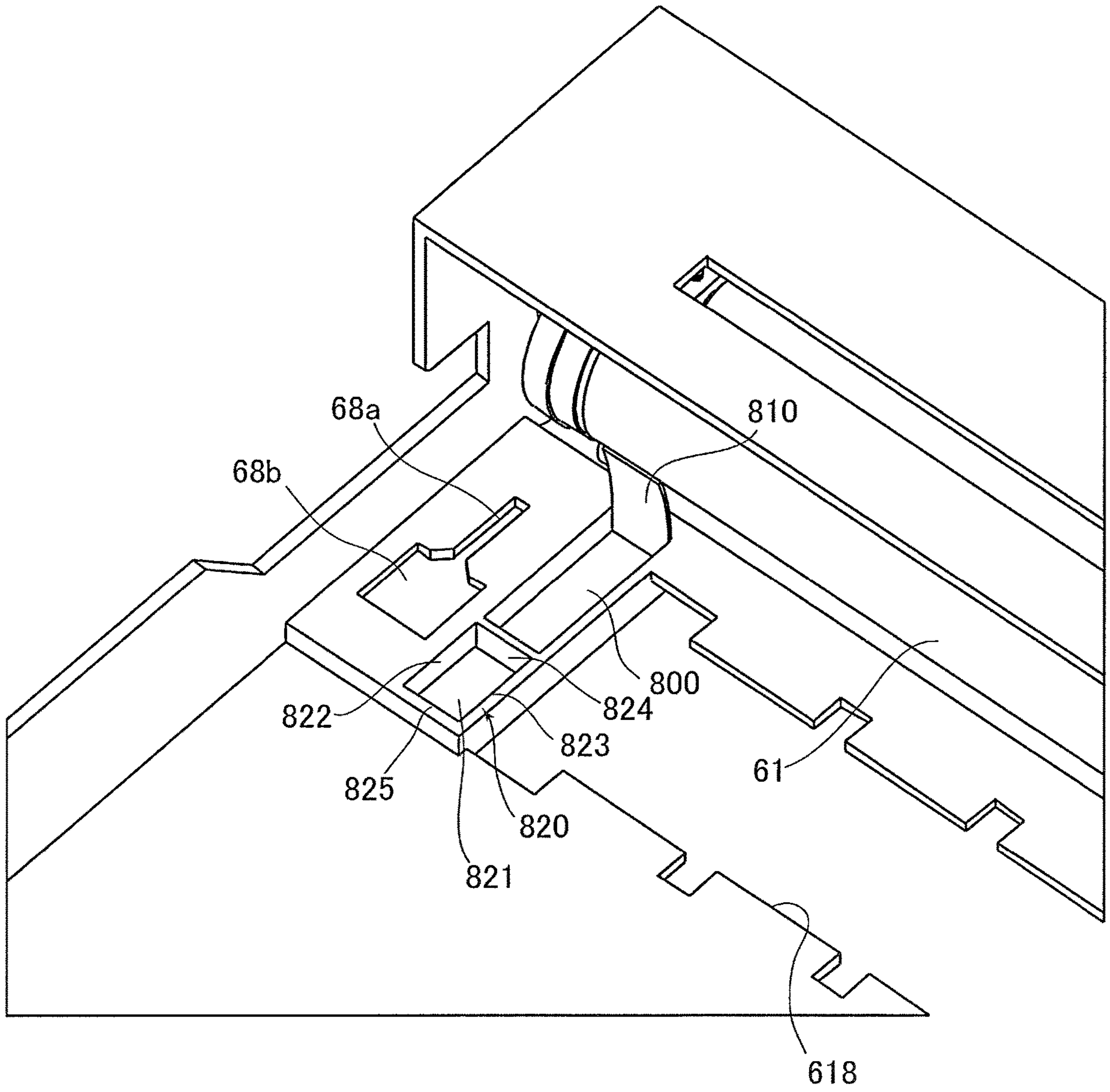
FIG. 22 is an enlarged view illustrating a rear-left end side of the drum unit.

As illustrated in FIG. 22, in the frame 610 of the drum unit 6, the collection recessed portion 800 is provided in the bridge portion 619 between the electrode exposing hole 68*a*, the positioning hole 68*b*, and the sheet passage hole 618 to reinforce strength of the bridge portion 619. In addition, in this embodiment, a recessed portion 820 for reinforcement is provided in the bridge portion 619 separately from the collection recessed portion 800.

More specifically, the recessed portion 820 for reinforcement (hereinafter, referred to as "reinforcement recessed portion") is a box-shaped recessed portion that is recessed downward, and includes a bottom surface (first wall surface) 821 that expands in the front-rear direction and in the right-left direction. In addition, the reinforcement recessed portion 820 includes left and right wall surfaces (second and third wall surfaces) 822 and 823 provided to be erected from the bottom surface 821 so as to face each other with an interval in the right-left direction, and front and rear wall surfaces (fourth and fifth wall surfaces) 824 and 825 provided to be erected from the bottom surface 821 so as to face each other with an interval in the front-rear direction.

Figure 23:
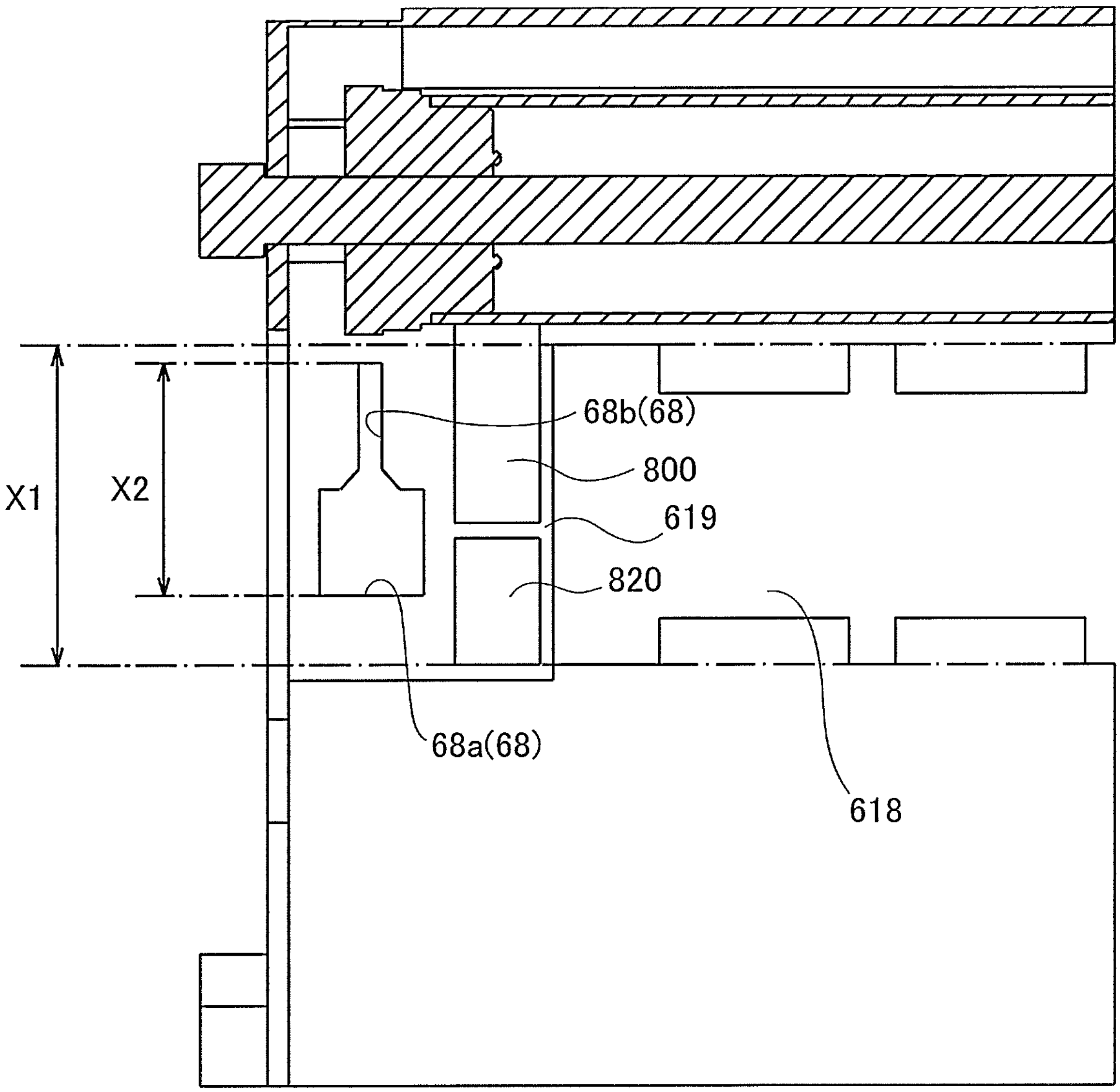
FIG. 23 is a plan view illustrating a rear-left end side of the drum unit.

The reinforcement recessed portion 820 is provided on a forward side of the collection recessed portion 800 with a predetermined interval. More specifically, as illustrated in FIG. 23, the reinforcement recessed portion 820 is provided to overlap the electrode exposing hole 68*a* and the sheet passage hole 618 in the front-rear direction perpendicular to the rotational axis when viewed from the rotational axis direction of the photosensitive drum 61. That is, in the front-rear direction, a formation range X2 of the end portion through hole 68 is included in a range X1 in which the sheet passage hole 618 is formed. In addition, at least parts of formation ranges of the collection recessed portion 800 and the reinforcement recessed portion 820 overlap the ranges of the formation ranges X1 and X2.

Figure 24:
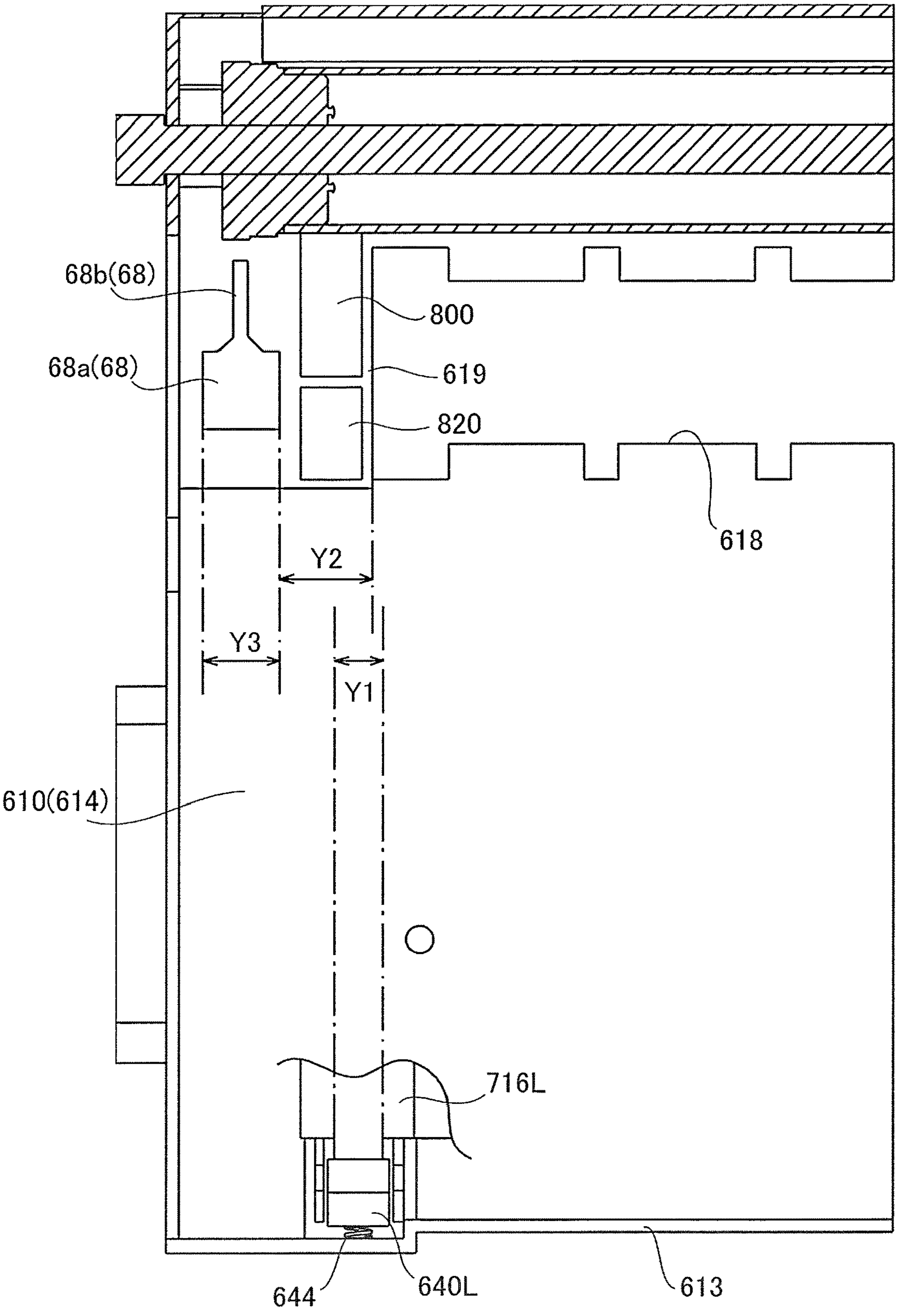
FIG. 24 is a plan view illustrating the rear-left end side of the drum unit.

By the way, the tension applied to the frame 610 increases at a position of overlapping the pressing members 640L and 640R in the rotational axis direction of the photosensitive drum 61. Here, in this embodiment, as illustrated in FIG. 24, the pressing member 640L is provided to be located further inside than the electrode exposing hole 68*a* in the rotational axis direction when the pressing member 640L is viewed from a direction perpendicular to the rotational axis direction. In addition, the pressing member 640L is provided at a position of overlapping the bridge portion 619 in the direction perpendicular to the rotational axis direction when viewed from the rotational axis direction. That is, a pressing range Y1 of the pressing member 640L in the right-left direction (rotational axis direction), and a formation range Y3 of the end portion through hole 68 in the right-left direction do not overlap each other, and the pressing range Y1 partially overlaps a formation range Y2 of the bridge portion 619 in the right-left direction. In addition, the pressing range Y1 partially overlaps the sheet passage hole 618 in the direction perpendicular to the rotational axis direction when viewed from the rotational axis direction.

As described above, in this embodiment, the pressing member 640 is disposed in a range that does not overlap the electrode exposing hole 68*a* and overlaps the bridge portion 619 in the direction perpendicular to the rotational axis direction when viewed from the rotational axis direction. According to this, the tension can be received at a position where the bridge portion 619 reinforced by the reinforcement recessed portion 820 and the collection recessed portion 800 exists.

Summary of Second Embodiment

A process cartridge (5) according to this embodiment includes:

- a drum unit (6) that includes a photosensitive drum (61); and
- a development unit (7) that includes a development roller (71) that supplies a toner to the photosensitive drum (61) and develops a toner image, and is configured to be detachably mounted on the drum unit (6),
- in which the development unit (7) includes,
- a memory (85) that stores information on the development unit (7), and
- a positioning protrusion (86) that performs positioning of the development unit (7) with respect to the drum unit (6) in the rotational axis direction of the photosensitive drum (61),
- the drum unit (6) includes,
- a pressing member (640L) that presses the development unit (7) toward the photosensitive drum (61), and
- a frame (610) that includes a positioning hole (68*b*) with which the positioning protrusion (86) engages and an electrode exposing hole (68*a*) through which the electrode (85*a*) of the memory (85) is exposed on the first end side of the photosensitive drum (61) in the rotational axis direction, and
- the electrode exposing hole (68*a*) is located further outside than the pressing member (640L) in the rotational axis direction of the photosensitive drum (61) when viewed from the direction perpendicular to the rotational axis direction.

As described above, the electrode exposing hole 68*a* through which the memory electrode 85*a* is exposed is provided on a further outside than the pressing member 640 in the rotational axis direction of the photosensitive drum 61. Accordingly, it is possible to suppress deformation of the frame 610 of the drum unit 6 due to a pressure of the pressing member 640, and it is possible to stably press the development roller 71 of the development unit 7 toward the photosensitive drum 61. In addition, the development roller 71 is stably brought into contact with the photosensitive drum 61, and thus it is possible to prevent occurrence of image defects. In addition, since the electrode exposing hole 68*a* is disposed closer to the positioning portion of the development unit 7, it is possible to improve positioning accuracy of the memory 85 with respect to the drum unit 6 and the apparatus body 2. In addition, it is possible to improve stability of information communication with a control unit of the apparatus body 2 due to the improvement of the positioning accuracy of the memory 85.

Particularly, the frame (610) of the drum unit (6) includes a sheet passage hole (610*b*) through which a sheet passes toward the photosensitive drum (61), and a bridge portion (619) that is located between the exposing hole (68*a*) and the sheet passage hole (618) in the rotational axis direction. The pressing member (640L) is provided at a position of overlapping the bridge portion (619) in the rotational axis direction of the photosensitive drum (61) when viewed from the direction perpendicular to the rotational axis direction. According to this, it is possible to receive the tension that occurs in the frame 610 of the drum unit 6 by the bridge portion 619, and thus it is possible to effectively suppress deformation of the frame 610.

In addition, a recessed portion (820) is formed in the bridge portion (619). As described above, since the reinforcement recessed portion 820 is provided, it is possible to improve strength of the bridge portion 619 on which the tension acts, and it is possible to improve the strength of the frame 610 of the drum unit 6.

Third Embodiment

Next, a configuration of a process cartridge 5 according to a third embodiment will be described with reference to FIG. 25 to FIG. 27B. Note that, in the following description, only portions different from the first embodiment will be described, and the same names and reference numerals will be given to the other portions, and description thereof will be omitted.

Figure 25:
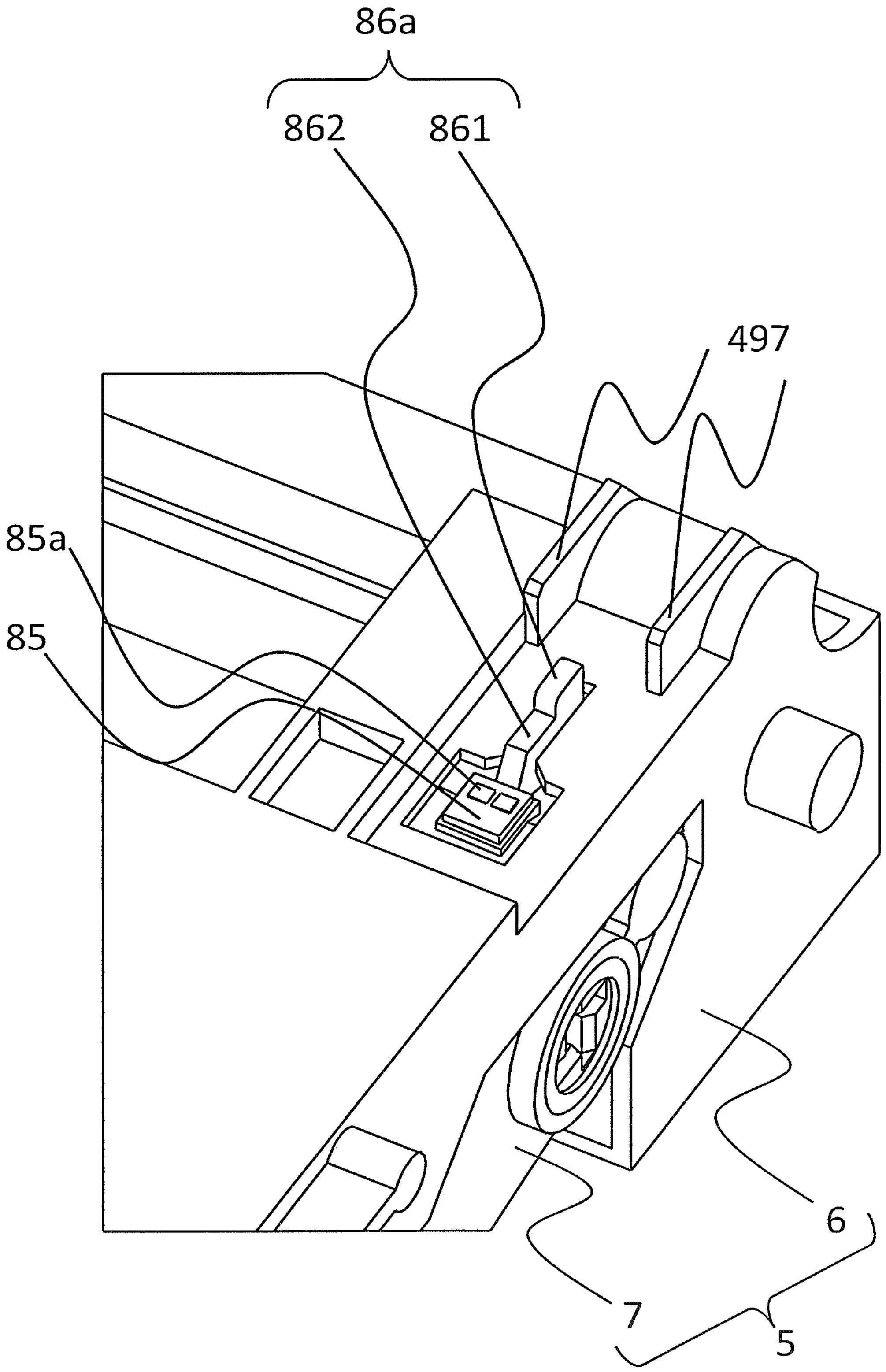
FIG. 25 is a bottom view illustrating a process cartridge according to a third embodiment.

FIG. 25 is a view illustrating a structure at the periphery of the memory 85 of the process cartridge 5 in a state in which the development unit 7 is mounted on the drum unit 6. As illustrated in FIG. 25, in this embodiment, a tip end of the positioning protrusion 86*a* of the development unit 7 is formed in a stepped shape, and an end on an upstream side in the mounting direction of the process cartridge 5 is set as a protruding portion 861 of which a downward protruding amount is large. In addition, a gap maintaining portion 862 of which a protruding amount is smaller than that of the protruding portion 861 is formed downstream of the protruding portion 861 in the mounting direction of the process cartridge 5.

In addition, rough guides 497 and 497 are formed on the bottom surface of the process cartridge 5 (drum unit 6) on a further upstream side of the mounting direction of the process cartridge 5 than the positioning protrusion 86. The rough guides 497 and 497 are formed by a pair of plate-shaped guide members which is disposed with a predetermined interval in the rotational axis direction of the photosensitive drum 61, and the opposing guide members are provided to extend in parallel to the mounting direction.

Figure 26A:
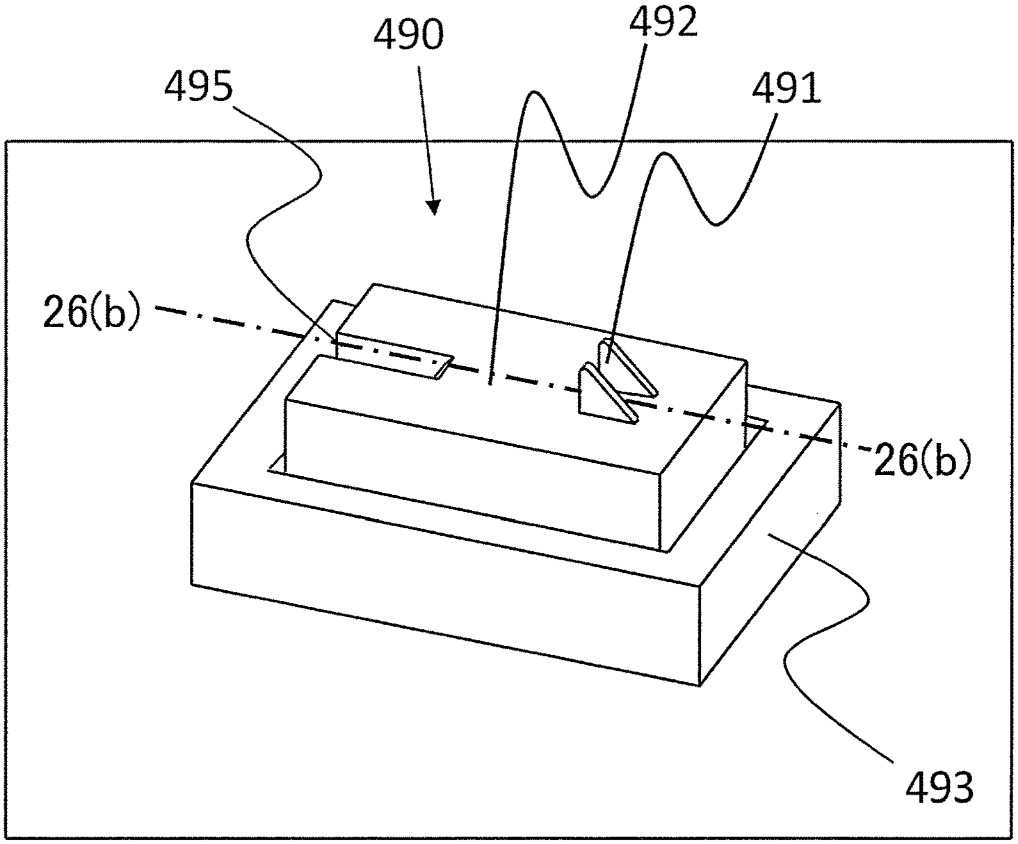
FIG. 26A is a schematic view illustrating an electrode unit on an apparatus body side.
Figure 26B:
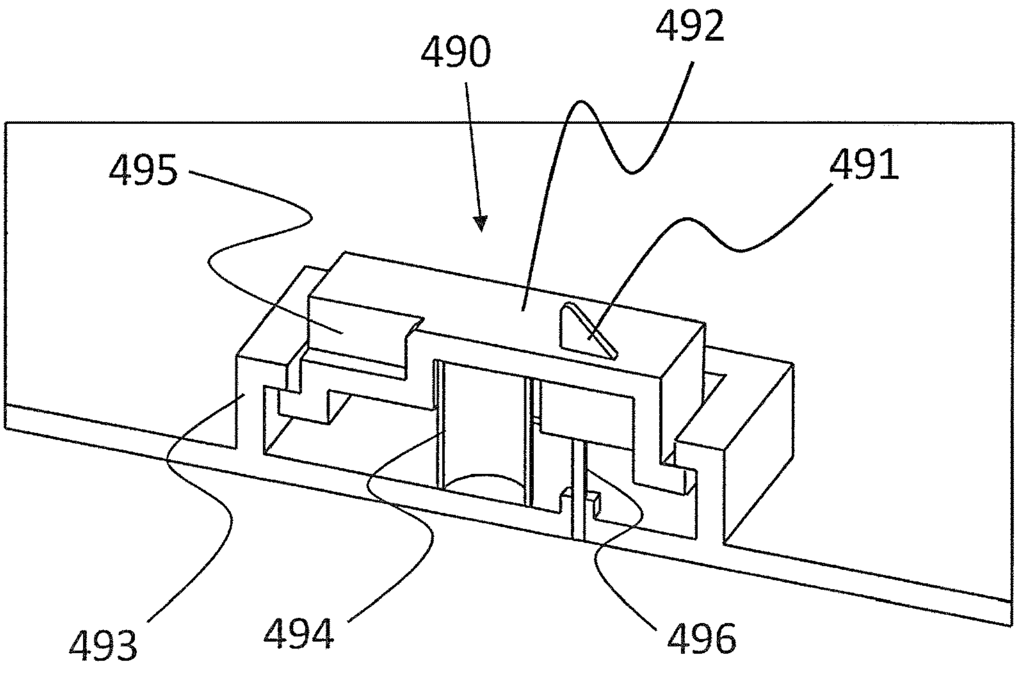
FIG. 26B is a cross-sectional view of the electrode unit on the apparatus body side.

On the other hand, as illustrated in FIG. 26A and FIG. 26B, in an electrode unit 490 of a printer 1 on the apparatus body 2 side with which the electrode 85*a* of the memory 85 of the development unit 7 comes into contact, an electrode substrate 492 serving as an electrode portion is housed in an electrode holder 493. A predetermined clearance is provided between the electrode holder 493 and the electrode substrate 492, and the electrode substrate 492 is supported by an elastic body 494. The elastic body 494 is constituted by a porous elastic body such as an urethane foam, a metal spring, or the like, and the electrode 491, which is provided in the electrode substrate 492, on the apparatus body 2 side is supported by a floating configuration capable of moving in a range of the clearance in the front-rear direction and the right-left direction. Note that, a cable 496 connected to the control unit (not illustrated) inside the image forming apparatus 1 is connected to the apparatus body side electrode 491, and electric connection to the control unit is maintained even in a case where the electrode substrate 492 is slightly moved.

Figure 27A:
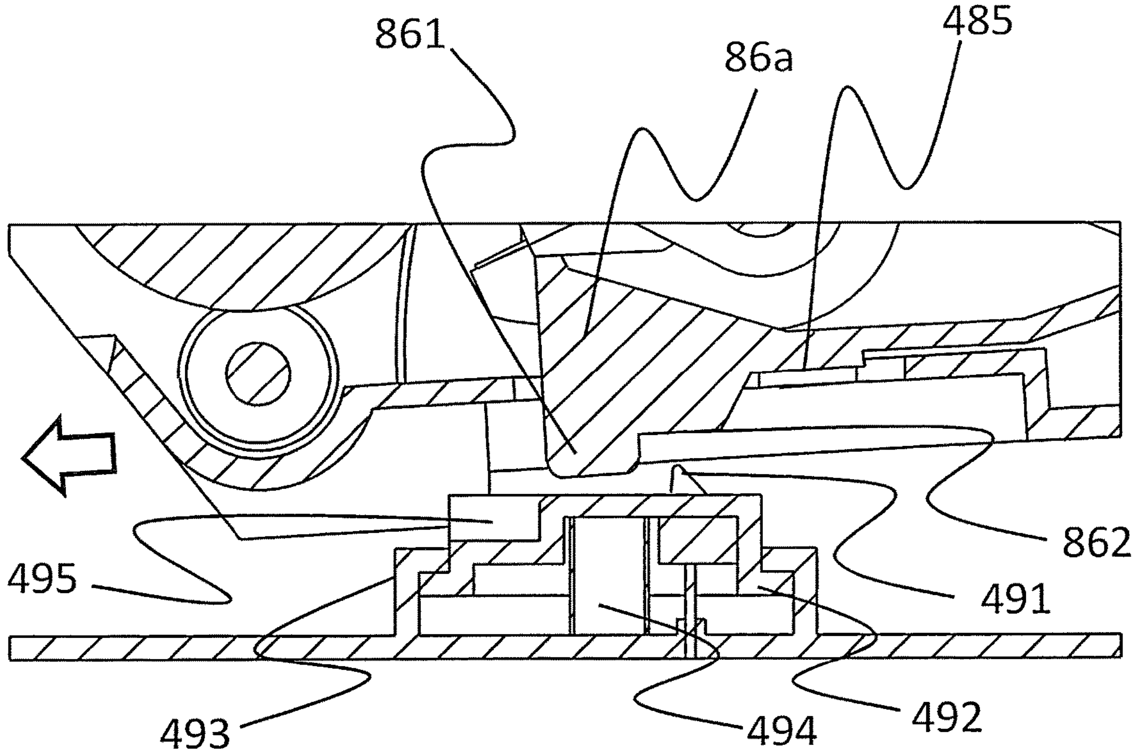
FIG. 27A is a cross-sectional view illustrating the electrode unit when the development unit is moved in a drum unit mounting direction.
Figure 27B:
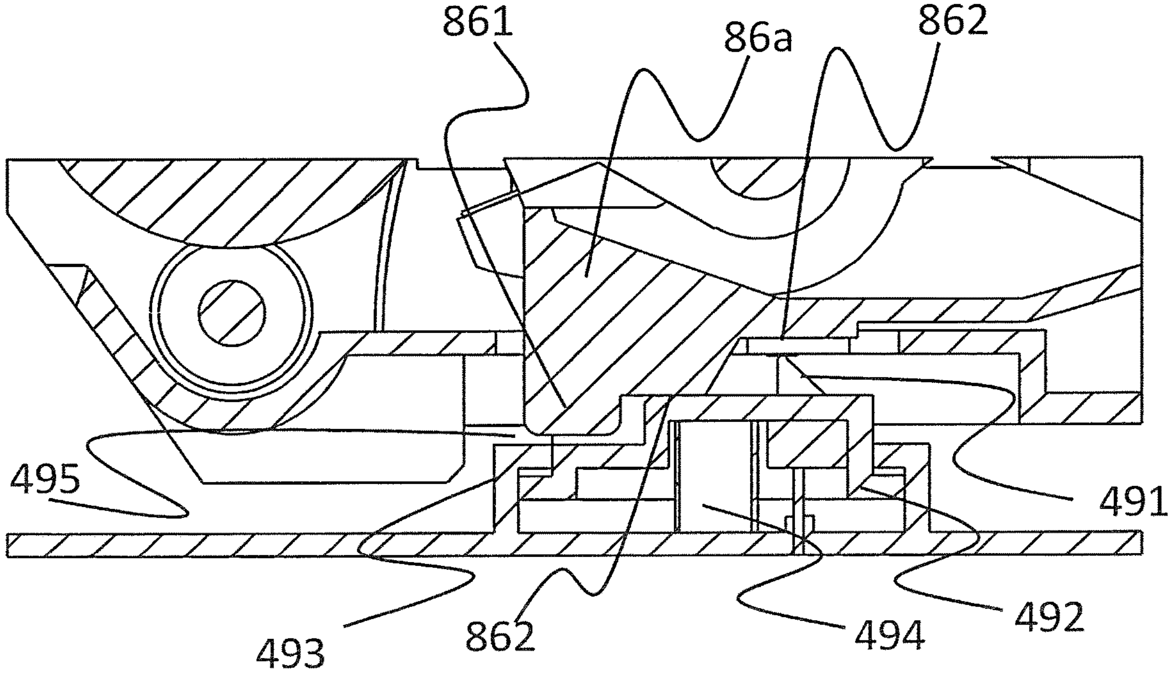
FIG. 27B is a cross-sectional view illustrating the electrode unit in a state in which the development unit is mounted on the drum unit.

In addition, a guide groove 495 with which the protruding portion 861 of the positioning protrusion 86*a* of the development unit 7 engages is provided in the electrode substrate 492. That is, in this embodiment, the protruding portion 861 is set as an engagement portion that engages with the guide groove 495 serving as an engaged portion. As illustrated in FIG. 27A, in a case where the process cartridge 5 is mounted on the apparatus body 2 of the printer 1, positioning of the process cartridge 5 is performed so as to insert the electrode holder 493 between the rough guides 497 and 497, and the process cartridge 5 is moved in the mounting direction (a direction indicated by an arrow in the drawing). The process cartridge 5 guided by the rough guides 497 and 497 is moved in a state in which the protruding portion 861 of the positioning protrusion 86*a* maintains a slight distance with respect to the apparatus body side electrode 491. As illustrated in FIG. 27B, the process cartridge 5 is lowered immediately before a mounting position, and the protruding portion 861 of the positioning protrusion 86*a* is inserted into the guide groove 495 of the electrode substrate 492.

At this time, even in a case where a posture of the process cartridge 5 is slightly twisted in the front-rear direction and the right-left direction with respect to an appropriate mounting position for the apparatus body 2 of the printer 1, the electrode substrate 492 changes the posture to follow the process cartridge 5 through the protruding portion 861 and the guide groove 495. In addition, in a state of changing the posture, the apparatus body side electrode 491 and the memory electrode 85*a* come into contact with each other, and the process cartridge 5 is further pushed to the appropriate mounting position for completion of mounting.

Note that, a distance between the apparatus body side electrode 491 and the memory electrode 85*a* is maintained to an appropriate distance when the gap maintaining portion 862 of the positioning protrusion 86*a* comes into direct contact with the electrode substrate 492 and presses downward the electrode substrate 492. In addition, the distance between the apparatus body side electrode 491 and the memory electrode 85*a* is appropriately maintained by the gap maintaining portion 862. According to this, the apparatus body side electrode is prevented from being crushed at the time of mounting the process cartridge 5, and a pressure applied to the apparatus body side electrode is appropriately maintained.

When the process cartridge 5 is pushed to a mounting position, the process cartridge 5 moves so as to eliminate twisting thereof, but the electrode substrate 492 changes a posture in conjunction with the process cartridge 5. According to this, the apparatus body side electrode 491 and the memory electrode 85*a* are suppressed from relatively moving, and thus a stress applied to the apparatus body side electrode 491 is reduced.

Summary of Third Embodiment

A process cartridge (5) according to this embodiment is a process cartridge (5) that is detachably mounted on the image forming apparatus (1), the process cartridge (5) including:

- a drum unit (6) that includes a photosensitive drum (61); and
- a development unit (7) that includes a development roller (71) that supplies a toner to the photosensitive drum (61) and develops a toner image, and is configured to be detachably mounted on the drum unit (6),
- in which the development unit (7) includes,
- a memory (85) that stores information on the development unit (7), and
- a positioning protrusion (86*a*) that performs positioning of the development unit (7) with respect to the drum unit (6) in the rotational axis direction of the photosensitive drum (61),
- an electrode (85*a*) of the memory (85) comes into contact with an electrode (491) that is provided on the apparatus body side of the image forming apparatus (1), and an electrode portion (492) in which the apparatus body side electrode (491) is provided is held by a floating configuration in which a position of the electrode (491) is movable, and
- a positioning protrusion (86*a*) of the development unit (7) includes an engagement portion (861) that engages with the electrode portion (492).

As described above, when the electrode portion 492 has the floating configuration in which a posture is changed in conjunction with the process cartridge 5, it is possible to reliably bring the memory electrode 85*a* into contact with the apparatus body side electrode 491. According to this, it is possible to reduce a size of the memory 85 (or the memory electrode 85*a*). In addition, in this embodiment, the positioning protrusion 86*a* that operates for engagement between the development unit 7 and the drum unit 6 also functions as a positioning member with the electrode portion 492 in the floating configuration of the image forming apparatus 1. According to this, a more stable electric conduction environment of the process cartridge 5 is secured, and a damage of the electrode is prevented.

In addition, the positioning protrusion (86*a*) includes a gap maintaining portion (862) that comes into contact with the electrode portion (492) and maintains a distance between the electrode (85*a*) of the memory (85) and the apparatus body side electrode (491) to a predetermined distance. As described above, a distance between electrodes is secured by the gap maintaining portion 862, and thus it is possible to protect the electrodes, and it is possible to appropriately maintain a contact pressure between the electrodes.

The development unit (7) includes a rough guide (497) which interferes with an electrode holder (493) that accommodates the electrode portion (492), and guides an engagement portion (861) of the positioning protrusion (86*a*) to the electrode portion (492). According to this, the engagement portion 861 of the positioning protrusion 86*a* can be simply and quickly guided to the electrode portion 492.

Note that, in this embodiment, description has been given of an example in which the positioning protrusion 86*a* is provided in the development unit 7, and the guide groove 495 is provided in the electrode portion 492. However, there is no limitation to the example. Even in a configuration in which the guide groove is provided in the development unit 7 and the positioning protrusion is provided in the electrode portion 492, the memory electrode 85*a* can be brought into contact with the apparatus body side electrode 491 at an accurate position.

Fourth Embodiment

Next, a configuration of a process cartridge 5 according to a fourth embodiment will be described with reference to FIG. 28A to FIG. 31. Note that, in the following description, only portions different from the first embodiment will be described, and the same names and reference numerals will be given to the other portions, and description thereof will be omitted.

Figure 28A:
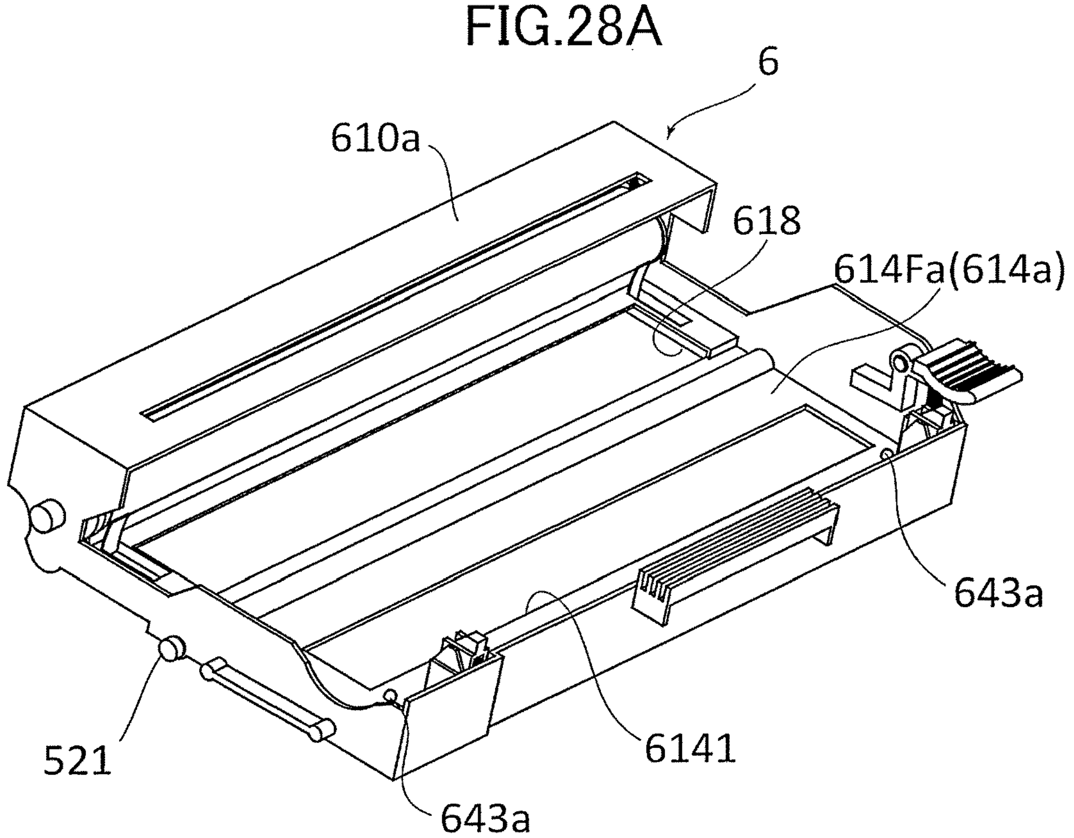
FIG. 28A is a perspective view illustrating a drum unit according to a fourth embodiment.
Figure 28B:
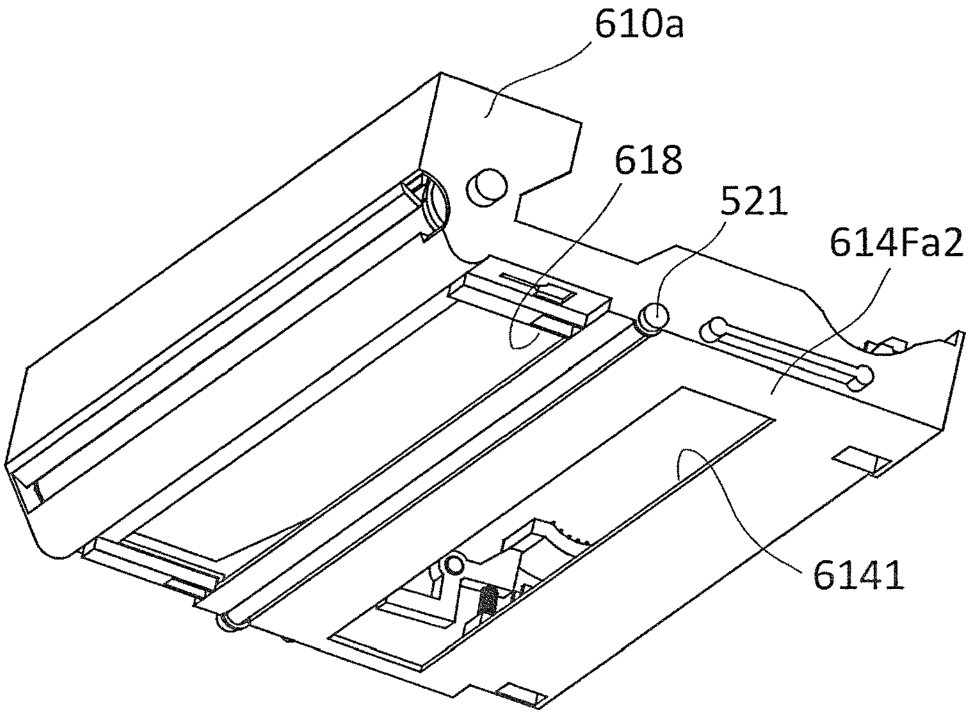
FIG. 28B is a perspective view when the drum unit illustrated in FIG. 28A is viewed from a downward side.
Figure 29A:
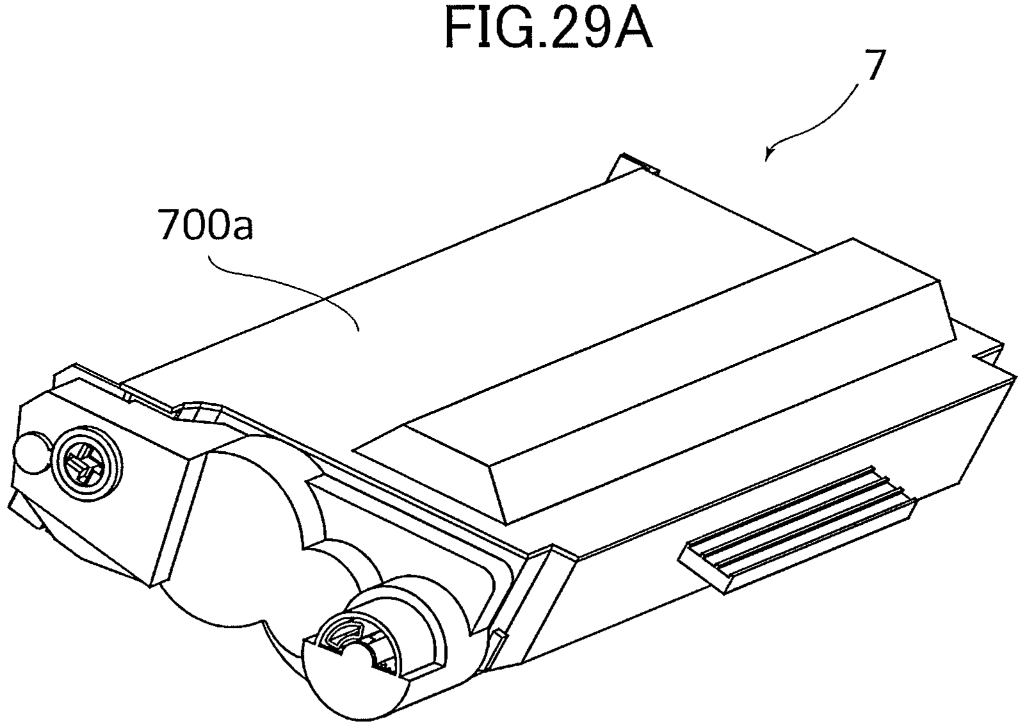
FIG. 29A is a perspective view of the development unit.
Figure 29B:
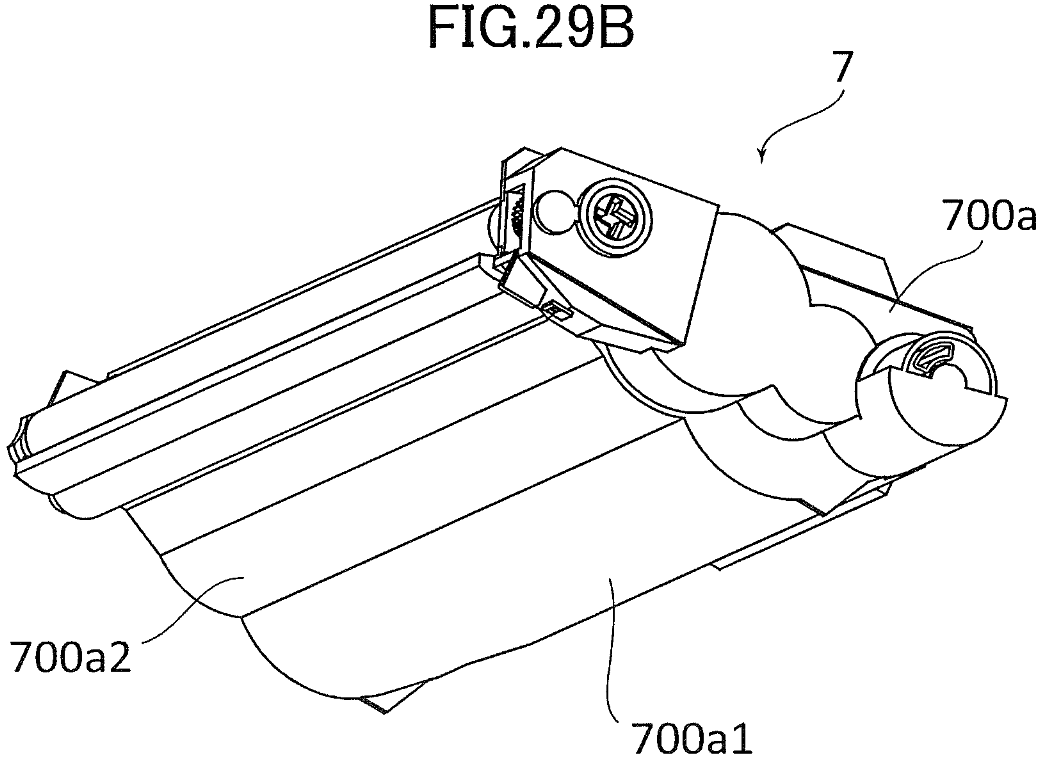
FIG. 29B is a perspective view when the development unit is viewed from a downward side.
Figure 30A:
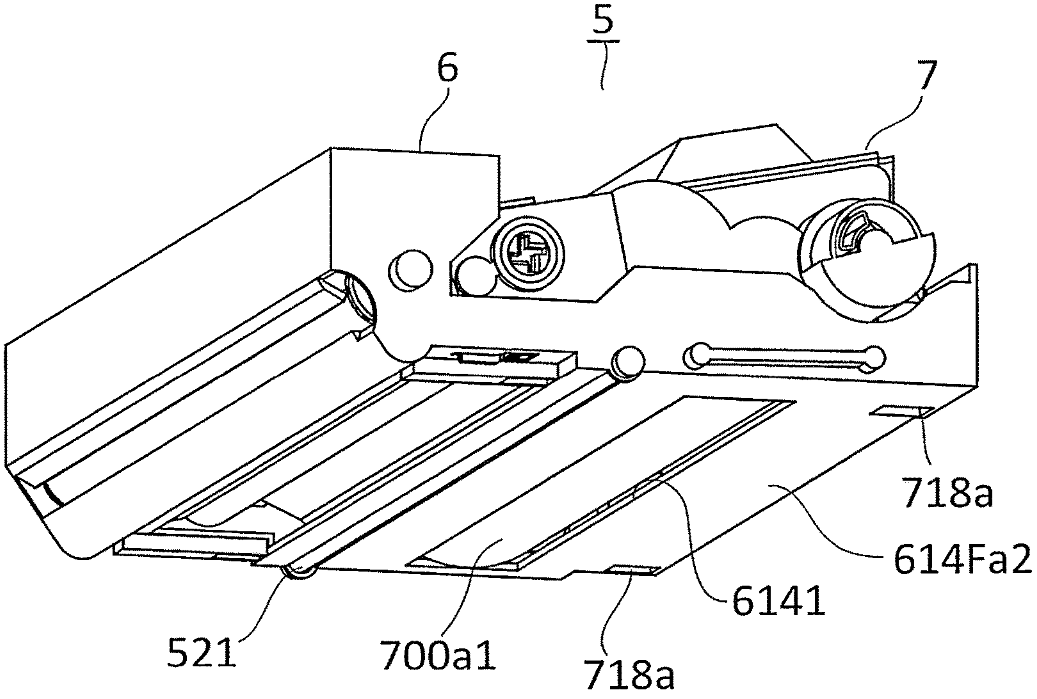
FIG. 30A is a perspective view illustrating a process cartridge.
Figure 30B:
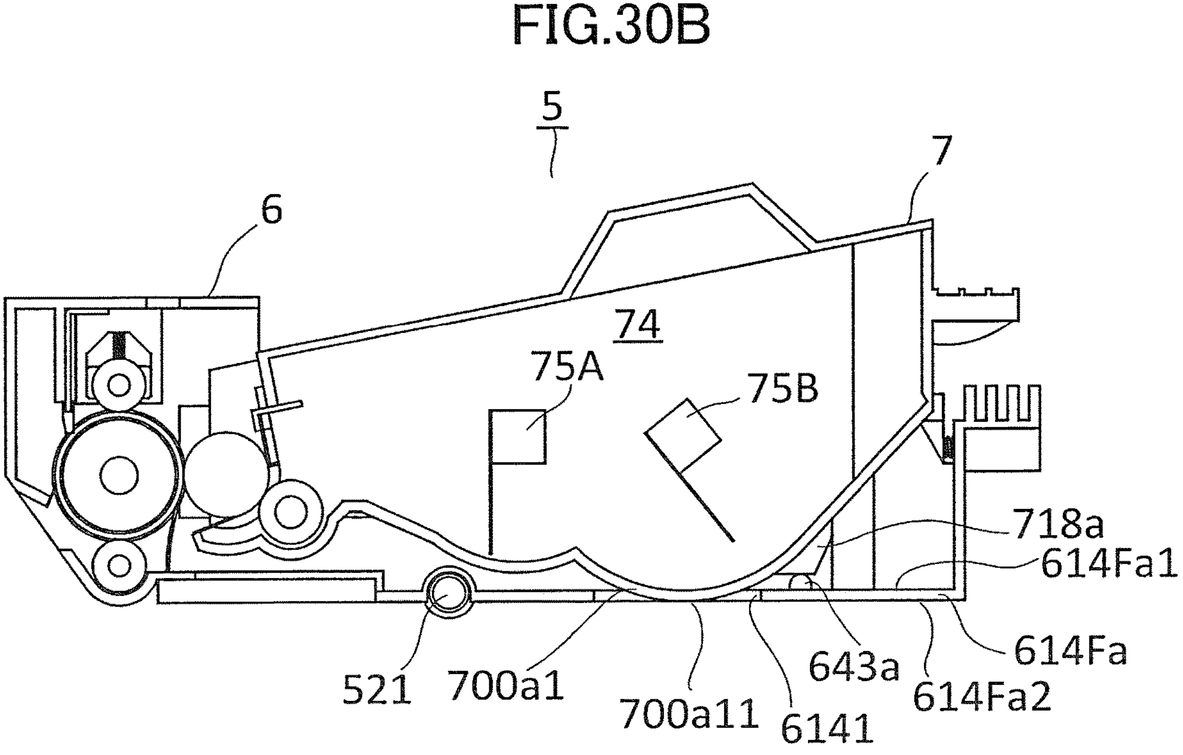
FIG. 30B is a cross-sectional view of the process cartridge.

As illustrated in FIG. 28A and FIG. 28B, in a frame 610*a* of the drum unit 6, an opening portion 6141 is provided in a forward side bottom portion 614Fa within a bottom portion 614*a*. As illustrated in FIG. 30A and FIG. 30B, a bottom surface of a casing 700*a* of the development unit 7 is fitted into the opening portion 6141.

More specifically, as illustrated in FIG. 29A to FIG. 30B, since the opening portion 6141 is formed in the frame 610*a* of the drum unit 6, the casing 700*a* of the development unit 7 is configured so that a volume of the toner storage portion 74 increases. That is, in the casing 700*a*, a bottom portion 700*a*1 that forms a forward side storage portion where a second agitator 75B in the toner storage portion 74 is provided greatly protrudes downward.

According to this, as illustrated in FIG. 30B, in a state in which the bottom portion 700*a*1 enters the opening portion 6141, a lower end portion 700*a*11 of a lower surface (bottom surface) of the bottom portion 700*a*1 is located below an upper surface 614Fa1 of the forward side bottom portion 614Fa.

In addition, to obtain a downward protruding amount of the bottom portion 700*a*1, in this embodiment, protruding portions 643*a* and 643*a* formed on the upper surface 614Fa1 of the forward side bottom portion 614Fa are provided forward of the opening portion 6141. In addition, a rib 718*a* of the development unit 7 that is supported by the protruding portions 643*a* and 643*a* is also provided forward of the lower end portion 700*a*11.

Figure 31:
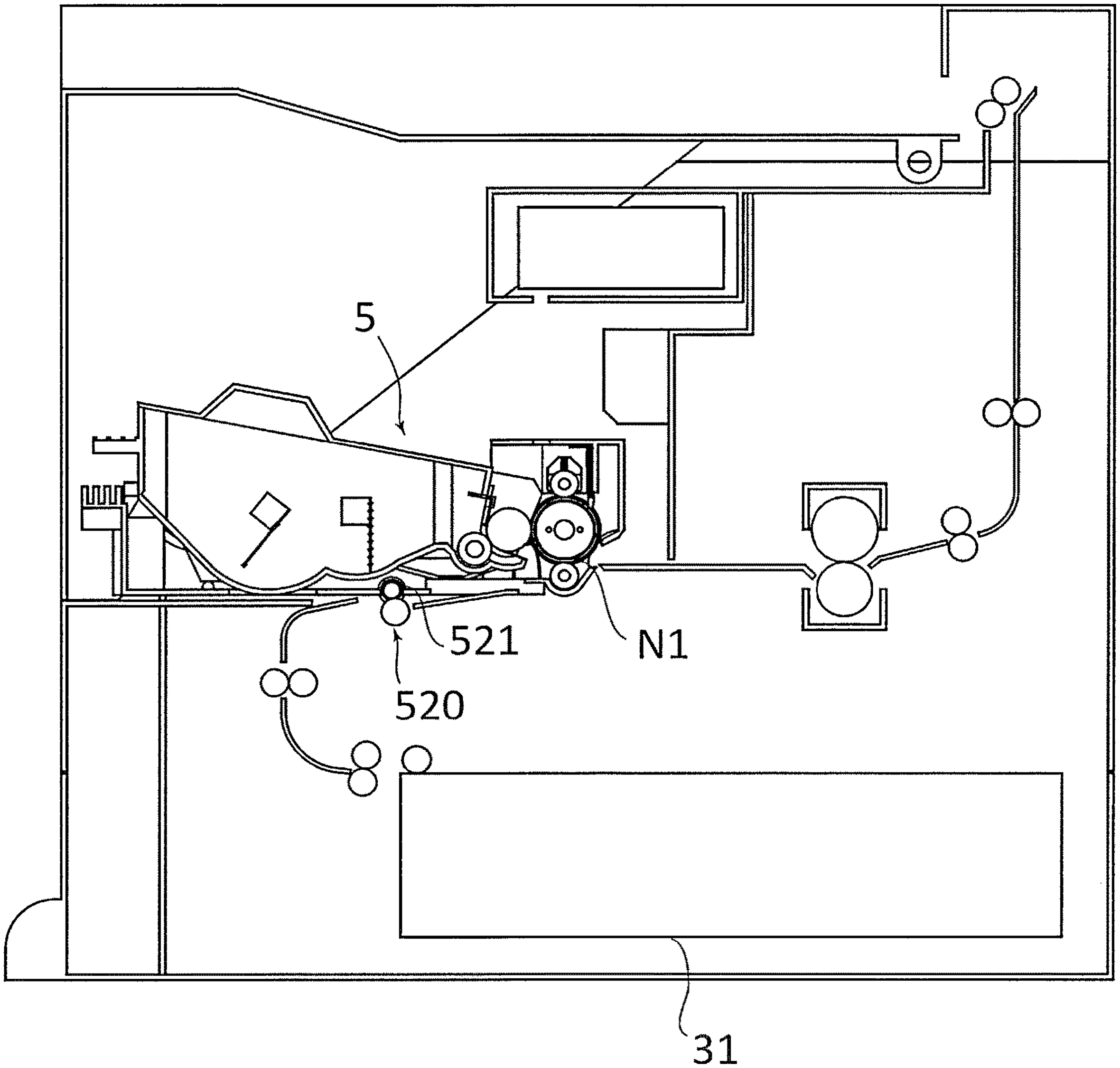
FIG. 31 is an overall schematic view illustrating a printer.
Figure 32A:
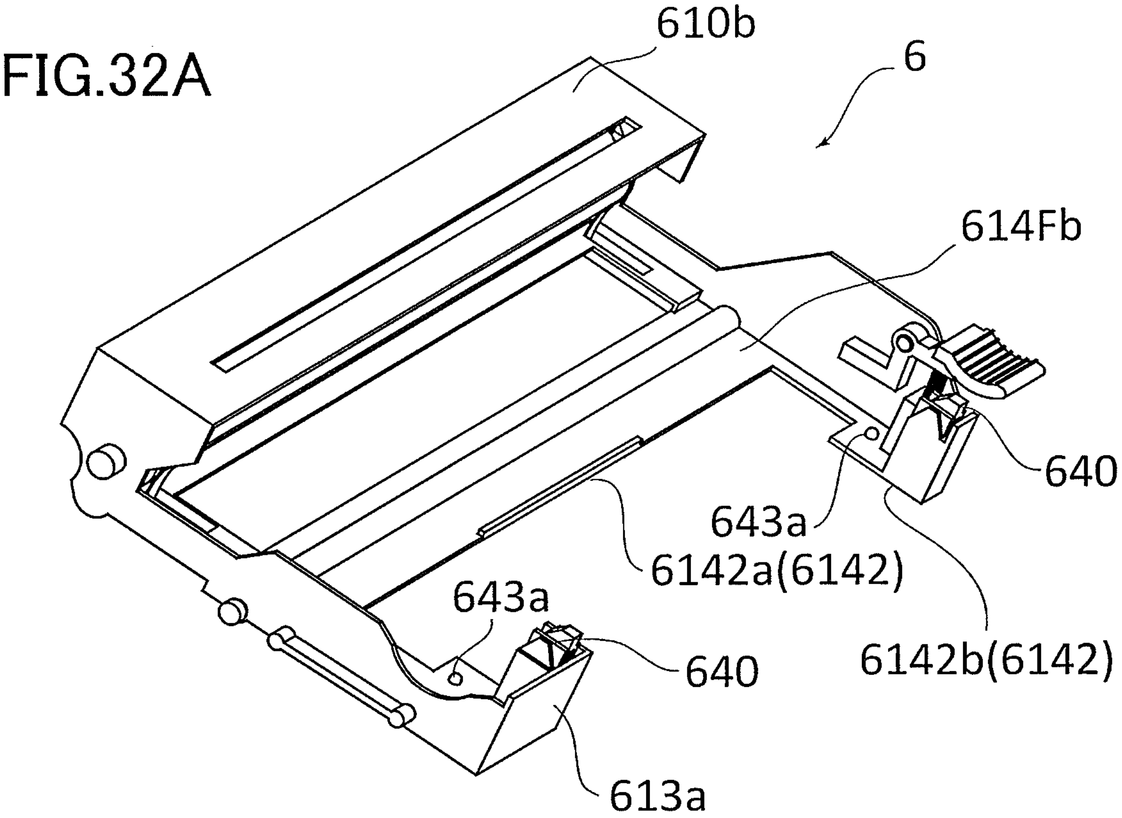
FIG. 32A is a perspective view illustrating a drum unit according to a fifth embodiment.
Figure 32B:
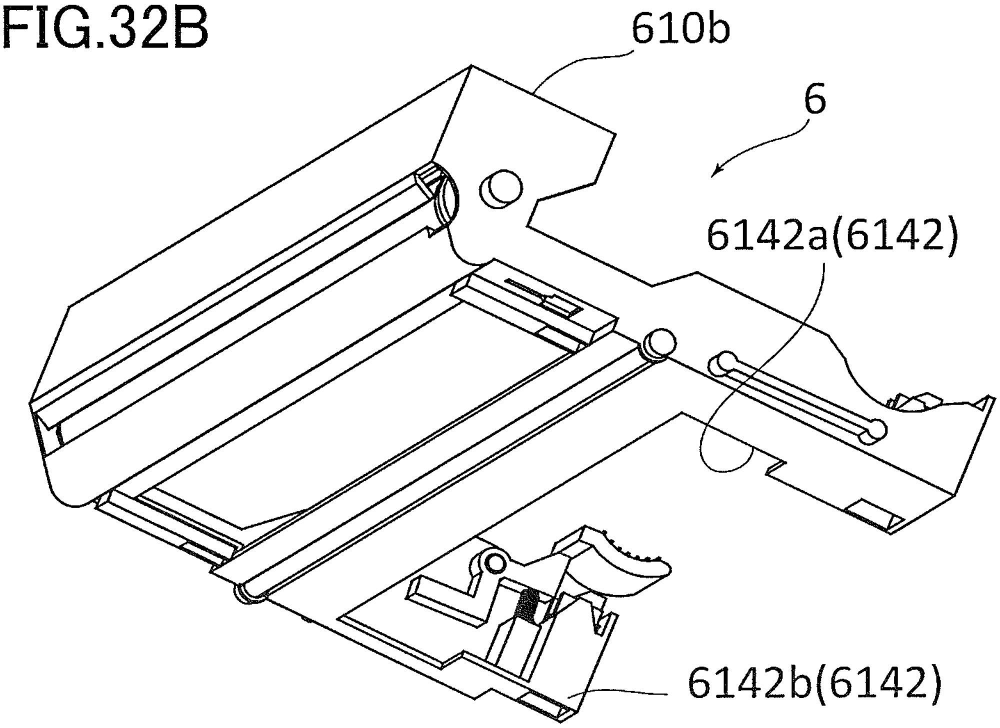
FIG. 32B is a perspective view when the drum unit illustrated in FIG. 32B is viewed from a downward side.
Figure 33A:
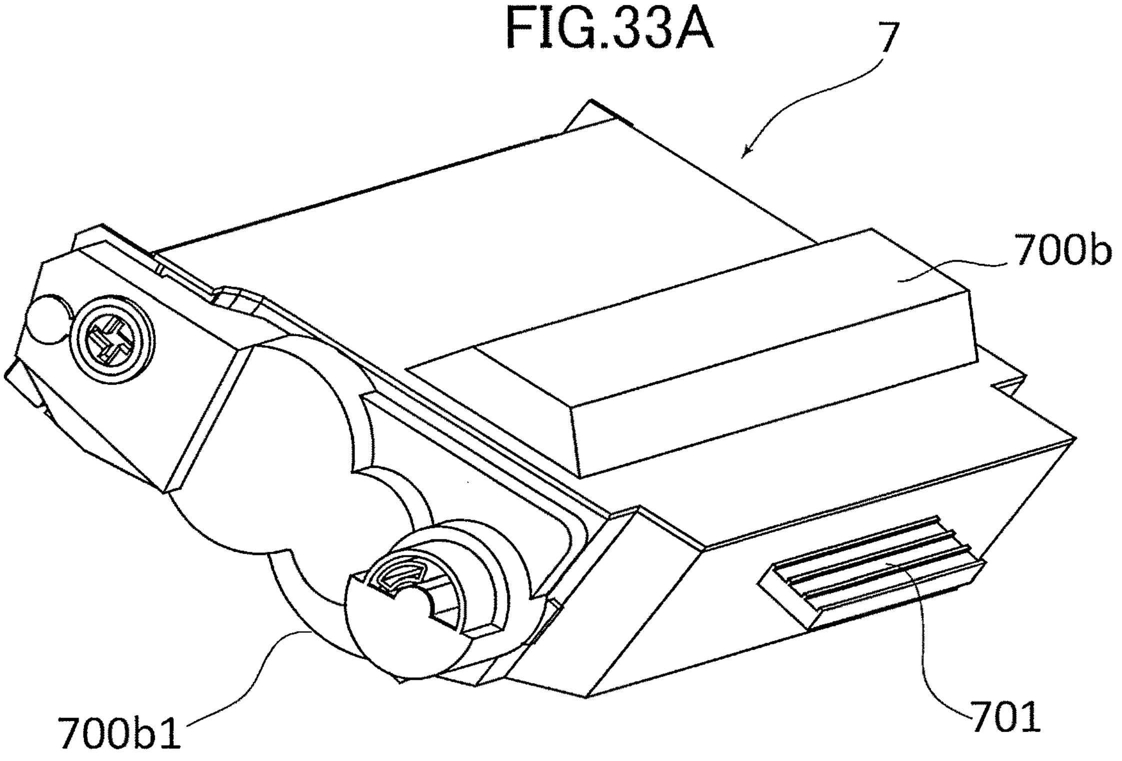
FIG. 33A is a perspective view of the development unit.
Figure 33B:
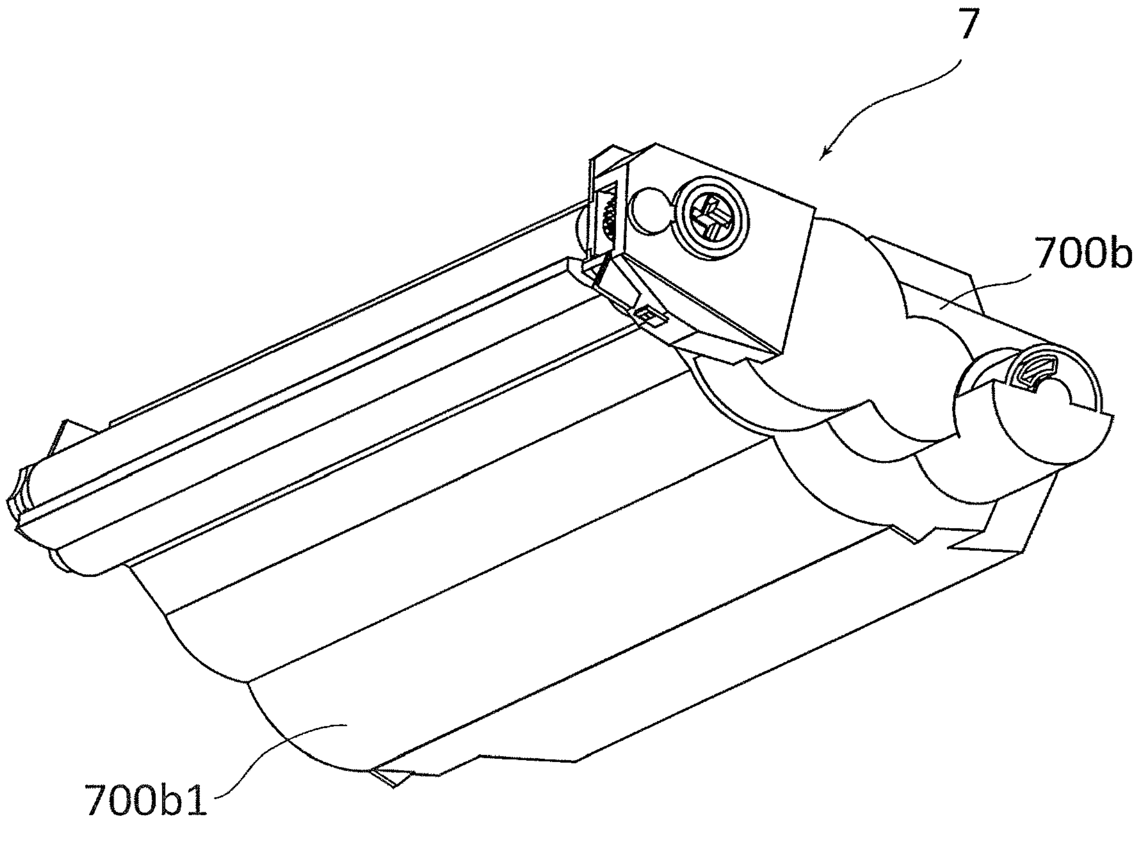
FIG. 33B is a perspective view when the development unit is viewed from a downward side.
Figure 34A:
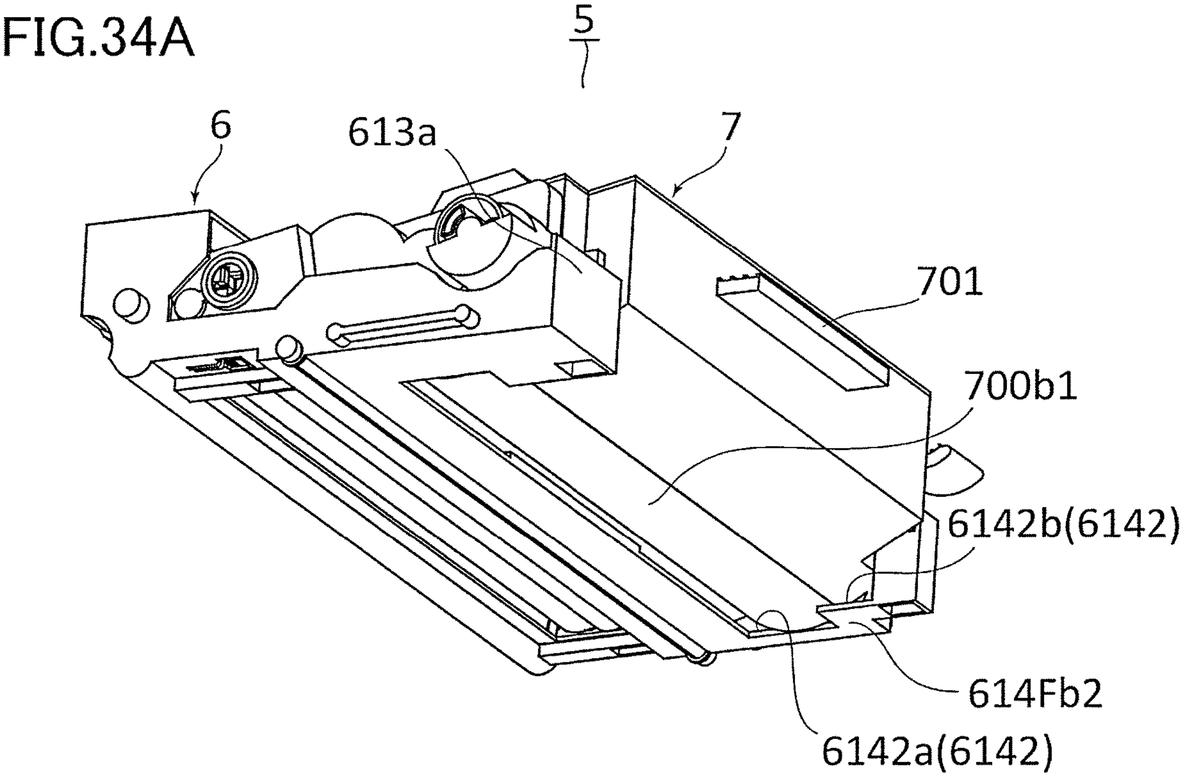
FIG. 34A is a perspective view illustrating a process cartridge.
Figure 34B:
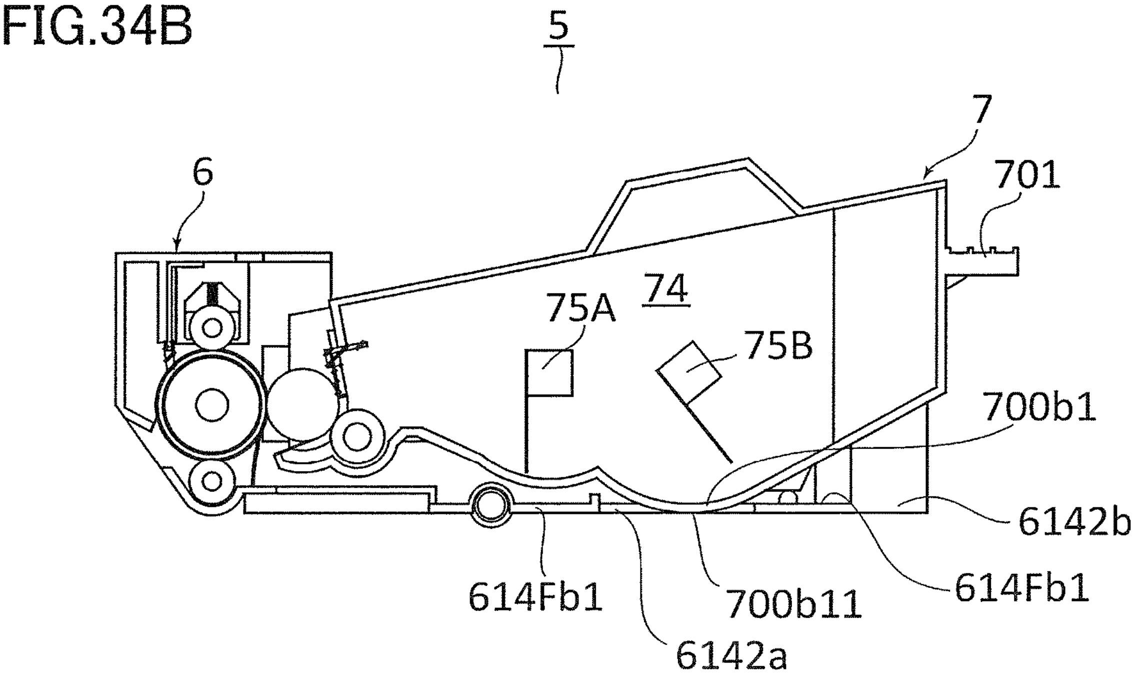
FIG. 34B is a cross-sectional view of the process cartridge.

In addition, in this embodiment, as illustrated in FIG. 30A and FIG. 30B, in the frame 610*a* of the drum unit 6, a conveyance roller (conveyance member) 521 is attached to the lower surface 614Fa2 side of the forward side bottom portion 614Fa. More specifically, the conveyance roller 521 is located rearward of the opening portion 6141, and serves as a conveyance roller on one side (in this embodiment, an upward side) of a conveyance roller pair 520 in a state in which the process cartridge 5 is mounted on the apparatus body 2 as illustrated in FIG. 31. Note that, the conveyance roller pair 520 is a conveyance roller pair that is provided on a sheet conveyance path between the cassette 31 and the transfer nip N1. In addition, an anti-come-off cap is attached to both ends of the conveyance roller 521, and holds the conveyance roller 521 so as not to come off from the frame 610*a*.

Summary of Fourth Embodiment

A process cartridge (5) according to this embodiment includes:

- a development unit (7) that includes a development roller (71); and
- a drum unit (6) that includes a photosensitive drum (61) in which a toner image is developed on a surface by the development roller (71), and a frame (610*a*) on which the development unit (7) is detachably mounted, in which in the frame (610*a*), a bottom portion (614Fa) that supports the development unit (7) is provided with an opening (6041) in which a part of the development unit (7) enters in a state in which the development unit (7) is mounted, and a part (700*a*11) of the development unit (7) is located downward of a surface (614Fa1) of the bottom portion (614Fa) on a side facing the development unit (7) when viewed from the rotational axis direction of the photosensitive drum (61).

According to this, the bottom portion 700*a*1 of the development unit 7 is enlarged to store a more amount of toners, and thus it is possible to provide the development unit 7 with a large toner storage capacity.

In addition, the drum unit (6) is provided with a roller (521) that is rotatably supported on a side opposite to the development unit (7) with the bottom portion (614Fa) of the frame (610*a*) interposed therebetween. The bottom portion 700*a*1 of the development unit 7 is located forward of the roller 521 serving as a conveyance member, and thus even when the bottom portion 700*a*1 protrudes downward of the opening portion 6041 of the drum unit 6, there is no influence on paper passage in the apparatus body 2. In addition, when the conveyance member 521 is provided in the drum unit 6, it is possible to reduce a size of the apparatus body 2.

Fifth Embodiment

Next, a configuration of a process cartridge 5 according to a fifth embodiment will be described with reference to FIG. 32A to FIG. 34B. Note that, in the following description, only portions different from the fourth embodiment will be described, and the same names and reference numerals will be given to the other portions, and description thereof will be omitted.

As illustrated in FIG. 32A to FIG. 34B, according to this embodiment, in a frame 610*b* of the drum unit 6, an opening portion 6142 into which a bottom portion 700*b*1 of a casing 700*b* of the development unit 7 is fitted is enlarged up to a leading edge wall 613*a*. More specifically, the opening portion 6142 includes a fitting portion 6142*a* into which the bottom portion 700*b*1 of the development unit 7 is fitted, and an opening portion 6142*b* through which the fitting portion 6142*a* is opened forward.

The opening portion 6142*b* is formed with a width that is slightly narrower than a width of the fitting portion 6142*a* in the rotational axis direction of the photosensitive drum 61, and extends from the fitting portion 6142*a* to a forward side. According to this, on the forward side of the fitting portion 6142*a*, a central portion of a forward side bottom portion 614Fb and the leading edge wall 613*a* is cut out in a state in which the fitting portion 6142*a* is opened. Note that, pressing members 640 and 640 and protruding portions 643*a* and 643*a* are formed in the forward side bottom portion 614Fb and the leading edge wall 613*a* which remain without being cut out by the opening portion 6142*b* in a right-left direction.

Summary of Fifth Embodiment

A process cartridge according to this embodiment (5) includes:

a development unit (7) that includes a development roller (71); and a drum unit (6) that includes a photosensitive drum (61) in which a toner image is developed on a surface by the development roller (71), and a frame (610*b*) on which the development unit (7) is detachably mounted, in which in the frame (610*b*), a bottom portion (614Fb) that supports the development unit (7) is provided with an opening (6142) which a part of the development unit (7) enters in a state in which the development unit (7) is mounted, an opening (6242) is formed in such a manner that an end portion opposite to the development roller (61) is opened, and a part (700*b*11) of the development unit (7) is located downward of a surface (614Fb1) of the bottom portion (614Fb) on a side facing the development unit when viewed from the rotational axis direction of the photosensitive drum.

As described above, when viewed from a direction perpendicular to the axis of the photosensitive drum 61, the lower end portion 700*b*11 of the lower surface (bottom surface) 700*b*1 of the development unit 7 protrudes further downward than the upper surface 614Fb1 of the bottom portion 614Fb of the frame 610*b* of the drum unit 6. In addition, since an end portion of the opening portion 6242 which is opposite to the photosensitive drum 61 is opened, it is possible to enlarge the leading edge portion of the casing 700 of the development unit 7 to a further forward side than the leading edge wall 613*a*. According to this, it is possible to store a more amount of toners, and it is possible to provide the development unit 7 with a large storage capacity.

Note that, in this embodiment, the central portion of the leading edge wall 613*a* is cutout, and thus a grip portion that is gripped by a user is not provided on the drum unit 6 side, but when mounting the process cartridge 5 on the apparatus body 2, the grip portion 701 of the development unit 7 is gripped.

Sixth Embodiment

Next, a configuration of a process cartridge 5 according to a sixth embodiment will be described with reference to FIG. 35 to FIG. 43. Note that, in the following description, only portions different from the fourth embodiment will be described, and the same names and reference numerals will be given to the other portions, and description thereof will be omitted.

Figure 35:
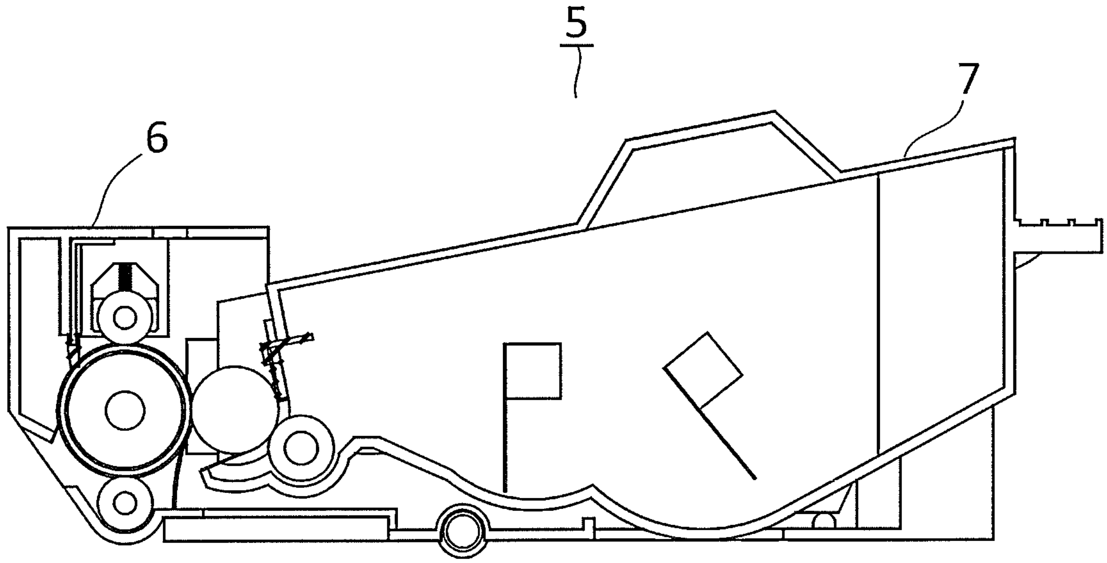
FIG. 35 is a cross-sectional view illustrating a process cartridge according to a sixth embodiment.
Figure 36:
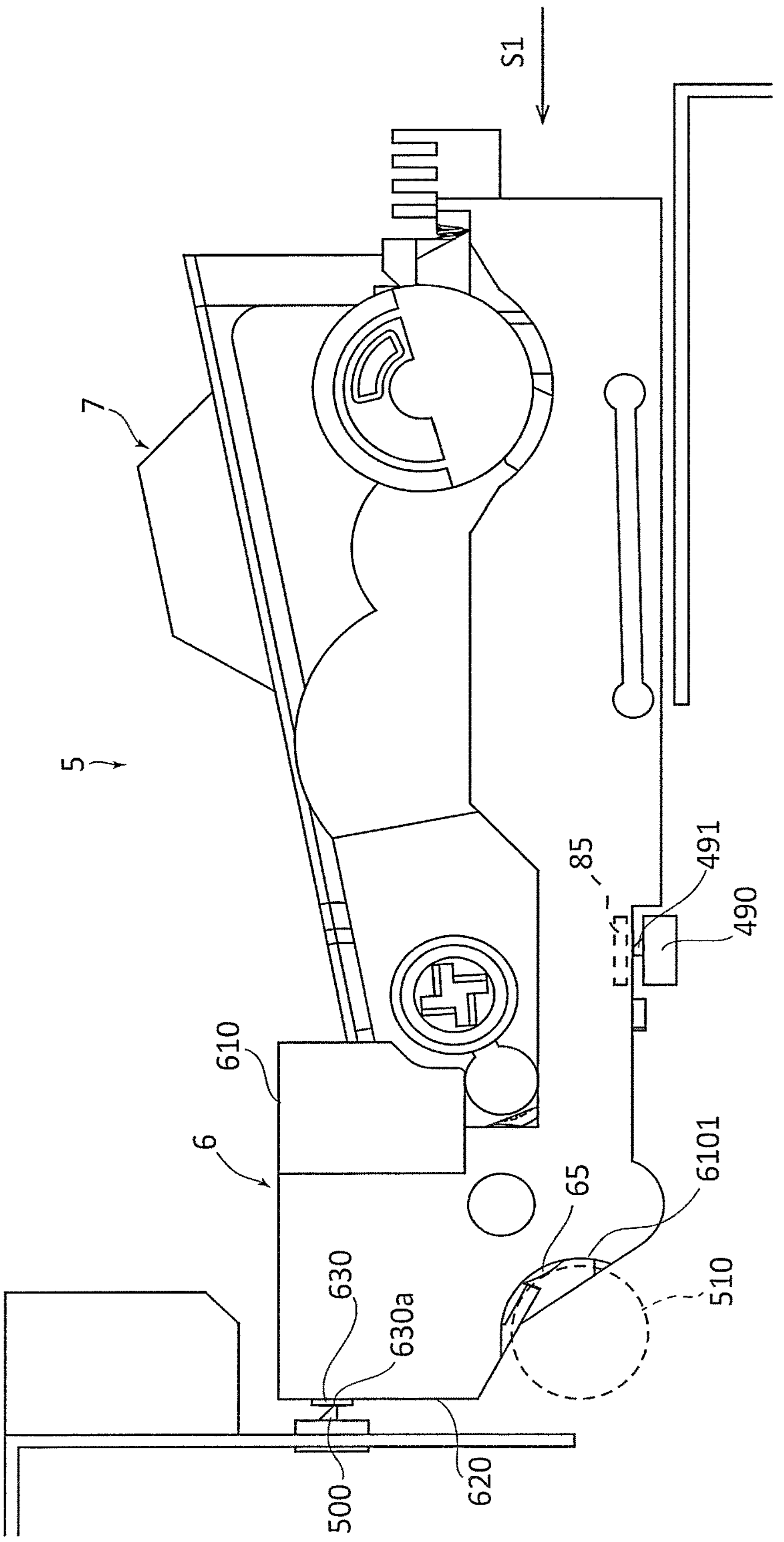
FIG. 36 is a schematic view illustrating a state in which the process cartridge is mounted on an apparatus body.
Figure 37A:
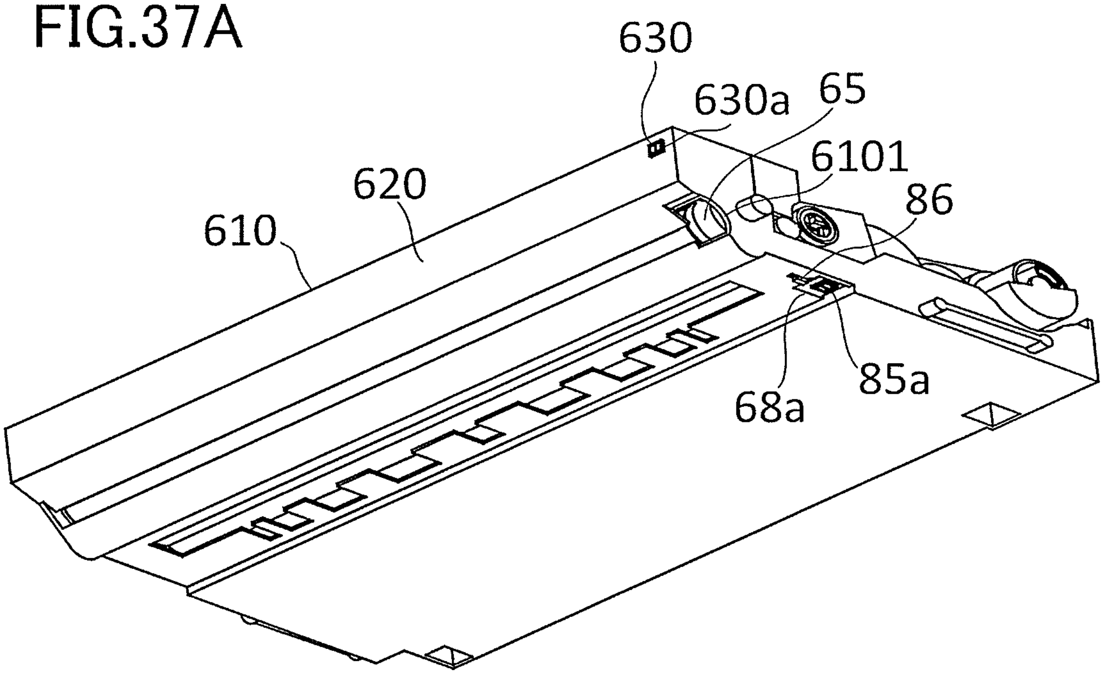
FIG. 37A is a perspective view illustrating the process cartridge.
Figure 37B:
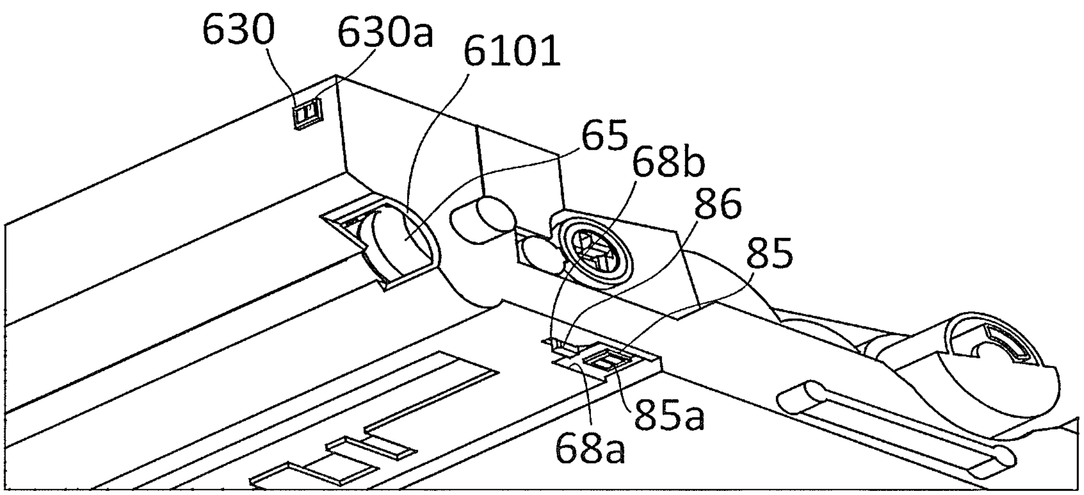
FIG. 37B is an enlarged view illustrating a rear-left end side of the process cartridge illustrated in FIG. 37A.
Figure 38A:
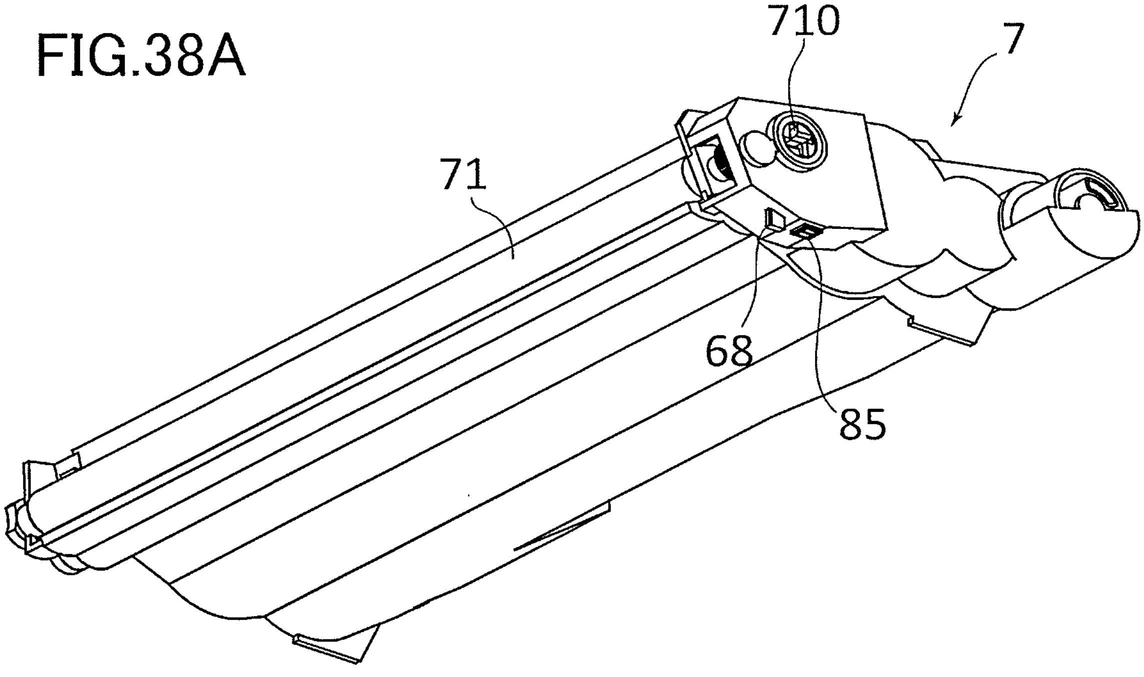
FIG. 38A is a perspective view illustrating the development unit.
Figure 38B:
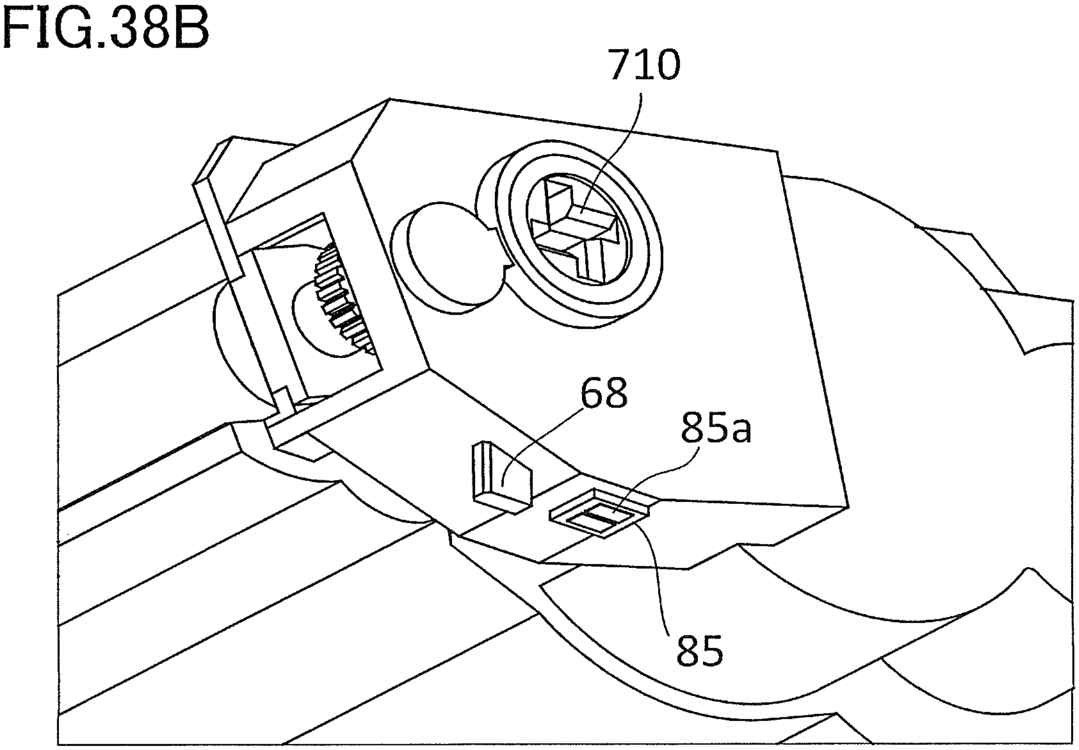
FIG. 38B is an enlarged view illustrating a rear-left end side of the development unit illustrated in FIG. 38A.
Figure 39A:
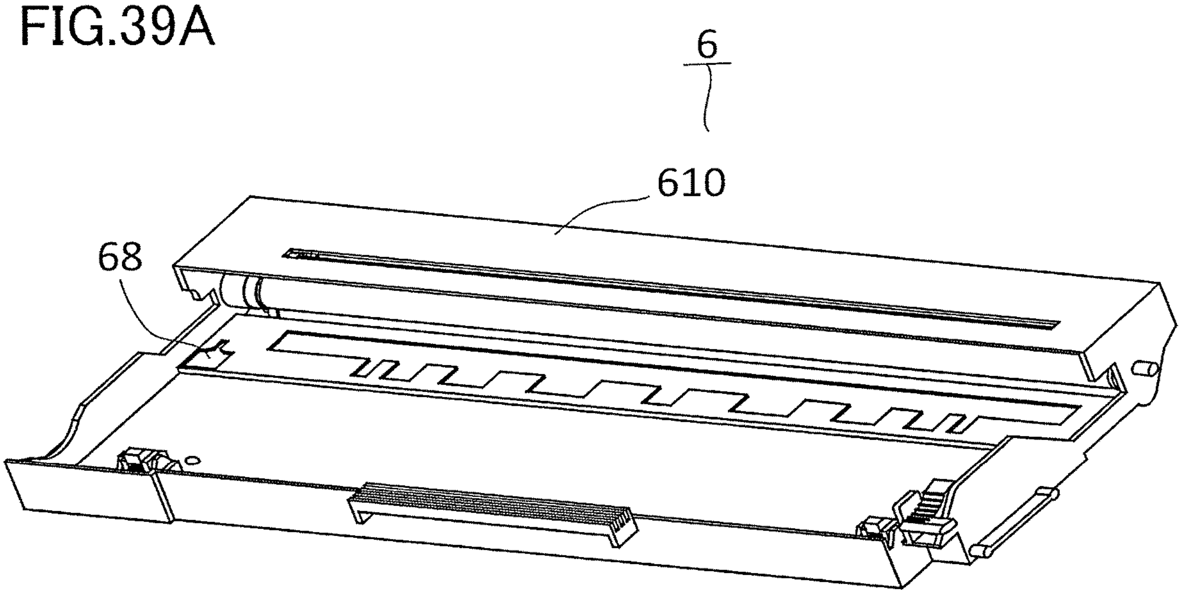
FIG. 39A is a perspective view illustrating the drum unit.
Figure 39B:
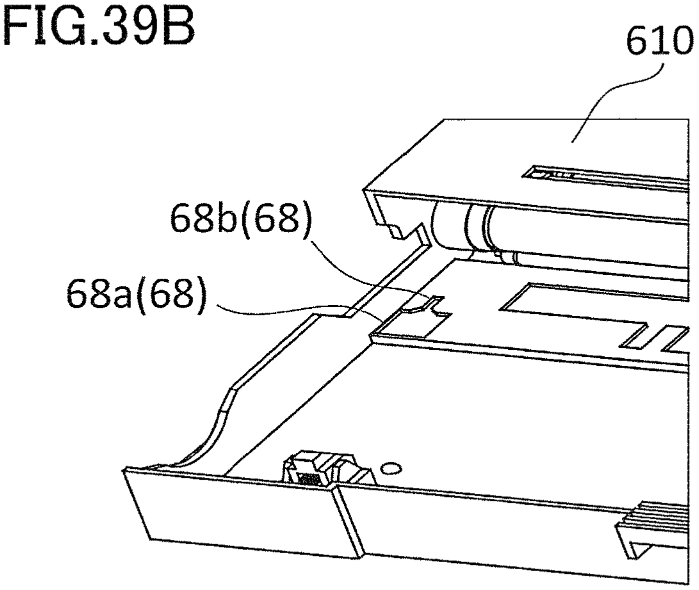
FIG. 39B is an enlarged view illustrating a rear-left end side of the drum unit illustrated in FIG. 39A.

As illustrated in FIG. 35 and FIG. 36, in the process cartridge 5 according to this embodiment, a memory 630 that stores information on the drum unit 6 is provided not only in the development unit 7 but also in the drum unit 6. Similarly, a body side electrode 252 that comes into contact with an electrode 630*a* of the memory 630 is provided also on the apparatus body 2 side. Note that, in the following description, the memory 85 of the development unit 7 is referred to as a development memory, and the memory 630 of the drum unit 6 is referred to as a drum unit memory. In addition, the electrode (electric contact) 491 on the apparatus body side which comes into contact with the electrode (electric contact) 85*a* of the development memory 85 is referred to as a first body side electrode, and the electrode (electric contact) 500 that comes into contact with the electrode (electric contact) 630*a* of the drum unit memory 630 is referred to as a second body side electrode.

Information (for example, an integrated number of revolutions or an integrated time) relating to exchange of the photosensitive drum 61 is stored in the drum unit memory 630. The drum unit memory 630 is fixed to a trailing edge wall 620 that is provided to be erected from a trailing edge portion in the frame 610 of the drum unit 6 by a method such as bonding welding heat caulking press-fitting and sandwiching. According to this, the electrode 630*a* of the drum unit memory 630 is exposed toward a rearward side, and when the process cartridge 5 is attached to the apparatus body 2, the electrode 630*a* comes into contact with the second body side electrode 500. Note that, the electrode 630*a* of the drum unit memory 630 may be exposed toward the rearward side through an opening formed in the trailing edge wall 620.

By the way, as illustrated in FIG. 36 to FIG. 39B, the first photosensitive drum gear 65 (also refer to FIGS. 14A and 14B in the first embodiment) that rotates the photosensitive drum 61 is exposed in a state in which a part of the trailing edge portion of the frame 610 is opened. In addition, the first photosensitive drum gear 61 engages with the drive gear 510 on the apparatus body 2 side in an opening 6101.

Figure 40A:
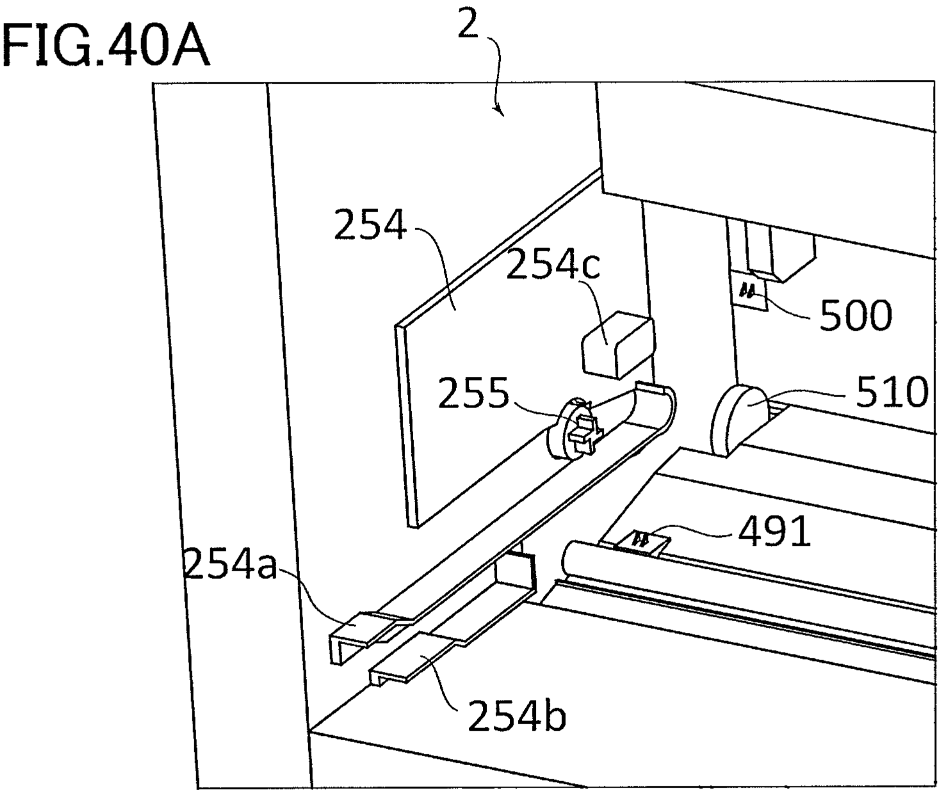
FIG. 40A is a schematic view illustrating a guide configuration on a leftward side of the apparatus body.
Figure 40B:
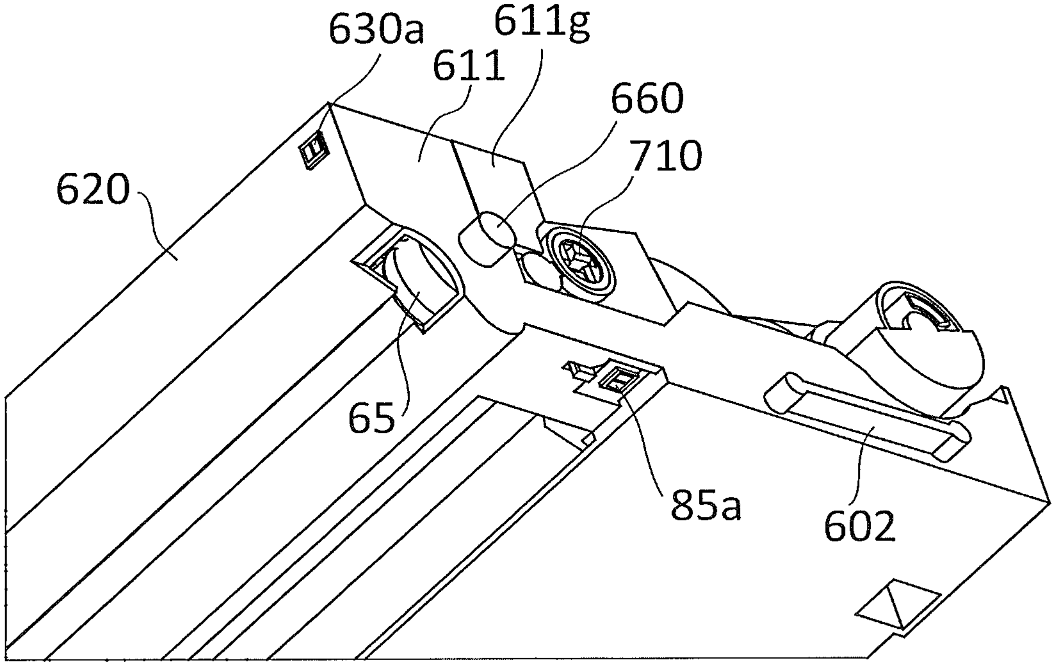
FIG. 40B is a perspective view illustrating a leftward side of the process cartridge.

FIG. 40A is a perspective view when an inner side of the apparatus body 2 is viewed from a right side toward a left side. The drive gear 510 is located on a left-rear side in amounting space of the process cartridge 5 in the apparatus body 2. In addition, the second body side electrode 500 is provided on a left side of a deep side wall portion of the apparatus body 2, and the first body side electrode 491 is provided in a lower-left side.

In addition, a left body guide 254 is provided in a left side wall portion of the apparatus body 2, and the left body guide 254 includes a first guide portion 254*a*, a second guide portion 254*b*, a body side drive coupling 255, and a projecting portion 254*c*. The first guide portion 254*a* guides the first positioning protrusion 660 provided in the left side wall 611 of the drum unit 6, and the second guide portion 254*b* guides the first guide rib 662 (also refer to FIG. 40B). In addition, the body side drive coupling 255 engages with a development coupling 710 for driving.

Figure 41A:
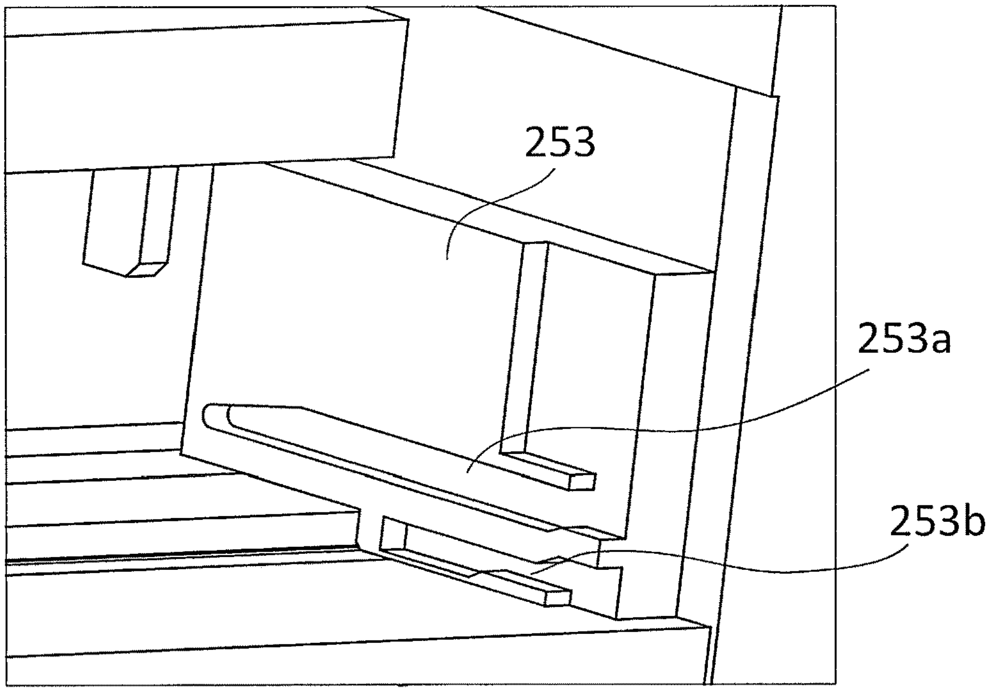
FIG. 41A is a schematic view illustrating a guide configuration on a rightward side of the apparatus body.
Figure 41B:
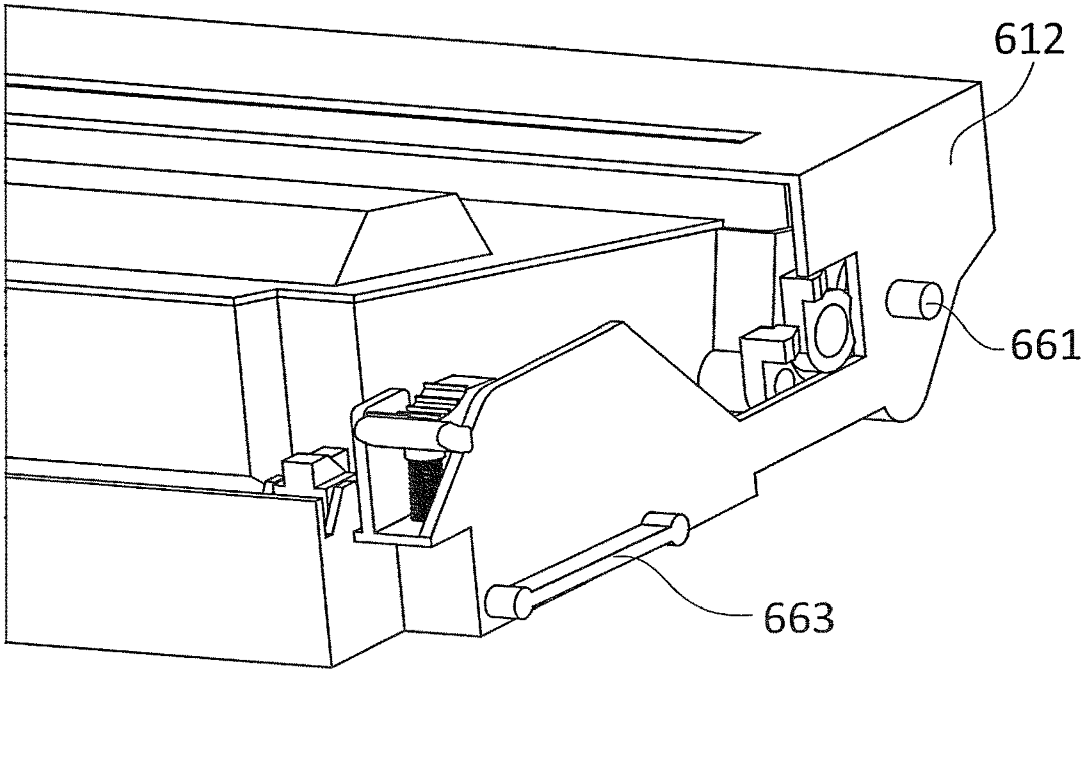
FIG. 41B is a perspective view illustrating a rightward side of the process cartridge.

Note that, as illustrated in FIG. 41A, the right body guide 253 is also provided in a right side wall portion of the apparatus body 2. The right body guide 253 includes a third guide portion 253*a* and a fourth guide portion 253*b*. The third guide portion 253*a* guides the second positioning protrusion 661 provided in the right side wall 612 of the drum unit 6, and the fourth guide portion 253*b* guides the second guide rib 663 (also refer to FIG. 41B).

Figure 42:
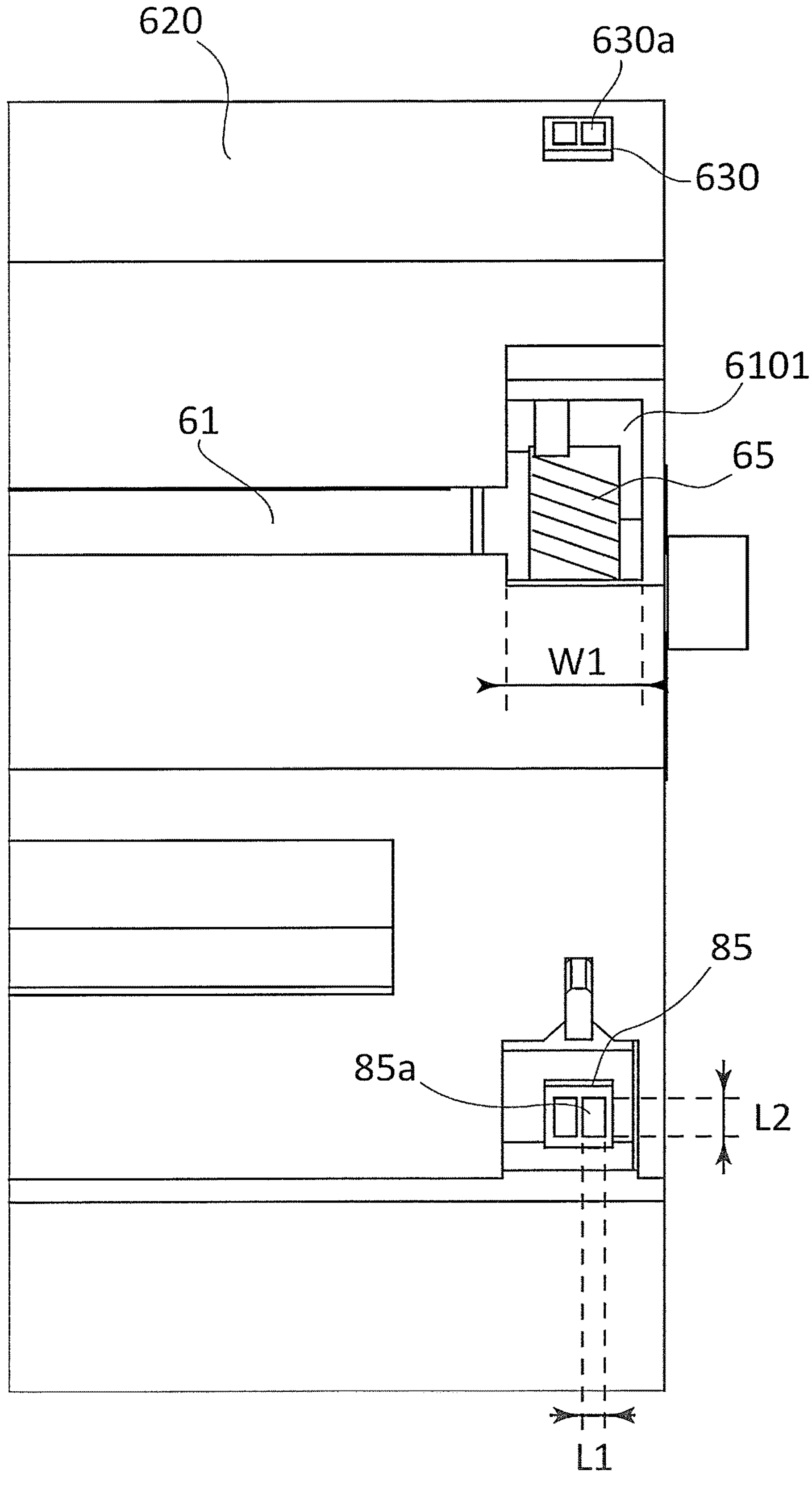
FIG. 42 is a view for describing an engagement structure of a first photosensitive drum gear.
Figure 43:
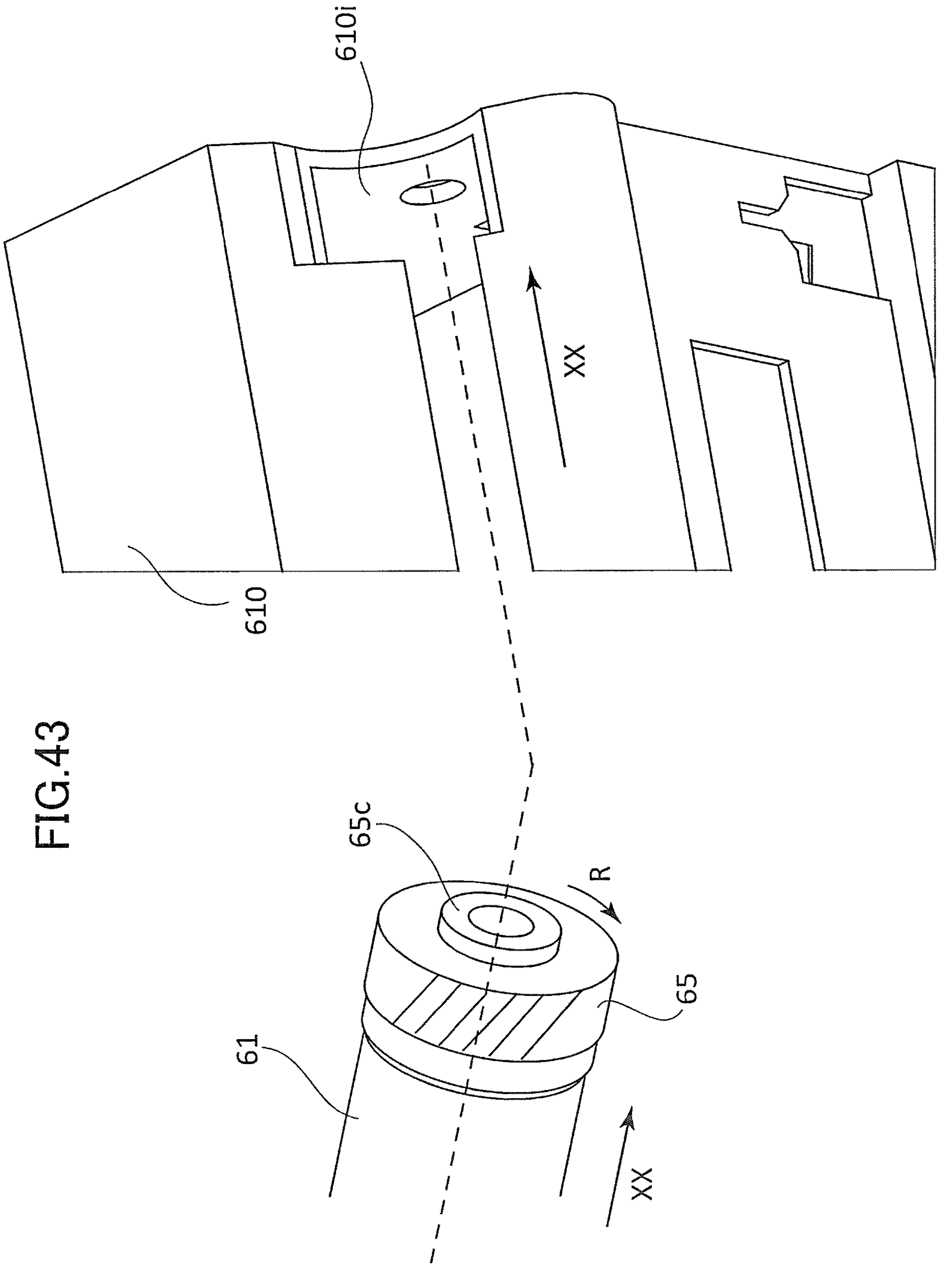
FIG. 43 is a view for describing an operation of a thrust force that is generated by the first photosensitive drum gear.

Next, a relationship between engagement between the drive gear 510 and the first photosensitive drum gear 65, and contact between electrodes will be described. As illustrated in FIG. 42, the first photosensitive drum gear 65 is exposed through the opening 6101 of the frame 610. The opening 6101 overlaps the electrode 85*a* of the development memory 85 and the electrode 630*a* of the drum unit memory 630 in a direction perpendicular to the rotational axis direction when viewed from the rotational axis direction of the photosensitive drum 61. Note that, a region range indicated by a dimension W1 in the drawing is a range in which the opening 6101 exists in the rotational axis direction.

Here, the first photosensitive drum gear 65 is constituted by a helical gear of which a twisting direction is right. Note that, in this embodiment, the "helical gear of which a twisting direction is right" represents that the twisting direction is a right-upward direction when viewed from a front side while the rotational axis faces the top and the bottom. In addition, similarly, the drive gear 510 on the apparatus body 2 side with which the first photosensitive drum gear 65 engages is also formed by a corresponding helical gear. In addition, when the first photosensitive drum gear 65 is driven by the drive gear 510 and rotates in a direction indicated by an arrow R as a rotational direction of the photosensitive drum 61, the first photosensitive drum gear 65 receives a force to move in a direction indicated by an arrow XX with a thrust force generated by the helical gear.

In this case, an end face 65*c* of the first photosensitive drum gear 65 comes into contact with an inner end face 610*i* of the frame 610 of the drum unit 6, and according to this, relative positioning of the first photosensitive drum gear 65 with respect to the frame 610 is performed. In addition, in this case, the frame 610 of the drum unit 6 is pressed in the direction indicated by the arrow XX by the end face 65*c* of the first photosensitive drum gear 65. According to this, as a result, a contact surface 611*g* of the frame 610 of the drum unit 6 illustrated in FIG. 40B comes into contact with the projecting portion 254*c* illustrated in FIG. 40A. In addition, according to this, positioning between the apparatus body 2 and the process cartridge 5 in the rotational axis direction (right-left direction) is performed.

In this manner, when positioning of the position of the process cartridge 5 in the rotational axis direction is performed with high accuracy, positioning of the electrode 85*a* of the development memory 85, the first body side electrode 491, the electrode 630*a* of the drum unit memory 630, and the second body side electrode 500 is performed with high accuracy. In addition, positioning accuracy of the electrodes in the rotational axis direction is high, as illustrated in FIG. 42, a width of the electrode 85*a* and the electrode 630*a* in the rotational axis direction can be reduced. For example, in this embodiment, a width in the rotational axis direction is set as L1 and a width in a direction perpendicular to the rotational axis direction is set as L2, the electrode 85*a* and the electrode 630*a* are formed in a rectangular shape in which a relationship of L1<L2 is satisfied. The electrode 85*a* and the electrode 630*a* are subjected to rare metal plating such as gold plating, and thus it is possible to realize cost reduction corresponding to a reduction of the width in the rotational axis direction.

Summary of Sixth Embodiment

A process cartridge (5) according to this embodiment includes:

a drum unit (6) that includes a photosensitive drum (61); and a development unit (7) that includes a development roller (71) that supplies a toner to the photosensitive drum (61) and develops a toner image, and is configured to be detachably mounted on the drum unit (6), in which the development unit (7) includes, a first memory (85) that stores information on the development unit (7), and the drum unit (6) includes, a second memory (630) that stores information on the drum unit (6), and a photosensitive drum gear (65) that engages with an apparatus body side gear (510) and drives the photosensitive drum (61), and the photosensitive drum gear (65) is a helical gear.

As described above, since the photosensitive drum gear 65 is constituted by the helical gear, it is possible to perform positioning of the process cartridge 5 with respect to the apparatus body 2 in the rotational axis direction of the photosensitive drum 61 with a thrust force that is received by the photosensitive drum gear 65 with high accuracy. According to this, positioning of the first and second memories 85 and 630 with respect to the apparatus body side electrode becomes highly accurate.

In addition, the photosensitive drum gear (65) is configured to receive a force from the apparatus body side gear (510) toward one side in the rotational axis direction of the photosensitive drum (61), and the first and second memories (85 and 630) are provided on one side in the rotational axis direction of the photosensitive drum (61) of the process cartridge (5). As described above, since the first and second memories 85 and 630 are biased to a positioning side of the process cartridge 5, it is possible to perform positioning of the first and second memories 85 and 630 with respect to the apparatus body side electrode with high accuracy.

Seventh Embodiment

Figure 44A:
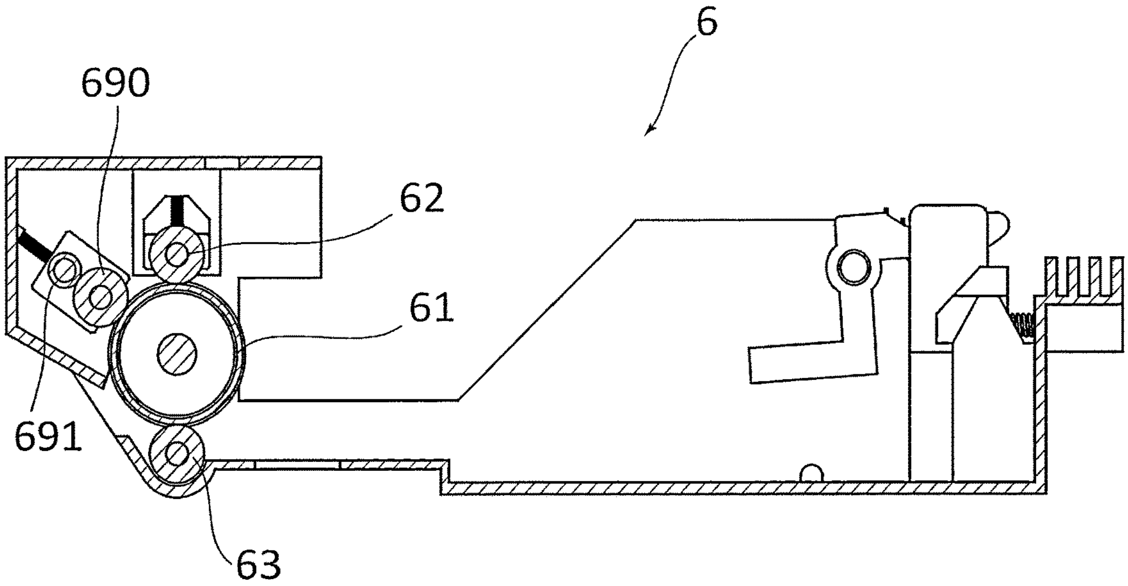
FIG. 44A is a perspective view illustrating a drum unit according to a seventh embodiment.

Next, a configuration of a process cartridge 5 according to a seventh embodiment will be described with reference to FIG. 44A to FIG. 45. Note that, in the following description, only portions different from the sixth embodiment will be described, and the same names and reference numerals will be given to the other portions, and description thereof will be omitted.

Figure 44B:
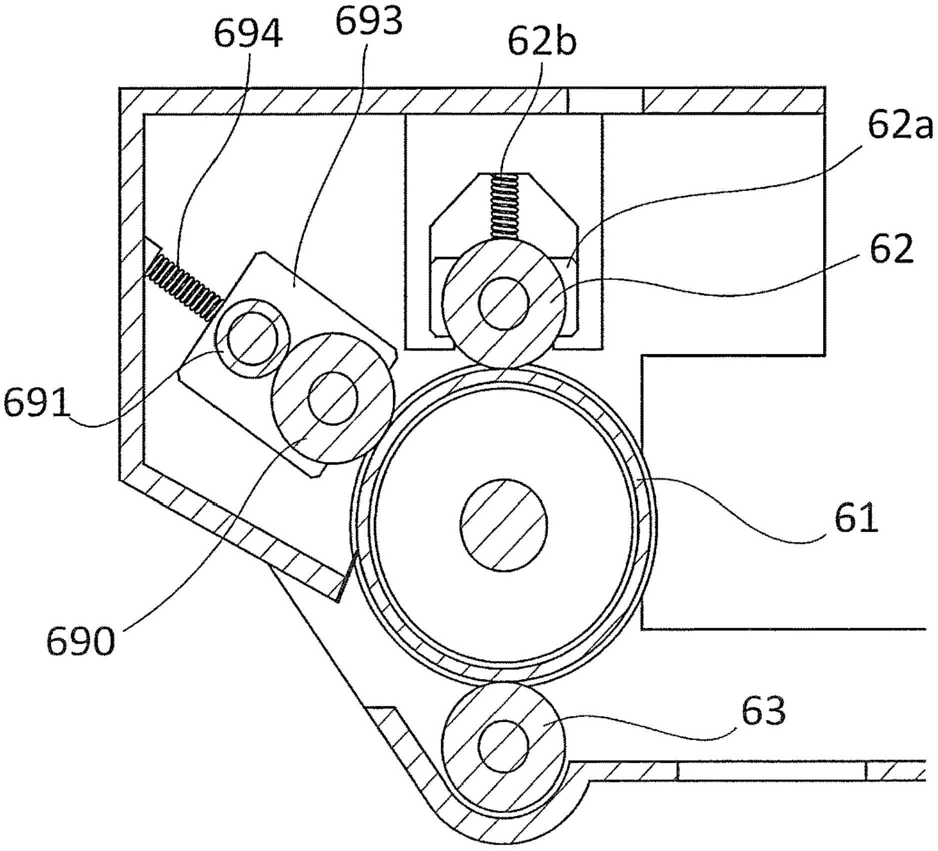
FIG. 44B is an enlarged view illustrating a structure in the vicinity of the photosensitive drum of the drum unit.

In the first to sixth embodiments, description has been given of a configuration in which the cleaning blade 64 comes into contact with the photosensitive drum 61. In this embodiment, description will be given of a process cartridge 5 having a configuration in which the cleaning blade is not used as a cleaning member. As illustrated in FIG. 44A and FIG. 44B, in the drum unit 6, a paper dust removal roller 690 is in contact with the photosensitive drum 61 on an upstream side of the charge roller 62 and on a downstream side of the transfer roller 63. In addition, a roller cleaner 691 is in contact with the paper dust removal roller 690.

The charge roller 62 is rotatably supported to a bearing 62*a*, and the bearing 62*a* is urged toward the photosensitive drum 61 by a spring 62*b*. In addition, the paper dust removal roller 690 and the roller cleaner 691 are rotatably supported by the bearing 693. The bearing 693 is urged toward the photosensitive drum 61 by a spring 694.

Figure 45:
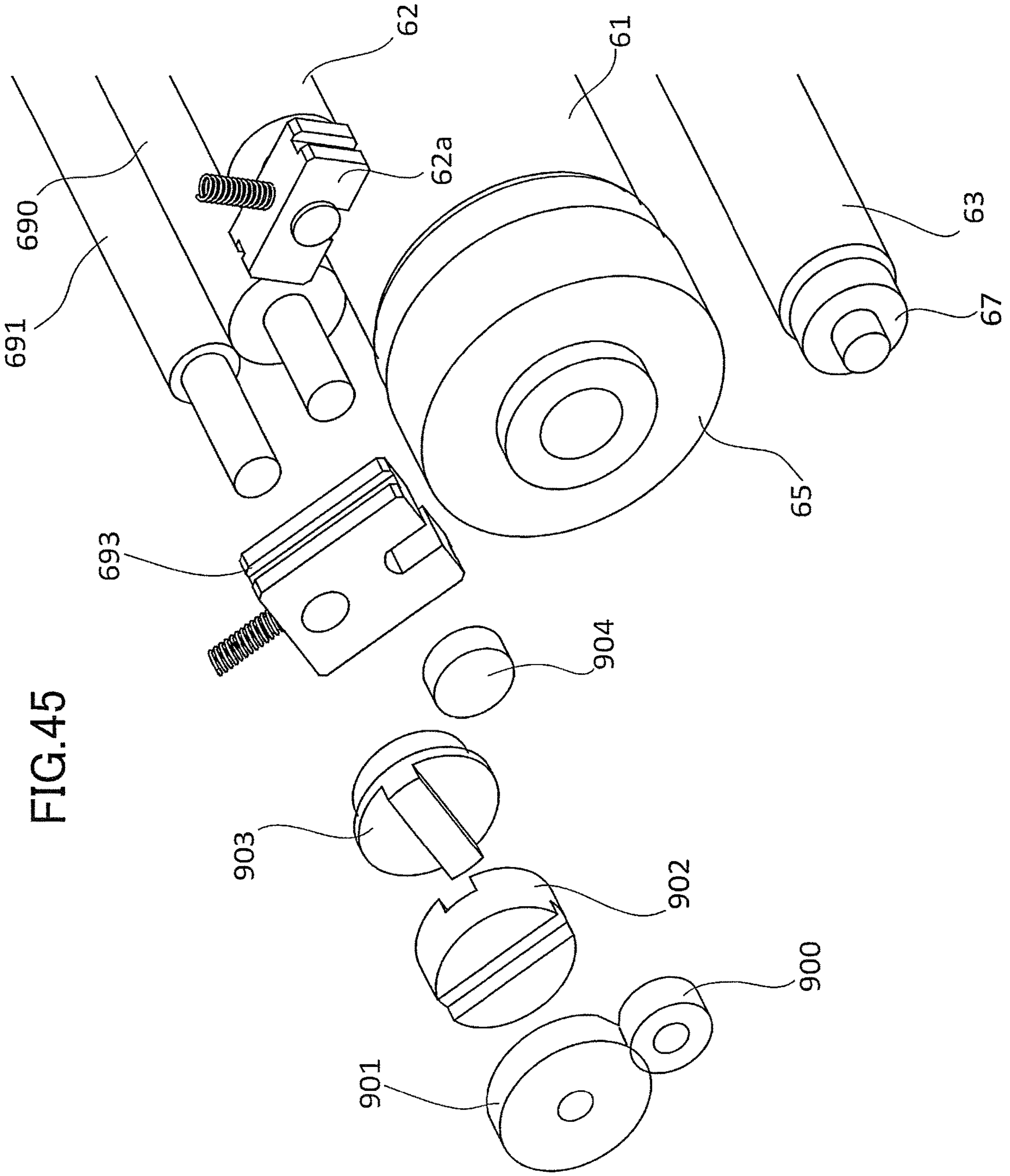
FIG. 45 is an assembly view illustrating a power transmission structure in the vicinity of the photosensitive drum.

FIG. 45 is an exploded perspective view illustrating a drive train of the paper dust removal roller 690, the roller cleaner 691, and the transfer roller 63. The drive train is constituted by connecting a roller cleaner outer gear 901, an intermediate body 902, a roller cleaner inner gear 903, and a paper dust removal roller gear 904 in this order from a transmission gear 900 that engages with the first photosensitive drum gear 65. The roller cleaner outer gear 901 is attached to an end portion of a metal shaft of the roller cleaner 691 in a non-rotatable manner. The paper dust removal roller gear 904 is attached to an end of a metal shaft of the paper dust removal roller 690 in a non-rotatable manner. The roller cleaner outer gear 901, the intermediate body 902, and the roller cleaner inner gear 903 constitute Oldham coupling. According to this, even in a case where the paper dust removal roller 690 and the roller cleaner 691 move relative to the frame 610, a drive connection state is maintained.

In addition, the second photosensitive drum gear 66 is provided on an inner side in the rotational axis direction of the first photosensitive drum gear 65 as described above, and a drive force of the first photosensitive drum gear 65 is transmitted to the second photosensitive drum gear 66. The transfer gear 67 is provided at an end portion of the transfer roller 63, and the transfer gear 67 rotates in engagement with the second photosensitive drum gear 66.

Note that, the first photosensitive drum gear 65 and the second photosensitive drum gear 66 may be integrated with each other or may be separated into individual bodies. In the case of the individual bodies, drive transmission of the first photosensitive drum gear 65 and the second photosensitive drum gear 66 is performed in a configuration in which concavities and convexities engage with each other.

Summary of Seventh Embodiment

In the drum unit 6 of this embodiment, the paper dust removal roller 690, the roller cleaner 691, the charge roller 62, and the transfer roller 63 operate as a brake with respect to rotation of the photosensitive drum 61. The greater a brake force with respect to the rotation of the photosensitive drum 61 is, the further the thrust force of the first photosensitive drum gear 65 that is a helical gear increases. According to this, the process cartridge 5 is likely to move in the rotational axis direction of the photosensitive drum 61, and positioning of the process cartridge 5 and the apparatus body 2 in the rotational axis direction of the photosensitive drum 61 is more reliably performed.

In this embodiment, the paper dust removal roller 690, the charge roller 62, and the transfer roller 63 are contact members which come into contact with the photosensitive drum. In addition, in addition to this, a cleaning blade may be further formed as a contact member. The contact member may be a type other than the above-described type as long as the contact member operates as a brake with respect to rotation of the photosensitive drum 61.

Eighth Embodiment

Next, a configuration of a process cartridge 5 according to an eighth embodiment will be described with reference to FIG. 46A and FIG. 46B. Note that, in the following description, only portions different from the sixth embodiment will be described, and the same names and reference numerals will be given to the other portions, and description thereof will be omitted.

Figure 46A:
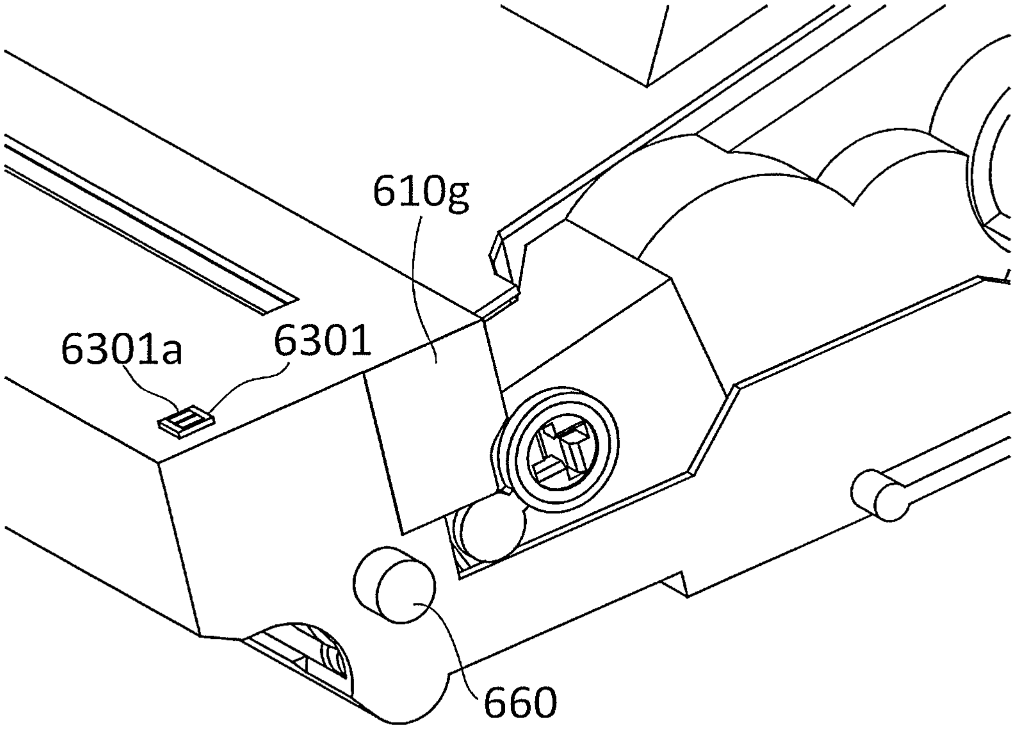
FIG. 46A is a perspective view illustrating a process cartridge according to an eighth embodiment.
Figure 46B:
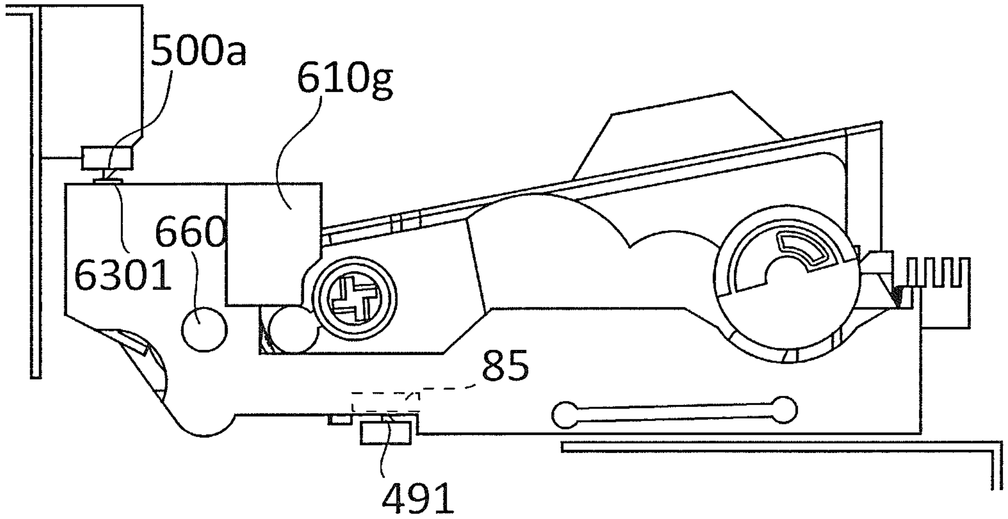
FIG. 46B is a schematic view illustrating a state in which the process cartridge is mounted on the apparatus body.

As illustrated in FIG. 46A and FIG. 46B, in this embodiment, a drum unit memory 6301 is provided in an upper surface 610U of a cover portion that covers the photosensitive drum 61 on a rearward side of the frame 610 of the drum unit 6. More specifically, the drum unit memory 6301 is provided in such a manner that the drum unit memory 6301, the first positioning protrusion 660, the contact surface 610*g*, and the development memory 85 are aligned in this order on a rearward side in the front-rear direction. In addition, a second body side electrode 500*a* on the apparatus body 2 side is also provided to protrude downward in correspondence with the drum unit memory 6301. According to this, a direction in which an electrode 6301*a* of the drum unit memory 6301 is pressed from the second body side electrode 500*a* is a direction that is substantially perpendicular to the mounting direction S1 of the process cartridge 5.

Summary of Eighth Embodiment

As described above, in this embodiment, the direction in which the electrode 6301*a* of the drum unit memory 6301 is pressed by the second body side electrode 500*a* is set to a direction intersecting the mounting direction S1. According to this, a force that the process cartridge 5 receives from the second body side electrode 500*a* in a direction getting out from the apparatus body 2 decreases. Accordingly, a main cause for deterioration of positioning accuracy of the process cartridge 5 within the apparatus body 2 decreases, and it is possible to improve positioning accuracy of the process cartridge 5 with respect to the apparatus body 2.

Ninth Embodiment

Next, a configuration of a process cartridge 5 according to a ninth embodiment will be described with reference to FIG. 47A and FIG. 47B. Note that, in the following description, only portions different from the eighth embodiment will be described, and the same reference numerals will be given to the other portions, and description thereof will be omitted.

Figure 47A:
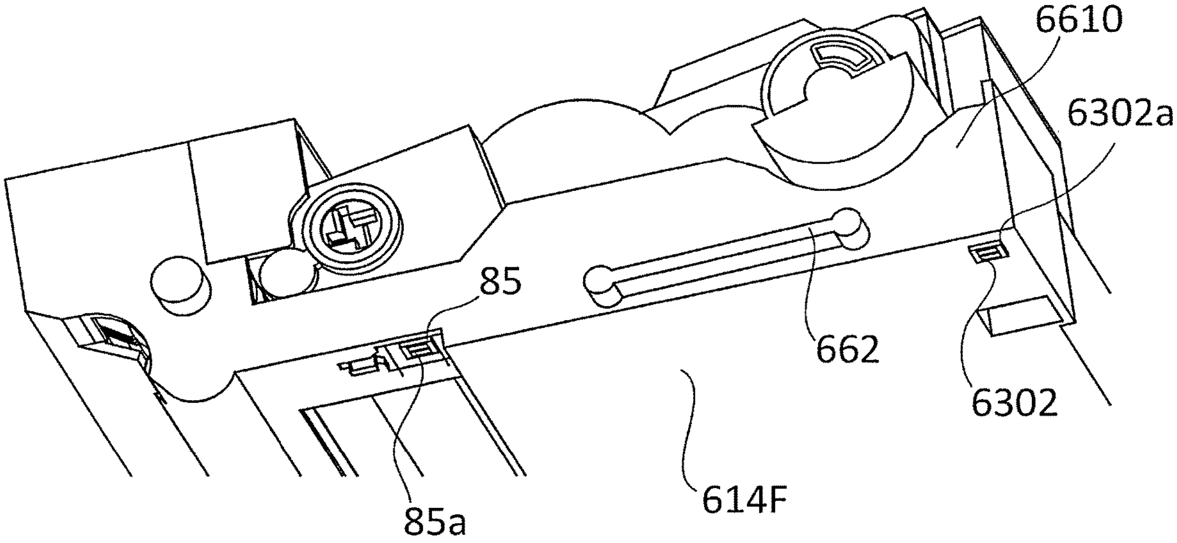
FIG. 47A is s perspective view when a process cartridge according to a ninth embodiment is viewed from a downward side.
Figure 47B:
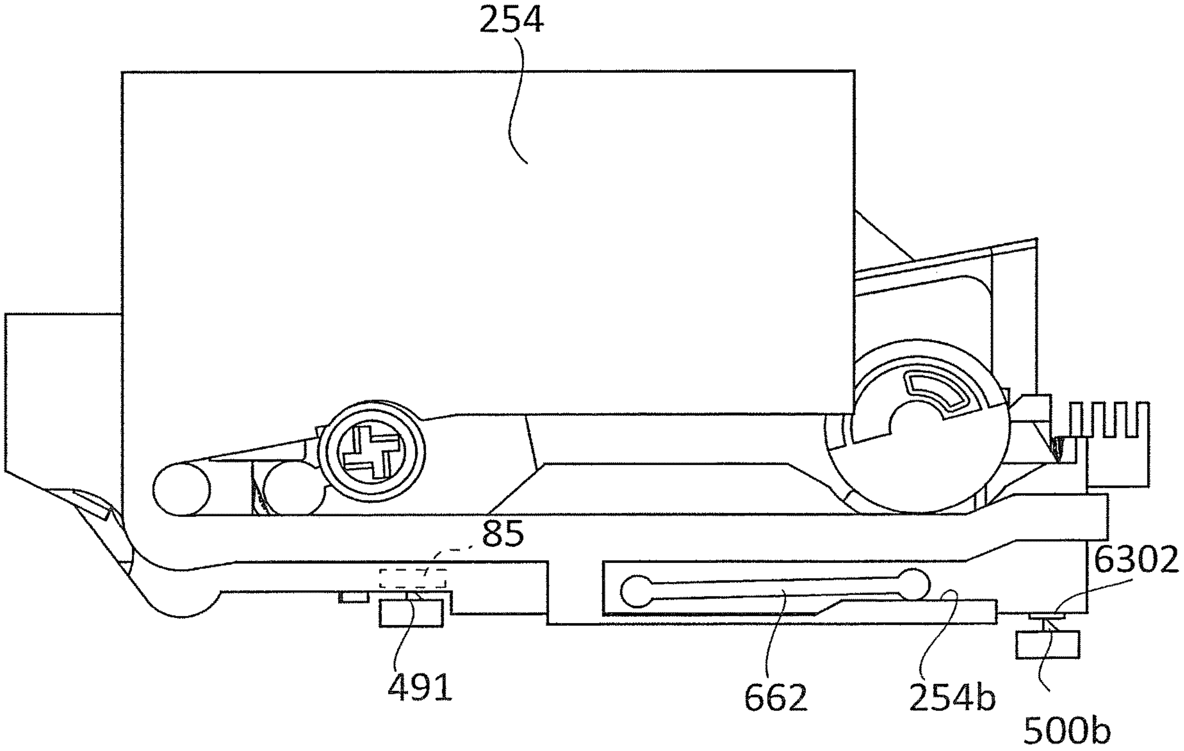
FIG. 47B is a view illustrating a relationship between a drum unit memory and a guide.

As illustrated in FIG. 47A and FIG. 47B, in this embodiment, a drum unit memory 6302 that stores information on the drum unit 6 is provided in a left-rear lower side of the frame 610 of the drum unit 6. That is, the drum unit memory 6302 is formed in a lower surface of the forward side bottom portion 614F of the frame 610, and an electrode 6302*a* is exposed toward a downward side. That is, the drum unit memory 6302 is disposed on a lower surface (abutting surface) of the first guide rib 662 that is supported by the second guide portion 254*b*. In addition, in correspondence with this, a second body side electrode 500*b* on the apparatus body 2 side protrudes upward from the apparatus body 2.

Summary of Ninth Embodiment

As described above, in this embodiment, a direction in which the electrode 6302*a* of the drum unit memory 6302 is pressed by the second body side electrode 500*b* is set to a direction interesting the mounting direction S1. According to this, due to the pressure, a force that the process cartridge 5 receives in a direction getting out from the apparatus body 2 decreases. Accordingly, a main cause for deterioration of positioning accuracy of the process cartridge 5 within the apparatus body 2 decreases, and it is possible to improve positioning accuracy of the process cartridge 5 with respect to the apparatus body 2.

In addition, since the drum unit memory 6302 is disposed on the abutting surface side of the first guide rib 662, it is possible to prevent the drum unit memory 6302 from excessively approaching the second body side electrode 500*b*. According to this, an upward and downward position of the drum unit memory 6302 is stable, and thus it is possible to reduce a variation in an electrode contact pressure.

Tenth Embodiment

Next, a configuration of a process cartridge 5 according to a tenth embodiment will be described with reference to FIG. 48A to FIG. 53B. Note that, in the following description, only portions different from the eighth embodiment will be described, and the same names and reference numerals will be given to the other portions, and description thereof will be omitted.

Figure 48A:
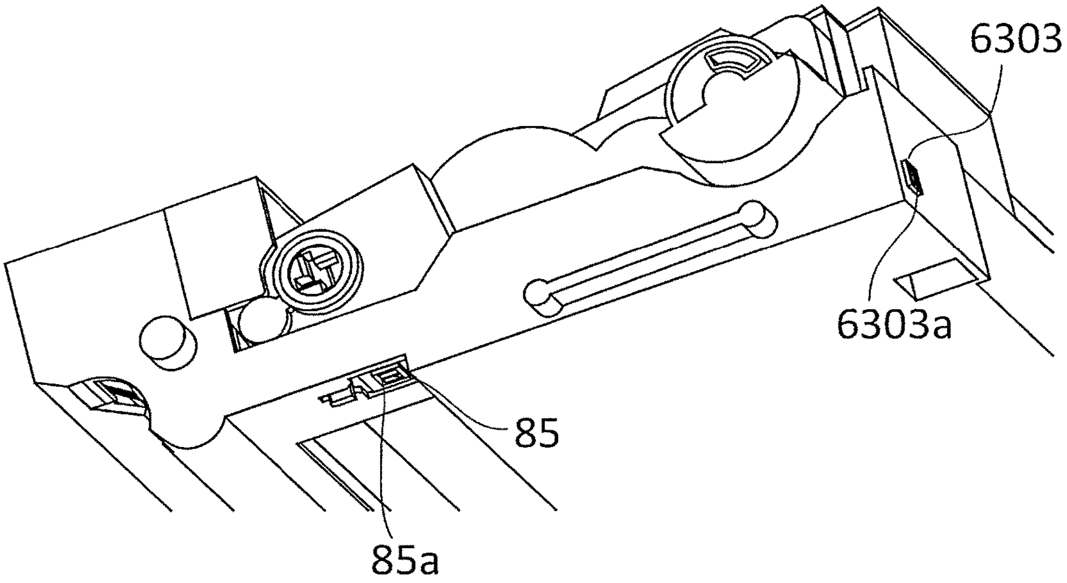
FIG. 48A is a perspective view illustrating a process cartridge according to a tenth embodiment.
Figure 48B:
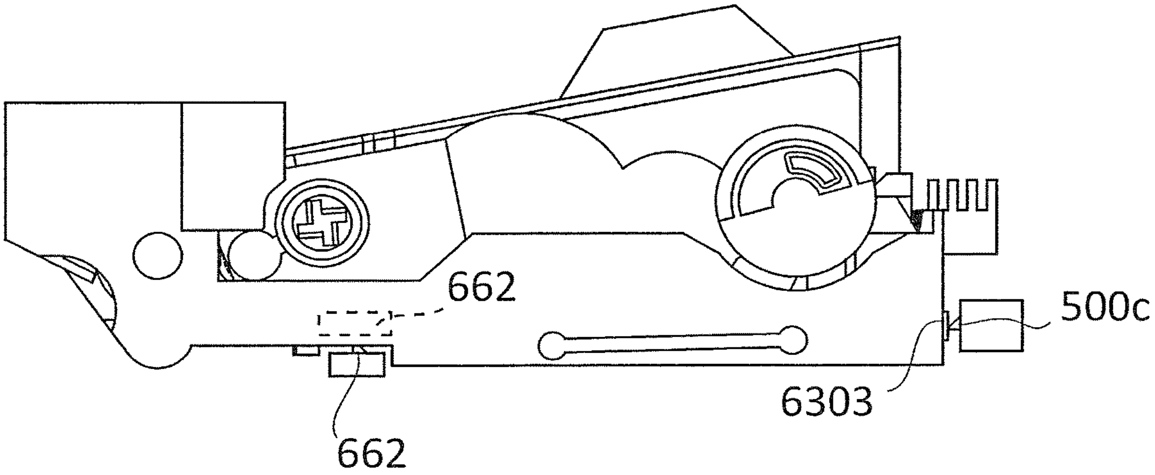
FIG. 48B is a side view of the process cartridge.

As illustrated in FIG. 48A and FIG. 48B, in this embodiment, a drum unit memory 6303 that stores information on the drum unit 6 is provided in the leading edge wall 613 of the frame 610 of the drum unit 6. According to this, an electrode 6303*a* of the drum unit memory 6303 protrudes forward and is exposed.

Figure 49A:
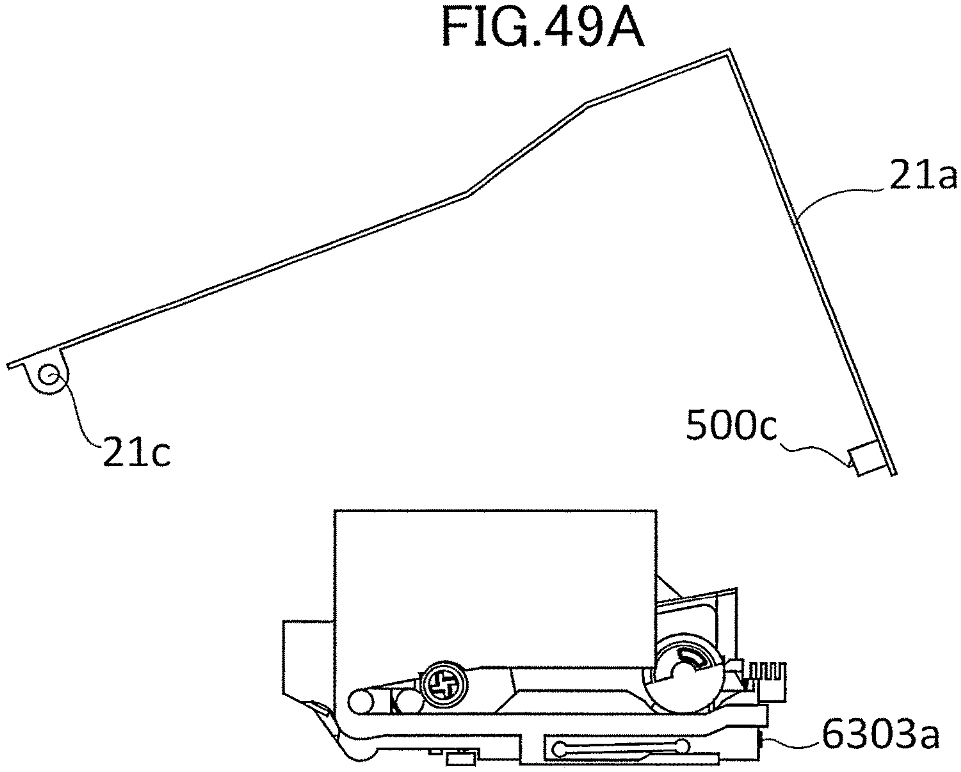
FIG. 49A is a schematic view illustrating the process cartridge in a state in which a door is opened.
Figure 49B:
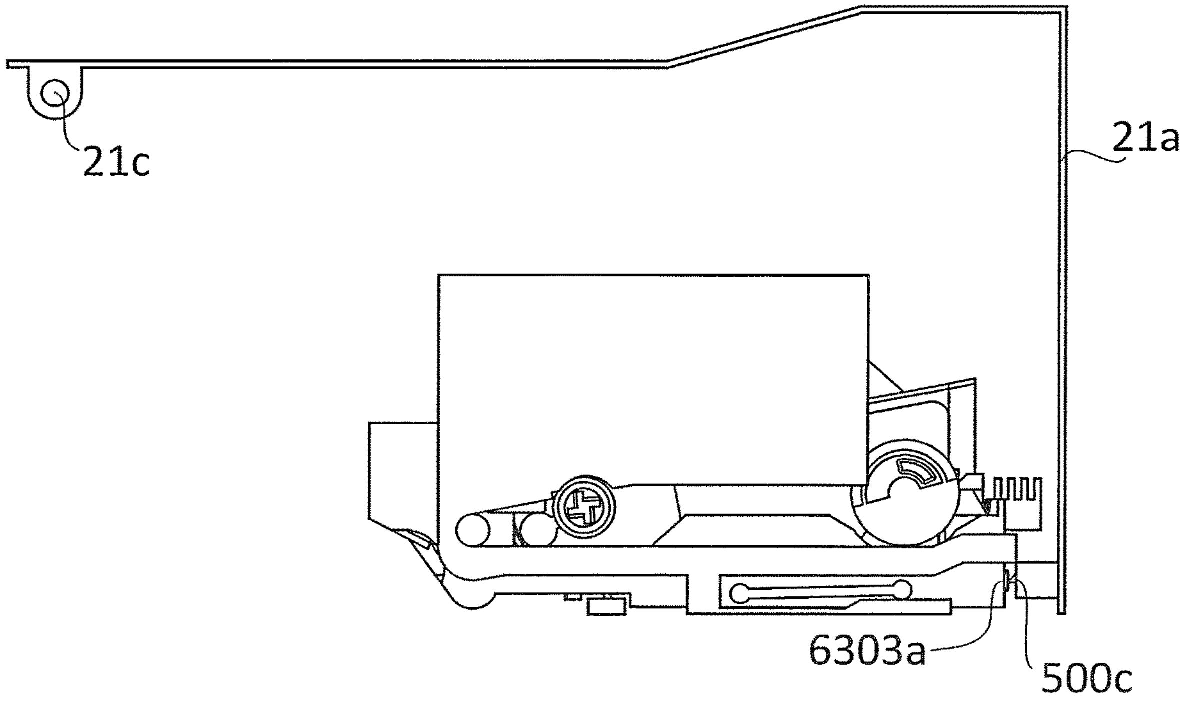
FIG. 49B is a schematic view illustrating a process cartridge in a state in which the door is closed.

In addition, in correspondence with this, as illustrated in FIG. 49A, a second body side electrode 500*c* on the apparatus body 2 side is attached to an inner wall of a body door 21*a* serving as an opening and closing member. The body door 21*a* is configured to pivot around a pivot shaft 21*c* as a rotation center, and in the case of an open state as in FIG. 49A, the second body side electrode 500*c* and the electrode 6303*a* of the drum unit memory 6303 are separated from each other. In addition, in a close state as in FIG. 49B, the second body side electrode 500*c* comes into contact with the electrode 6303*a* of the drum unit memory 6303.

In the close state, the second body side electrode 500*c* is urged by an electrode contact pressure in a direction of pushing rearward the process cartridge 5. According to this, the first positioning protrusion 660 is pressed in a direction of coming into contact with a rear side surface of the first guide portion 254*a*, and a position of the process cartridge 5 relative to the apparatus body 2 can be stabilized.

Figure 50A:
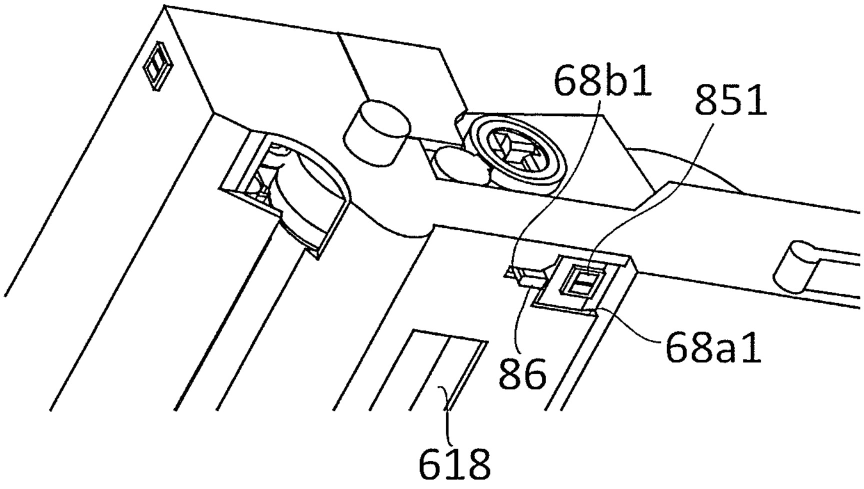
FIG. 50A is a perspective view when a leftward side of the process cartridge is viewed from a downward side.
Figure 50B:
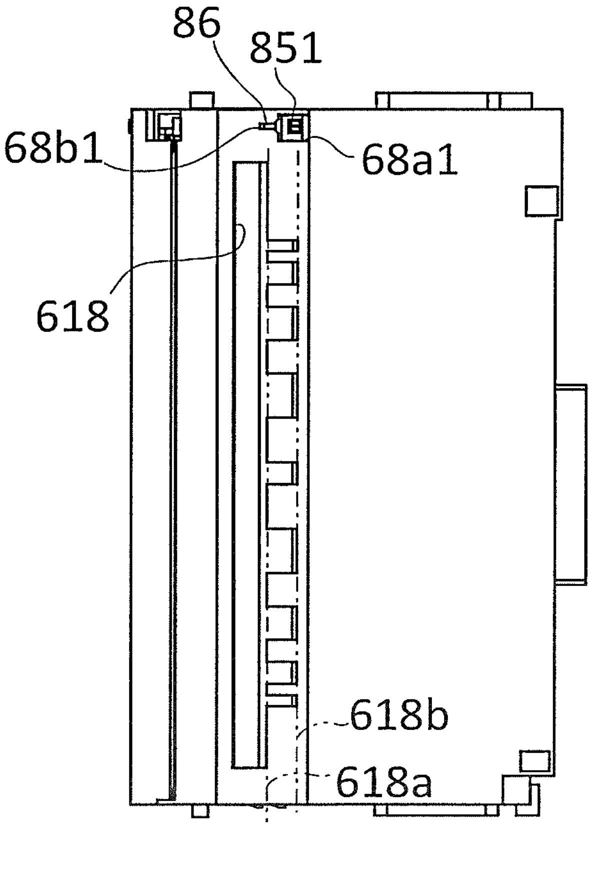
FIG. 50B is a bottom view of the process cartridge.

In addition, as illustrated in FIG. 50A and FIG. 50B, a development memory 851 is disposed as follows. That is, in this embodiment, the sheet passage hole 618 is formed in such a manner that an entrance portion thereof is widened to guide a sheet to the sheet passage hole 618. More specifically, the entrance portion includes an edge portion 618*a* (indicated by two-dot chain line) having a narrow width in the front-rear direction, and an edge portion 618*b* (indicated by two-dot chain line) having a wide width in the front-rear direction. In addition, the development memory 851 is provided so that a part of a positioning hole 68*b*1 and the electrode exposing hole 68*a* are located forward of the edge portion 618*a* in the front-rear direction.

According to this configuration, the positioning hole 68*b*1 and the electrode exposing hole 68*al* can deviate to a forward side from the sheet passage hole 618 in a direction perpendicular to the rotational axis direction when viewed from the rotational axis direction of the photosensitive drum 61. According to this, a distance between the positioning hole 68*b*1 and the electrode exposing hole 68*al*, and the sheet passage hole 618 can be increased, and thus the strength of the frame 610 of the drum unit 6 can be improved.

Figure 51A:
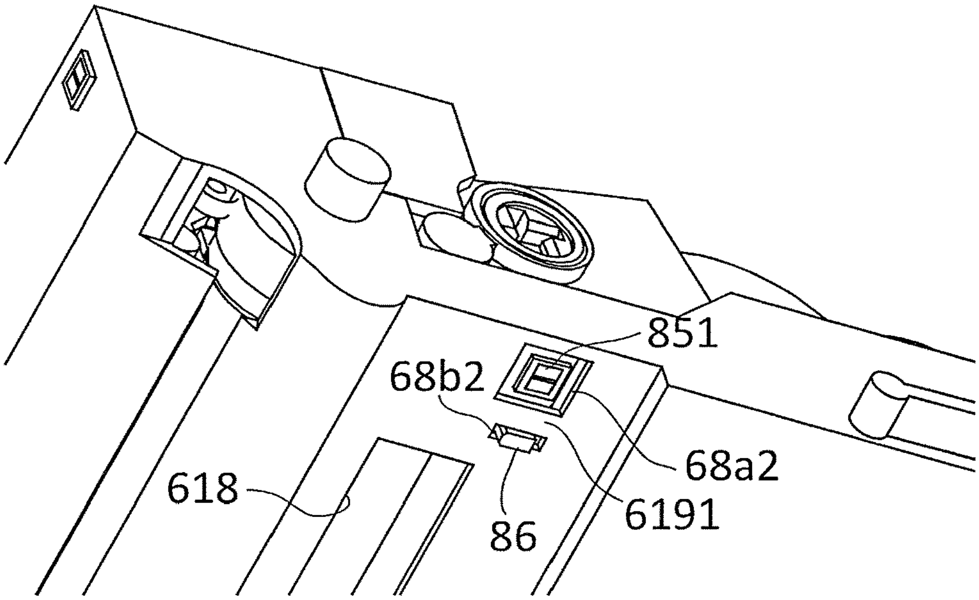
FIG. 51A is a perspective view when a process cartridge according to a modification example is viewed from a downward side.
Figure 51B:
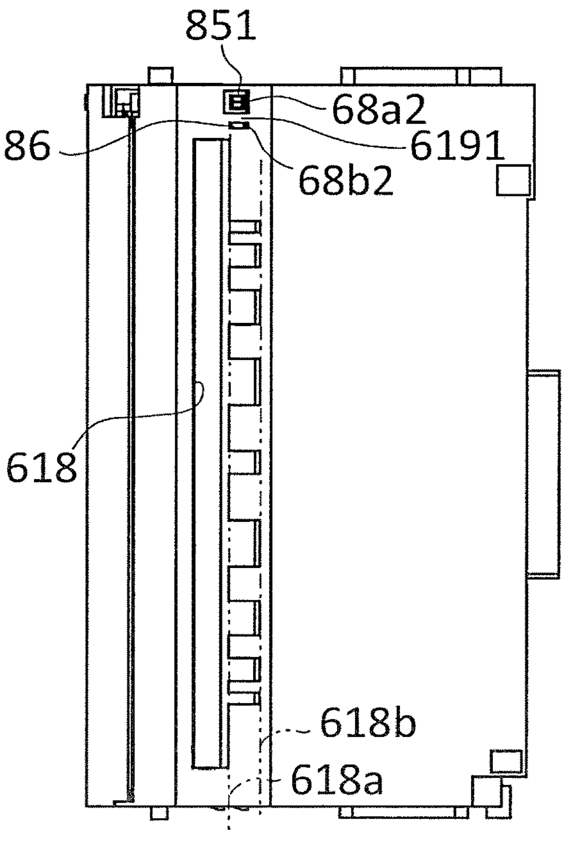
FIG. 51B is a bottom view of the process cartridge.

In addition, for example, as illustrated in FIG. 51A and FIG. 51B, a positioning hole 68*b*2 and an electrode exposing hole 68*a*2 may be set as individual hole portions, and the positioning hole 68*b*2 and the electrode exposing hole 68*a*2 may be aligned in the rotational axis direction of the photosensitive drum 61. Even in this case, when the positioning hole 68*b*2 and the electrode exposing hole 68*a*2 are disposed to deviate to a further forward side than the edge portion 618*a*, a distance between the positioning hole 68*b*2 and the electrode exposing hole 68*a*2, and the sheet passage hole 618 can be increased.

In addition, since the positioning hole 68*b*2 and the electrode exposing hole 68*a*2 are set as independent hole portions, a partition portion (bridge portion) 6191 that bridges a front edge and a rear edge of holes is formed between the positioning hole 68*b*2 and the electrode exposing hole 68*a*2. According to this, an area of the opening portion can be decreased, and the strength of the frame 610 of the drum unit 6 can be improved.

Figure 52A:
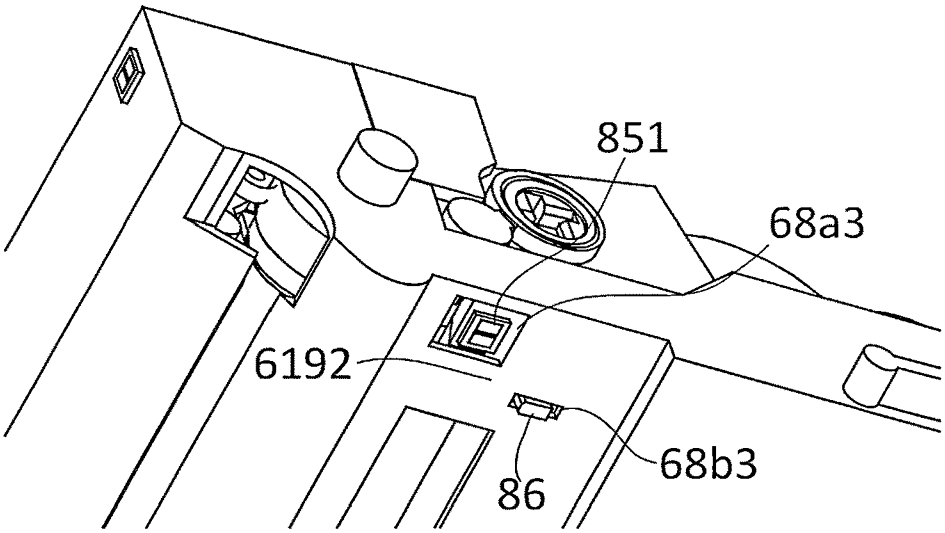
FIG. 52A is a perspective view when a left end side of a process cartridge according to a modification example is viewed from a downward side.
Figure 52B:
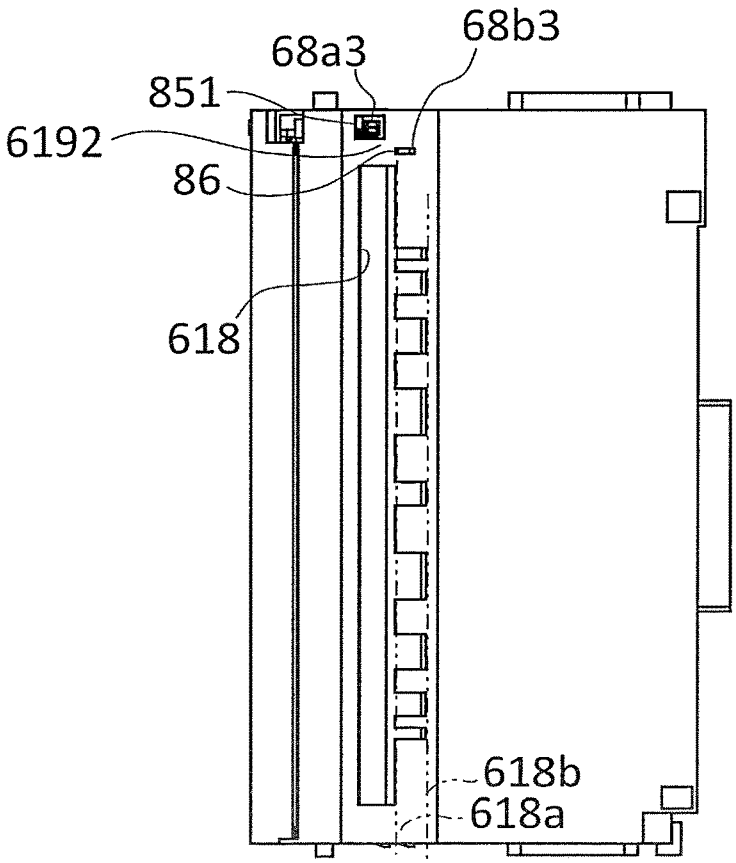
FIG. 52B is a bottom view of the process cartridge.

In addition, as illustrated in FIG. 52A and FIG. 52B, a positioning hole 68*b*3 and an electrode exposing hole 68*a*3 may be formed individually, and in the front-rear direction, the positioning hole 68*b*3 may be provided on a forward side of the edge portion 618*a*, and the electrode exposing hole 68*a*3 may be provided on a rearward side of the edge portion 618*a*. In this case, the positioning hole 68*b*3 and the electrode exposing hole 68*a*3 are provided not to overlap each other in the rotational axis direction when viewed from a direction perpendicular to the rotational axis direction of the photosensitive drum 61. That is, the positioning hole 68*b*3 and the electrode exposing hole 68*a*3 may be separated individually by a boundary portion 6192, and an area of an opening portion of each of the holes can be reduced, and the strength of the frame 610 of the drum unit 6 can be improved.

Figure 53A:
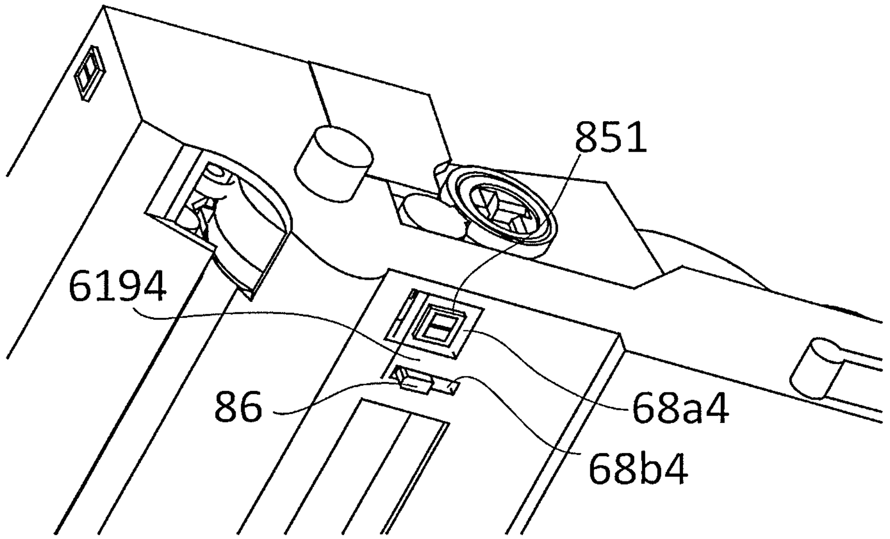
FIG. 53A is a perspective view when a left side of a process cartridge according to a modification example is viewed from a downward side.
Figure 53B:
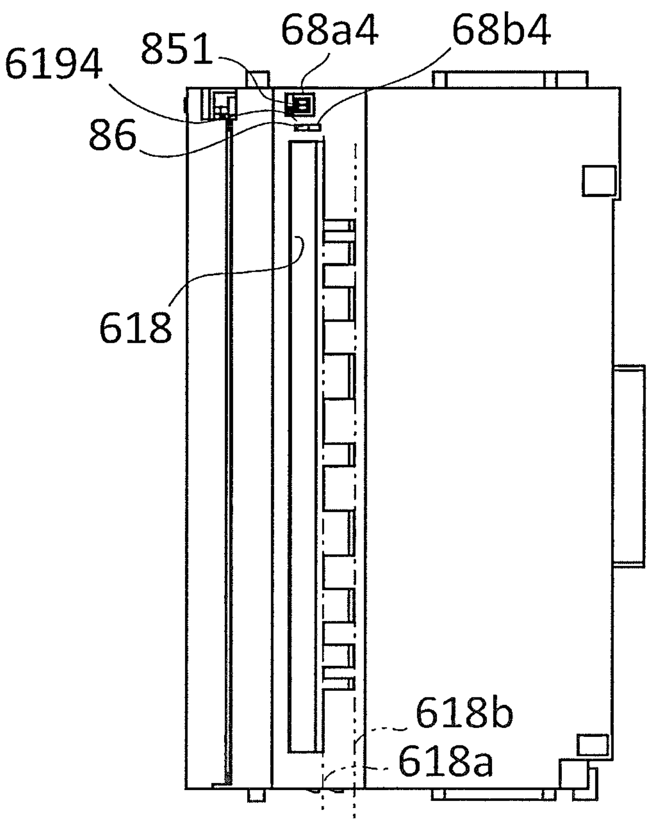
FIG. 53B is a bottom view of the process cartridge.

In addition, as illustrated in FIG. 53A and FIG. 53B, the positioning hole 68*b*3 and the electrode exposing hole 68*a*3 are formed individually. In addition, the positioning hole 68*b*3 and the electrode exposing hole 68*a*3, and the sheet passage hole 618 may be provided to overlap each other in the rotational axis direction when viewed from a direction perpendicular to the rotational axis direction of the photosensitive drum. Even in this case, the positioning hole 68*b*3 and the electrode exposing hole 68*a*3 may be separated individually by a boundary portion 6193, and an area of an opening portion of each of the holes can be reduced, and the strength of the frame 610 of the drum unit 6 can be improved.

Summary of Tenth Embodiment

As described above, since the drum unit memory 6303 is provided in the leading edge wall 613 of the frame 610, the second body side electrode 500*c* can urge the process cartridge 5 by an electrode contact pressure in a direction of pushing rearward the process cartridge 5. According to this, it is possible to stabilize a position of the process cartridge 5 relative to the apparatus body 2. As a result, alignment accuracy between the drum unit memory 6303 and the electrode of the development memory 851, and the apparatus body side electrode is improved.

Eleventh Embodiment

Next, a configuration of a process cartridge 5 according to an eleventh embodiment will be described with reference to FIG. 54 and FIG. 55. Note that, in the following description, only portions different from the first embodiment will be described, and the same names and reference numerals will be given to the other portions, and description thereof will be omitted.

Figure 54:
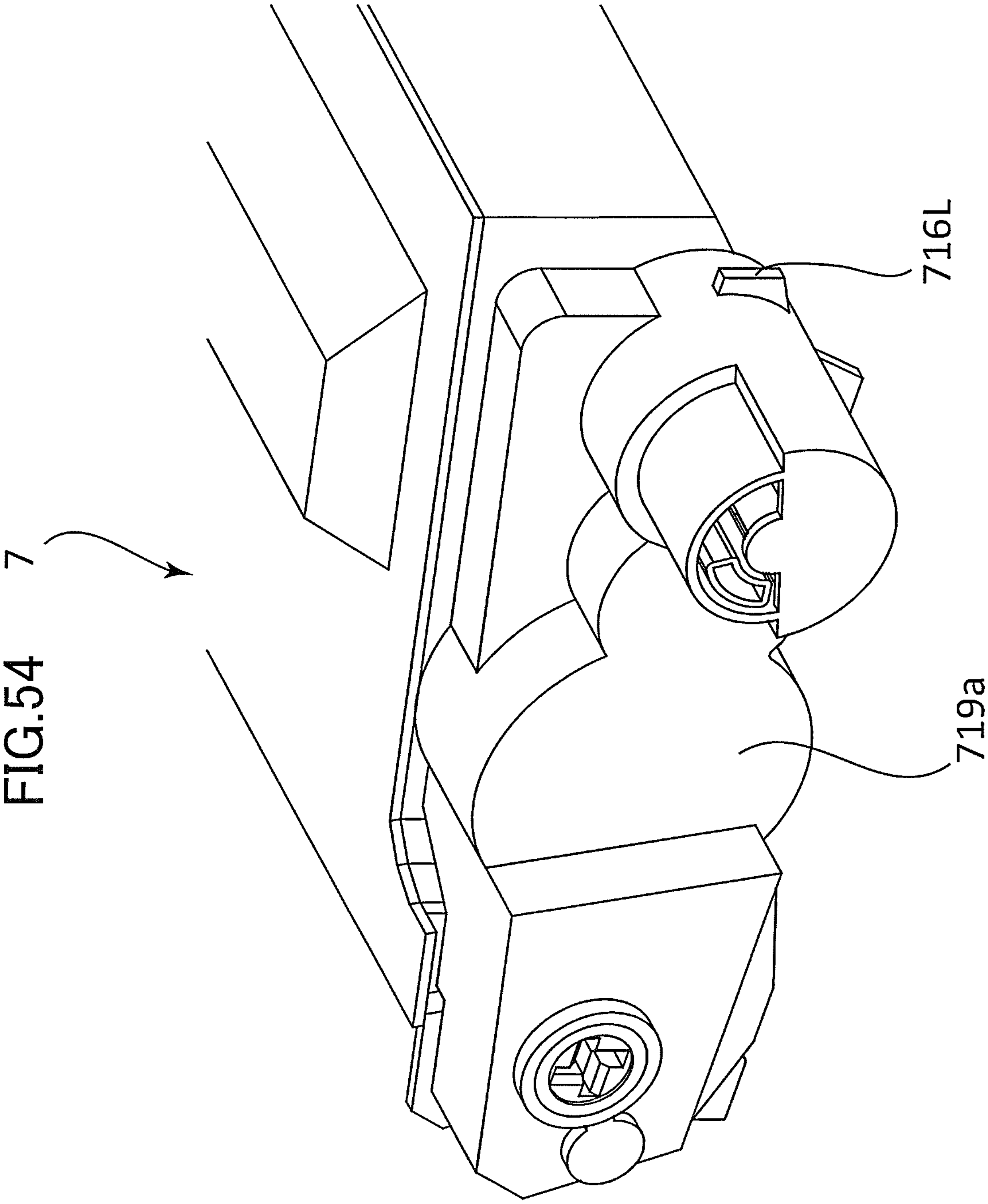
FIG. 54 is a perspective view of a development unit according to an eleventh embodiment.
Figure 55:
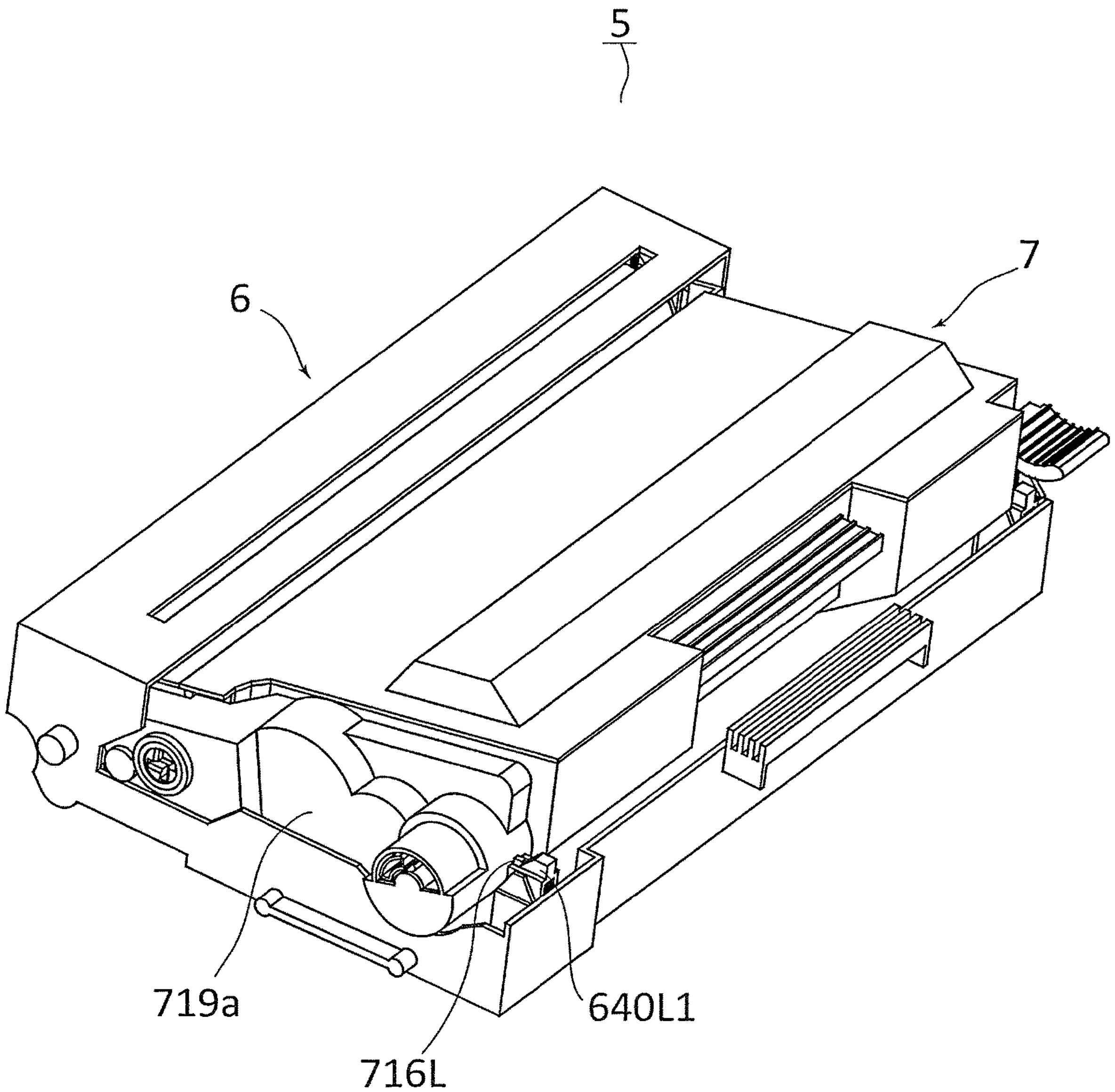
FIG. 55 is a perspective view illustrating a process cartridge.

As illustrated in FIG. 54, in this embodiment, a rib 716L to be pressed on a left side of the development unit 7 is formed in a leading edge portion of aside holder 719*a*. In addition, in accordance with this, a pressing portion 640L1 on a left side is provided to be displaced to a leftward side as illustrated in FIG. 55.

Summary of Eleventh Embodiment

According to this configuration, the casing 700 of the development unit 7 is enlarged to a forward side to increase a volume of the toner storage portion 74, and thus a toner storage amount can be increased.

Twelfth Embodiment

A configuration of a process cartridge 5 according to a twelfth embodiment will be described with reference to FIG. 54 and FIG. 55. Note that, in the following description, only portions different from the first embodiment will be described, and the same names and reference numerals will be given to the other portions, and description thereof will be omitted.

Figure 56:
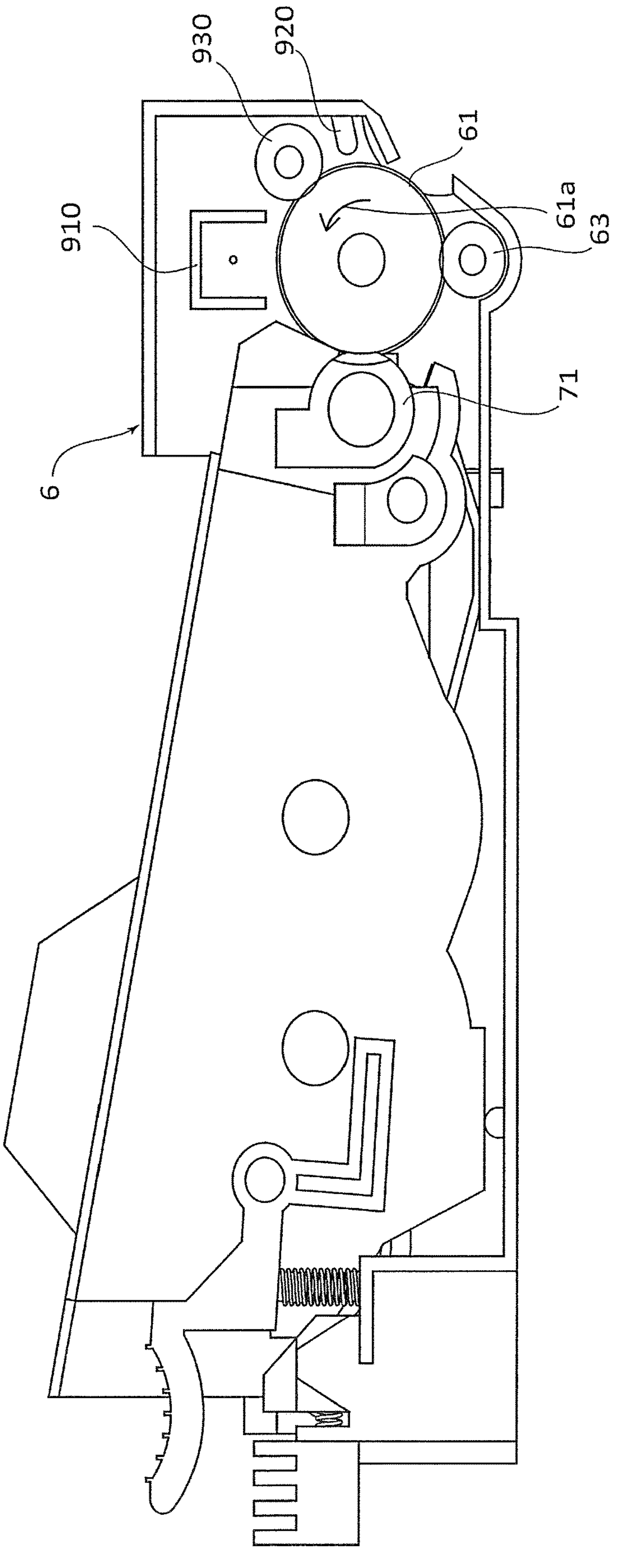
FIG. 56 is a cross-sectional view illustrating a process cartridge according to a twelfth embodiment.

As illustrated in FIG. 56, in this embodiment, the drum unit 6 includes a corona charger 910, a front exposure unit 920, and a collection roller 930 at the periphery of the photosensitive drum 61. The corona charger 910 is a charging unit that charges a surface of the photosensitive drum 61 in a non-contact manner. In addition, the front exposure unit 920 includes a light-emitting diode serving as a light source and a light guide serving as a light guide member. Light emitted from the light-emitting diode is guided by the light guide, and the surface of the photosensitive drum 61 is irradiated with the light. A current that is supplied to the light-emitting diode is supplied from the apparatus body 2. The surface of the photosensitive drum 61 is discharged through light irradiation by the front exposure unit 920. In addition, a predetermined voltage is applied to the collection roller 930 from the apparatus body 2 to collect foreign matters such as paper dust and a waste, and a toner which adhered to the surface of the photosensitive drum 61.

The transfer roller 63, the front exposure unit 920, the collection roller 930, the corona charger 910, and the development roller 71 are disposed at the periphery of the photosensitive drum 61 to be aligned in this order from an upstream side toward a downstream side with respect to the rotation direction (arrow 61*a*) during image formation.

Summary of Twelfth Embodiment

As described above, the drum unit 6 may include the corona charger 910, the front exposure unit 920, and the like. Note that, the invention described in the embodiments may be combined. In addition, in the embodiments, the development roller 71 comes into contact with the photosensitive drum 61, but the development roller 71 may be pressed to face the photosensitive drum 61 with a minute gap, and a toner may be developed on the photosensitive drum 61 through the minute gap.

In addition, in the embodiment, description has been made with reference to the electrophotographic system printer 1 as an example, but the invention is not limited thereto. For example, the invention is also applicable to an inkjet type image forming apparatus that forms an image on a sheet by ejecting an ink liquid from a nozzle.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-086876, filed Apr. 26, 2019, which is hereby incorporated by reference herein in its entirety.

What is claimed is:

1. A cartridge comprising:

a drum unit including a photosensitive drum and a drum frame configured to support the photosensitive drum rotatably about a rotation axis extending in a first direction; and a developing unit detachably attached to an attachment position in the drum unit, the developing unit including a developing roller and a developing frame having a toner accommodating portion configured to accommodate toner to be borne on the developing roller, wherein the drum unit includes an operation lever configured to pivot so as to move the developing unit in a direction in which the developing unit is detached from the attachment position in the drum unit, wherein in a case where one end portion and the other end portion of the drum frame in a second direction intersecting the first direction are a first end portion and a second end portion, respectively, the photosensitive drum is supported by the first end portion of the drum frame, and a side end portion of the second end portion of the drum frame in the first direction includes a projecting portion (i) that projects further in a direction away from the photosensitive drum with respect to the second direction than a center portion of the second end portion in the first direction and (ii) that supports the operation lever pivotably, wherein in a case where an end face of the center portion of the second end portion of the drum frame in the direction away from the photosensitive drum with respect to the second direction is a first end face and where an end face of the projecting portion in a direction approaching the center portion with respect to the first direction is a second end face, the toner accommodating portion includes an overlapping portion that overlaps the first end face of the drum frame when viewed in a direction perpendicular to the first end face of the drum frame and that overlaps the second end face of the drum frame when viewed in a direction perpendicular to the second end face of the drum frame.

2. The cartridge according to claim 1, wherein the projecting portion of the drum frame includes a shaft portion extending in the first direction, and wherein the operation lever is supported pivotably by the shaft portion of the drum frame.

3. The cartridge according to claim 1, wherein the developing frame includes a grip portion to be gripped by a user, and wherein the grip portion is positioned downstream of the first end face of the drum frame in the direction away from the photosensitive drum with respect to the second direction.

4. The cartridge according to claim 3, wherein the drum unit includes a charging member which is configured to charge the photosensitive drum and which is arranged to be aligned with the photosensitive drum in a third direction that intersects both the first direction and the second direction, and wherein the grip portion of the developing frame is provided in a portion of the developing frame that is exposed from the drum frame when viewed in a direction from the photosensitive drum toward the charging member with respect to the third direction.

5. The cartridge according to claim 1, wherein the drum frame is provided with an opening portion of which a longitudinal direction is the first direction, wherein in the second direction, the opening portion is provided between the first end portion and the center portion of the second end portion of the drum frame, and wherein a part of the toner accommodating portion is configured to be exposed through the opening portion when viewed in a third direction that intersects both the first direction and the second direction.

6. The cartridge according to claim 1, wherein the developing unit includes a memory, and a coupling configured to receive driving force to rotate the developing roller from an outside of the cartridge, and wherein the memory and the coupling are provided on a first side of the cartridge in the first direction opposite to a second side of the cartridge on which the operation lever is provided.

7. The cartridge according to claim 1, wherein the drum unit includes a pressing member provided in the side end portion of the drum frame and configured to press the developing unit in a direction in which the developing roller approaches the photosensitive drum.

8. The cartridge according to claim 1, wherein the drum unit includes a projection provided in the side end portion of the drum frame and configured to support the toner accommodating portion of the developing unit.

9. The cartridge according to claim 1, wherein the overlapping portion of the toner accommodating portion extends from one end portion to the other end portion of the toner accommodating portion in the first direction.

* * * * *